(12) United States Patent
Glover

(10) Patent No.: US 12,074,460 B2
(45) Date of Patent: *Aug. 27, 2024

(54) RECHARGEABLE WIRELESS POWER BANK AND METHOD OF USING

(71) Applicant: Wireless Electrical Grid LAN, WiGL Inc., Hampton, VA (US)

(72) Inventor: Ahmad L. D. Glover, Hampton, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/102,594

(22) Filed: Jan. 27, 2023

(65) Prior Publication Data

US 2023/0275471 A1    Aug. 31, 2023

Related U.S. Application Data

(63) Continuation-in-part of application No. 17/699,092, filed on Mar. 19, 2022, now Pat. No. 11,462,949.
(Continued)

(51) Int. Cl.
*H02J 50/80* (2016.01)
*G06Q 20/40* (2012.01)
(Continued)

(52) U.S. Cl.
CPC .......... *H02J 50/80* (2016.02); *G06Q 20/4014* (2013.01); *G06Q 50/06* (2013.01);
(Continued)

(58) Field of Classification Search
CPC .... H02J 7/025; H02J 7/00032; H02J 7/00712; H02J 7/0047; H02J 50/10; H02J 50/20;
(Continued)

(56) References Cited

U.S. PATENT DOCUMENTS

| 787,412 A | 4/1905 | Tesla |
| 2,811,624 A | 10/1957 | Haagensen |

(Continued)

FOREIGN PATENT DOCUMENTS

| CN | 1829999 A | 9/2006 |
| CN | 101401312 A | 4/2009 |

(Continued)

OTHER PUBLICATIONS

WIGL, Inc., IPRP, PCT/US2018/15625, May 17, 2018, 3 pgs.
WIGL, Inc., IPRP, PCT/US2021/52223, Oct. 28, 2021, 3 pgs.

*Primary Examiner* — Joel Ajayi

(57) ABSTRACT

Disclosed herein is a rechargeable power bank, comprising a charging system comprising a controller coupled to a receiving system in electrical communication with an electrical storage device; configured to harvest energy from one or more directional electromagnetic energy beams provided by an external wireless charging system over a distance of greater than about 50 cm, convert the harvested energy into electrical energy, and direct the electrical energy into the electrical storage device, wherein the controller is configurable to direct or not direct the electrical energy from the electrical storage device into an attached electronic device to power and/or recharge the attached electronic device based on one or more authorization criteria. A method of utilizing the power bank is also disclosed.

20 Claims, 13 Drawing Sheets

Related U.S. Application Data which is a continuation-in-part of application No. 17/033,824, filed on Sep. 27, 2020, now Pat. No. 11,605,983, and a continuation-in-part of application No. 17/019,312, filed on Sep. 13, 2020, now Pat. No. 11,557,927, and a continuation-in-part of application No. 16/482,347, filed on Jul. 31, 2019, now Pat. No. 10,992,158, which is a continuation-in-part of application No. 15/640,574, filed on Jul. 2, 2017, now Pat. No. 9,985,465, application No. 18/102,594, filed on Jan. 27, 2023 is a continuation-in-part of application No. 17/033,824, filed on Sep. 27, 2020, now Pat. No. 11,605,983, which is a continuation-in-part of application No. 17/019,312, filed on Sep. 13, 2020, now Pat. No. 11,557,927.

(60) Provisional application No. 63/318,620, filed on Mar. 10, 2022, provisional application No. 62/506,737, filed on May 16, 2017.

(51) Int. Cl.
   *G06Q 50/06* (2012.01)
   *H02J 7/00* (2006.01)
   *H02J 50/00* (2016.01)
   *H02J 50/10* (2016.01)
   *H02J 50/20* (2016.01)

(52) U.S. Cl.
   CPC ........ *H02J 7/00032* (2020.01); *H02J 7/0047* (2013.01); *H02J 7/00712* (2020.01); *H02J 50/001* (2020.01); *H02J 50/10* (2016.02); *H02J 50/20* (2016.02)

(58) Field of Classification Search
   CPC .......... H02J 50/80; H02J 50/001; H02J 50/06; G06Q 20/4014; G06Q 50/06
   USPC .................................................. 455/572, 573
   See application file for complete search history.

(56) References Cited

U.S. PATENT DOCUMENTS

| | | |
|---|---|---|
| 2,863,148 A | 12/1958 | Gammon et al. |
| 3,167,775 A | 1/1965 | Guertler |
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,142,292 A | 8/1992 | Chang |
| 5,200,759 A | 4/1993 | McGinnis |
| 5,211,471 A | 5/1993 | Rohrs |
| 5,276,455 A | 1/1994 | Fitzsimmons et al. |
| 5,548,292 A | 8/1996 | Hirshfield et al. |
| 5,556,749 A | 9/1996 | Mitsuhashi et al. |
| 5,568,088 A | 10/1996 | Dent et al. |
| 5,631,572 A | 5/1997 | Sheen et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,061,025 A | 5/2000 | Jackson et al. |
| 6,127,799 A | 10/2000 | Krishnan |
| 6,127,942 A | 10/2000 | Welle |
| 6,163,296 A | 12/2000 | Lier et al. |
| 6,176,433 B1 | 1/2001 | Uesaka et al. |
| 6,208,115 B1 | 3/2001 | Binder |
| 6,271,799 B1 | 8/2001 | Rief |
| 6,289,237 B1 | 9/2001 | Mickle et al. |
| 6,316,915 B1 | 11/2001 | Fuiiwara et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B2 | 9/2002 | Rummeli et al. |
| 6,476,769 B1 | 11/2002 | Lehtola |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,661,197 B2 | 12/2003 | Zink et al. |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,982,697 B2 | 1/2006 | Wilson et al. |
| 6,988,026 B2 | 1/2006 | Breed et al. |
| 7,003,350 B2 | 2/2006 | Denker et al. |
| 7,012,572 B1 | 3/2006 | Schaffner et al. |
| 7,027,311 B2 | 4/2006 | Vanderelli et al. |
| 7,042,196 B2 | 5/2006 | Ka-Lai et al. |
| 7,068,234 B2 | 6/2006 | Sievenoioer |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,525,283 B2 | 4/2009 | Cheng et al. |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hvde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,010,205 B2 | 8/2011 | Rahman et al. |
| 8,049,676 B2 | 11/2011 | Yoon et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |

(56) References Cited

U.S. PATENT DOCUMENTS

| | | |
|---|---|---|
| 8,180,286 B2 | 5/2012 | Yamasuge |
| 8,184,454 B2 | 5/2012 | Mao |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leahman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,564,485 B2 | 10/2013 | Milosavljevic et al. |
| 8,587,154 B2 | 11/2013 | Fells et al. |
| 8,604,746 B2 | 12/2013 | Lee |
| 8,614,643 B2 | 12/2013 | Leahman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,655,272 B2 | 2/2014 | Saunamaki |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,819,659 B2 | 8/2014 | Ramer et al. |
| 8,823,319 B2 | 9/2014 | Von Novak, III et al. |
| 8,832,646 B1 | 9/2014 | Wendling |
| 8,853,891 B2 | 10/2014 | Soar |
| 8,854,176 B2 | 10/2014 | Zeine |
| 8,860,364 B2 | 10/2014 | Low et al. |
| 8,896,315 B1 | 11/2014 | Davies |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leahman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leahman et al. |
| 9,130,397 B2 | 9/2015 | Leahman et al. |
| 9,130,602 B2 | 9/2015 | Cook |
| 9,142,998 B2 | 9/2015 | Yu et al. |
| 9,143,000 B2 | 9/2015 | Leahman et al. |
| 9,143,010 B2 | 9/2015 | Urano |
| 9,153,074 B2 | 10/2015 | Zhou et al. |
| 9,178,389 B2 | 11/2015 | Hwang |
| 9,192,772 B1 * | 11/2015 | Tsukamoto ............ A61N 1/378 |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leahman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,391,477 B2 | 7/2016 | Sheng |
| 9,401,977 B2 | 7/2016 | Gaw |
| 9,409,490 B2 | 8/2016 | Kawashima |
| 9,419,335 B2 | 8/2016 | Pintos |
| 9,419,443 B2 | 8/2016 | Leahman |
| 9,438,045 B1 | 9/2016 | Leahman |
| 9,438,046 B1 | 9/2016 | Leahman |
| 9,444,283 B2 | 9/2016 | Son et al. |
| 9,450,449 B1 | 9/2016 | Leahman et al. |
| 9,452,296 B2 | 9/2016 | Forsell |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,521,926 B1 | 12/2016 | Leahman et al. |
| 9,522,270 B2 | 12/2016 | Perryman et al. |
| 9,532,748 B2 | 1/2017 | Denison et al. |
| 9,537,354 B2 | 1/2017 | Bell et al. |
| 9,537,357 B2 | 1/2017 | Leahman |
| 9,537,358 B2 | 1/2017 | Leahman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,635,625 B2 | 4/2017 | Russell et al. |
| 9,647,328 B2 | 5/2017 | Dobric |
| 9,647,483 B1 | 5/2017 | Bana et al. |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,787,103 B1 | 10/2017 | Leahman et al. |
| 9,793,758 B2 | 10/2017 | Leahman |
| 9,793,764 B2 | 10/2017 | Perry |
| 9,800,080 B2 | 10/2017 | Leahman et al. |
| 9,800,172 B1 | 10/2017 | Leahman |
| 9,806,564 B2 | 10/2017 | Leahman |
| 9,812,890 B1 | 11/2017 | Leahman et al. |
| 9,819,230 B2 | 11/2017 | Petras et al. |
| 9,824,815 B2 | 11/2017 | Leahman et al. |
| 9,825,674 B1 | 11/2017 | Leahman |
| 9,831,718 B2 | 11/2017 | Leahman et al. |
| 9,838,083 B2 | 12/2017 | Bell et al. |
| 9,843,201 B1 | 12/2017 | Leahman et al. |
| 9,843,213 B2 | 12/2017 | Leahman et al. |
| 9,843,229 B2 | 12/2017 | Leahman |
| 9,843,763 B2 | 12/2017 | Leahman et al. |
| 9,847,669 B2 | 12/2017 | Leahman |
| 9,847,677 B1 | 12/2017 | Leahman |
| 9,847,679 B2 | 12/2017 | Bell et al. |
| 9,853,361 B2 | 12/2017 | Chen et al. |
| 9,853,458 B1 | 12/2017 | Bell et al. |
| 9,853,485 B2 | 12/2017 | Contopanagos |
| 9,853,692 B1 | 12/2017 | Bell et al. |

(56) References Cited

U.S. PATENT DOCUMENTS

| | | |
|---|---|---|
| 9,859,756 B2 | 1/2018 | Leahman et al. |
| 9,859,757 B1 | 1/2018 | Leahman et al. |
| 9,859,758 B1 | 1/2018 | Leahman |
| 9,859,797 B1 | 1/2018 | Leahman |
| 9,866,279 B2 | 1/2018 | Bell et al. |
| 9,867,032 B2 | 1/2018 | Verma et al. |
| 9,867,062 B1 | 1/2018 | Bell et al. |
| 9,871,301 B2 | 1/2018 | Contopanagos |
| 9,871,387 B1 | 1/2018 | Bell et al. |
| 9,871,398 B1 | 1/2018 | Leahman |
| 9,876,379 B1 | 1/2018 | Leahman et al. |
| 9,876,380 B1 | 1/2018 | Leahman et al. |
| 9,876,394 B1 | 1/2018 | Leahman |
| 9,876,536 B1 | 1/2018 | Bell et al. |
| 9,876,648 B2 | 1/2018 | Bell |
| 9,882,394 B1 | 1/2018 | Bell et al. |
| 9,882,395 B1 | 1/2018 | Leahman et al. |
| 9,882,427 B2 | 1/2018 | Leahman et al. |
| 9,882,430 B1 | 1/2018 | Leahman et al. |
| 9,887,584 B1 | 2/2018 | Bell et al. |
| 9,887,739 B2 | 2/2018 | Leahman et al. |
| 9,891,669 B2 | 2/2018 | Bell |
| 9,893,535 B2 | 2/2018 | Leahman |
| 9,893,538 B1 | 2/2018 | Bell et al. |
| 9,893,554 B2 | 2/2018 | Bell et al. |
| 9,893,555 B1 | 2/2018 | Leahman et al. |
| 9,893,564 B2 | 2/2018 | de Rochemont |
| 9,899,744 B1 | 2/2018 | Contopanagos et al. |
| 9,899,844 B1 | 2/2018 | Bell et al. |
| 9,899,861 B1 | 2/2018 | Leahman et al. |
| 9,899,873 B2 | 2/2018 | Bell et al. |
| 9,912,199 B2 | 3/2018 | Leahman et al. |
| 9,916,485 B1 | 3/2018 | Lilly et al. |
| 9,917,477 B1 | 3/2018 | Bell et al. |
| 9,923,386 B1 | 3/2018 | Leahman et al. |
| 9,939,864 B1 | 4/2018 | Bell et al. |
| 9,941,707 B1 | 4/2018 | Leahman |
| 9,941,747 B2 | 4/2018 | Bell et al. |
| 9,954,374 B1 | 4/2018 | Bell et al. |
| 9,965,009 B1 | 5/2018 | Bell et al. |
| 9,966,765 B1 | 5/2018 | Leahman |
| 9,966,784 B2 | 5/2018 | Leahman |
| 9,967,743 B1 | 5/2018 | Bell et al. |
| 9,973,008 B1 | 5/2018 | Leahman |
| 9,991,741 B1 | 6/2018 | Bell et al. |
| 10,003,211 B1 | 6/2018 | Leahman et al. |
| 10,008,777 B1 | 6/2018 | Broyde et al. |
| 10,008,889 B2 | 6/2018 | Bell et al. |
| 10,014,728 B1 | 7/2018 | Leahman |
| 10,027,159 B2 | 7/2018 | Hosseini |
| 10,027,180 B1 | 7/2018 | Hosseini |
| 10,038,337 B1 | 7/2018 | Leahman et al. |
| 10,050,462 B1 | 8/2018 | Leahman et al. |
| 10,056,782 B1 | 8/2018 | Leahman |
| 10,063,064 B1 | 8/2018 | Bell et al. |
| 10,063,105 B2 | 8/2018 | Leahman |
| 10,063,106 B2 | 8/2018 | Bell et al. |
| 10,068,703 B1 | 9/2018 | Contopanagos |
| 10,075,008 B1 | 9/2018 | Bell et al. |
| 10,075,017 B2 | 9/2018 | Leahman et al. |
| 10,079,515 B2 | 9/2018 | Hosseini et al. |
| 10,090,699 B1 | 10/2018 | Leahman |
| 10,090,714 B2 | 10/2018 | Bohn et al. |
| 10,090,886 B1 | 10/2018 | Bell et al. |
| 10,103,552 B1 | 10/2018 | Leahman et al. |
| 10,103,582 B2 | 10/2018 | Leahman et al. |
| 10,110,046 B1 | 10/2018 | Esquibel et al. |
| 10,116,143 B1 | 10/2018 | Leahman et al. |
| 10,116,162 B2 | 10/2018 | Hosseini et al. |
| 10,116,170 B1 | 10/2018 | Leahman |
| 10,122,219 B1 | 11/2018 | Hosseini et al. |
| 10,122,415 B2 | 11/2018 | Bell et al. |
| 10,124,754 B1 | 11/2018 | Leahman |
| 10,128,686 B1 | 11/2018 | Leahman et al. |
| 10,128,693 B2 | 11/2018 | Bell et al. |
| 10,128,695 B2 | 11/2018 | Leahman et al. |
| 10,128,699 B2 | 11/2018 | Leahman |
| 10,134,260 B1 | 11/2018 | Bell et al. |
| 10,135,112 B1 | 11/2018 | Hosseini |
| 10,135,286 B2 | 11/2018 | Hosseini et al. |
| 10,135,294 B1 | 11/2018 | Leahman |
| 10,135,295 B2 | 11/2018 | Leahman |
| 10,141,768 B2 | 11/2018 | Leahman et al. |
| 10,141,771 B1 | 11/2018 | Hosseini et al. |
| 10,141,791 B2 | 11/2018 | Bell et al. |
| 10,148,097 B1 | 12/2018 | Leahman et al. |
| 10,148,133 B2 | 12/2018 | Leahman et al. |
| 10,153,645 B1 | 12/2018 | Bell et al. |
| 10,153,653 B1 | 12/2018 | Bell et al. |
| 10,153,660 B1 | 12/2018 | Leahman et al. |
| 10,158,257 B2 | 12/2018 | Leahman |
| 10,158,259 B1 | 12/2018 | Leahman |
| 10,164,478 B2 | 12/2018 | Leahman |
| 10,170,917 B1 | 1/2019 | Bell et al. |
| 10,177,594 B2 | 1/2019 | Contopanagos |
| 10,181,756 B2 | 1/2019 | Bae et al. |
| 10,186,892 B2 | 1/2019 | Hosseini et al. |
| 10,186,893 B2 | 1/2019 | Bell et al. |
| 10,186,911 B2 | 1/2019 | Leahman |
| 10,186,913 B2 | 1/2019 | Leahman et al. |
| 10,193,396 B1 | 1/2019 | Bell et al. |
| 10,199,835 B2 | 2/2019 | Bell |
| 10,199,849 B1 | 2/2019 | Bell |
| 10,199,850 B2 | 2/2019 | Leahman |
| 10,205,239 B1 | 2/2019 | Contopanagos et al. |
| 10,206,185 B2 | 2/2019 | Leahman et al. |
| 10,211,674 B1 | 2/2019 | Leahman et al. |
| 10,211,680 B2 | 2/2019 | Leahman et al. |
| 10,211,682 B2 | 2/2019 | Bell et al. |
| 10,211,685 B2 | 2/2019 | Bell et al. |
| 10,218,207 B2 | 2/2019 | Hosseini et al. |
| 10,218,227 B2 | 2/2019 | Leahman et al. |
| 10,223,717 B1 | 3/2019 | Bell |
| 10,224,758 B2 | 3/2019 | Leahman et al. |
| 10,224,982 B1 | 3/2019 | Leahman |
| 10,230,266 B1 | 3/2019 | Leahman et al. |
| 10,243,414 B1 | 3/2019 | Leahman et al. |
| 10,256,657 B2 | 4/2019 | Hosseini et al. |
| 10,256,677 B2 | 4/2019 | Hosseini et al. |
| 10,263,432 B1 | 4/2019 | Leahman et al. |
| 10,263,476 B2 | 4/2019 | Leahman |
| 10,270,261 B2 | 4/2019 | Bell et al. |
| 10,277,054 B2 | 4/2019 | Hosseini |
| 10,291,055 B1 | 5/2019 | Bell et al. |
| 10,291,066 B1 | 5/2019 | Leahman |
| 10,291,294 B2 | 5/2019 | Leahman |
| 10,298,024 B2 | 5/2019 | Leahman |
| 10,298,133 B2 | 5/2019 | Leahman |
| 10,305,315 B2 | 5/2019 | Leahman et al. |
| 10,312,715 B2 | 6/2019 | Leahman |
| 10,333,332 B1 | 6/2019 | Hosseini |
| 10,333,357 B1 | 6/2019 | Abu Qahouq |
| 10,381,880 B2 | 8/2019 | Leahman et al. |
| 10,396,588 B2 | 8/2019 | Leahman |
| 10,509,466 B1 | 12/2019 | Miller et al. |
| 10,511,097 B2 | 12/2019 | Komaros et al. |
| 10,516,301 B2 | 12/2019 | Leahman |
| 10,523,058 B2 | 12/2019 | Leahman |
| 10,554,052 B2 | 2/2020 | Bell et al. |
| 10,594,165 B2 | 3/2020 | Hosseini |
| 10,615,647 B2 | 4/2020 | Johnston et al. |
| 10,616,534 B2 | 4/2020 | Thiel et al. |
| 10,651,670 B1 | 5/2020 | Jiang et al. |
| 10,714,984 B2 | 7/2020 | Hosseini et al. |
| 10,734,717 B2 | 8/2020 | Hosseini |
| 10,778,041 B2 | 9/2020 | Leahman |
| 10,790,674 B2 | 9/2020 | Bell et al. |
| 10,840,743 B2 | 11/2020 | Johnston et al. |
| 10,848,853 B2 | 11/2020 | Leahman et al. |
| 10,879,740 B2 | 12/2020 | Hosseini |
| 10,923,954 B2 | 2/2021 | Leahman |
| 10,958,095 B2 | 3/2021 | Leahman et al. |
| 10,965,164 B2 | 3/2021 | Leahman et al. |
| 10,985,617 B1 | 4/2021 | Johnston et al. |

(56) References Cited

U.S. PATENT DOCUMENTS

| | | |
|---|---|---|
| 10,992,187 B2 | 4/2021 | Leahman |
| 11,011,942 B2 | 5/2021 | Liu |
| 11,018,779 B2 | 5/2021 | Saraiedini |
| 11,114,885 B2 | 9/2021 | Hosseini et al. |
| 11,139,699 B2 | 10/2021 | Johnston et al. |
| 11,159,057 B2 | 10/2021 | Kabiri et al. |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pantle et al. |
| 2002/0072784 A1 | 6/2002 | Sheppard et al. |
| 2002/0080083 A1 | 6/2002 | Nantz et al. |
| 2002/0095980 A1 | 7/2002 | Breed et al. |
| 2002/0103447 A1 | 8/2002 | Terry |
| 2002/0123776 A1 | 9/2002 | VonArx |
| 2002/0133592 A1 | 9/2002 | Matsuda |
| 2002/0171594 A1 | 11/2002 | Fang |
| 2002/0172223 A1 | 11/2002 | Stilp |
| 2003/0005759 A1 | 1/2003 | Breed et al. |
| 2003/0027036 A1 | 2/2003 | Emori et al. |
| 2003/0038750 A1 | 2/2003 | Chen |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0155832 A1 | 8/2004 | Yuanzhu |
| 2004/0196190 A1 | 10/2004 | Mendolia et al. |
| 2004/0203979 A1 | 10/2004 | Attar et al. |
| 2004/0207559 A1 | 10/2004 | Milosavlievic |
| 2004/0218759 A1 | 11/2004 | Yacobi |
| 2004/0241402 A1 | 12/2004 | Kawate |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0275983 A1 | 12/2005 | Franklin et al. |
| 2005/0282591 A1 | 12/2005 | Shaff |
| 2006/0013335 A1 | 1/2006 | Leahman |
| 2006/0019712 A1 | 1/2006 | Choi |
| 2006/0030279 A1 | 2/2006 | Leahman et al. |
| 2006/0033674 A1 | 2/2006 | Essig, Jr. et al. |
| 2006/0056855 A1 | 3/2006 | Nakagawa et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0281435 A1 | 12/2006 | Shearer et al. |
| 2006/0284593 A1 | 12/2006 | Nag:v et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leahman et al. |
| 2007/0097653 A1 | 5/2007 | Gilliland et al. |
| 2007/0099644 A1 | 5/2007 | Batra et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0149237 A1 | 6/2007 | Russell et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0229261 A1 | 10/2007 | Zimmerman et al. |
| 2007/0240297 A1 | 10/2007 | Yang et al. |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadlv |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258981 A1 | 10/2008 | Achour et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |

(56) References Cited

U.S. PATENT DOCUMENTS

| | | |
|---|---|---|
| 2009/0039828 A1 | 2/2009 | Jakubowski |
| 2009/0047998 A1 | 2/2009 | Alberth, Jr. |
| 2009/0051324 A1 | 2/2009 | Nakatsuji |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0152954 A1 | 6/2009 | Le et al. |
| 2009/0157911 A1 | 6/2009 | Aihara |
| 2009/0174604 A1 | 7/2009 | Keskitalo |
| 2009/0180653 A1 | 7/2009 | Siursen et al. |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0299175 A1 | 12/2009 | Bernstein et al. |
| 2009/0303693 A1 | 12/2009 | Mao |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117596 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0124040 A1 | 5/2010 | Diebel et al. |
| 2010/0127660 A1 | 5/2010 | Cook et al. |
| 2010/0134105 A1 | 6/2010 | Zelinski et al. |
| 2010/0141214 A1 | 6/2010 | Yoon et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0253281 A1 | 10/2010 | Li |
| 2010/0256831 A1 | 10/2010 | Abramo et al. |
| 2010/0259110 A1 | 10/2010 | Kurs et al. |
| 2010/0259401 A1 | 10/2010 | Azancot et al. |
| 2010/0259447 A1 | 10/2010 | Crouch |
| 2010/0264747 A1 | 10/2010 | Hall et al. |
| 2010/0264748 A1 | 10/2010 | Tucker |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0009057 A1 | 1/2011 | Saunamaki |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leahman |
| 2011/0032866 A1 | 2/2011 | Leahman |
| 2011/0034190 A1 | 2/2011 | Leahman |
| 2011/0034191 A1 | 2/2011 | Leahman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074346 A1 | 3/2011 | Hall et al. |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |

(56) References Cited

U.S. PATENT DOCUMENTS

| | | |
|---|---|---|
| 2011/0109167 A1 | 5/2011 | Park et al. |
| 2011/0114401 A1 | 5/2011 | Kanno |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tamg et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0148595 A1 | 6/2011 | Miller et al. |
| 2011/0151789 A1 | 6/2011 | Viglione et al. |
| 2011/0152670 A1 | 6/2011 | Yang |
| 2011/0154429 A1 | 6/2011 | Stantchey |
| 2011/0156493 A1 | 6/2011 | Bennett |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0193688 A1 | 8/2011 | Forsell |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222154 A1 | 9/2011 | Choi et al. |
| 2011/0222272 A1 | 9/2011 | Yeh |
| 2011/0227725 A1 | 9/2011 | Muirhead |
| 2011/0228436 A1 | 9/2011 | Lee et al. |
| 2011/0243040 A1 | 10/2011 | Khan et al. |
| 2011/0243050 A1 | 10/2011 | Yanoyer |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0001644 A1 | 1/2012 | Baarman et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0025622 A1 | 2/2012 | Kim et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0075072 A1 | 3/2012 | Paoou |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0143383 A1 | 6/2012 | Cooperrider et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153740 A1 | 6/2012 | Soar |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0188142 A1 | 7/2012 | Shashi et al. |
| 2012/0187851 A1 | 8/2012 | Hug:g:ins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Mivabavashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0242809 A1 | 9/2012 | White et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0270592 A1 | 10/2012 | Ngai |
| 2012/0274147 A1 | 11/2012 | Stecher et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0294054 A1 | 11/2012 | Kim et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306284 A1 | 12/2012 | Lee et al. |
| 2012/0306433 A1 | 12/2012 | Kim et al. |

(56) References Cited

U.S. PATENT DOCUMENTS

| | | |
|---|---|---|
| 2012/0306572 A1 | 12/2012 | Hietala et al. |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313446 A1 | 12/2012 | Park et al. |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0005252 A1 | 1/2013 | Lee et al. |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038136 A1 | 2/2013 | Wheatley et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentem et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0062959 A1 | 3/2013 | Lee et al. |
| 2013/0063082 A1 | 3/2013 | Lee et al. |
| 2013/0063143 A1 | 3/2013 | Adalsteinsson et al. |
| 2013/0063266 A1 | 3/2013 | Yunker et al. |
| 2013/0063550 A1 | 3/2013 | Ritchey et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120052 A1 | 5/2013 | Siska |
| 2013/0120205 A1 | 5/2013 | Thomson et al. |
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Grav |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0201316 A1 | 8/2013 | Binder et al. |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0223538 A1 | 8/2013 | Wang et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0249682 A1 | 9/2013 | Van Wiemeersch et al. |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0300356 A1 | 11/2013 | Yang |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2013/0343585 A1 | 12/2013 | Bennett et al. |
| 2014/0001608 A1 | 1/2014 | McPartlin |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0002012 A1 | 1/2014 | McCauley et al. |
| 2014/0006017 A1 | 1/2014 | Sen |
| 2014/0008993 A1 | 1/2014 | Leahman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0024325 A1 | 1/2014 | Iun et al. |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |

(56) References Cited

U.S. PATENT DOCUMENTS

| | | |
|---|---|---|
| 2014/0104157 A1 | 4/2014 | Bums |
| 2014/0111147 A1 | 4/2014 | Soar |
| 2014/0111153 A1 | 4/2014 | Kwon et al. |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159646 A1 | 6/2014 | Sankar et al. |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175876 A1 | 6/2014 | Cheatham, III et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0183964 A1 | 7/2014 | Walley |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0203629 A1 | 7/2014 | Hoffman et al. |
| 2014/0203768 A1 | 7/2014 | Andie et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0252869 A1 | 9/2014 | Kamiura et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266160 A1 | 9/2014 | Coza |
| 2014/0266946 A1 | 9/2014 | Bilv et al. |
| 2014/0273819 A1 | 9/2014 | Nadakuduti et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292269 A1 | 10/2014 | Keating et al. |
| 2014/0292451 A1 | 10/2014 | Zimmerman |
| 2014/0300452 A1 | 10/2014 | Rofe et al. |
| 2014/0312706 A1 | 10/2014 | Fiorello et al. |
| 2014/0312833 A1 | 10/2014 | Won et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leahman et al. |
| 2014/0354221 A1 | 12/2014 | Leahman et al. |
| 2014/0355718 A1 | 12/2014 | Guan et al. |
| 2014/0357309 A1 | 12/2014 | Leahman et al. |
| 2014/0362517 A1 | 12/2014 | Moock et al. |
| 2014/0368048 A1 | 12/2014 | Leahman et al. |
| 2014/0368161 A1 | 12/2014 | Leahman et al. |
| 2014/0368405 A1 | 12/2014 | Ek et al. |
| 2014/0370929 A1 | 12/2014 | Khawand et al. |
| 2014/0375139 A1 | 12/2014 | Tsukamoto |
| 2014/0375253 A1 | 12/2014 | Leahman et al. |
| 2014/0375255 A1 | 12/2014 | Leahman et al. |
| 2014/0375258 A1 | 12/2014 | Arkhipenkov |
| 2014/0375261 A1 | 12/2014 | Manova-Elssibony et al. |
| 2014/0380403 A1 | 12/2014 | Pearson et al. |
| 2015/0001949 A1 | 1/2015 | Leahman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leahman et al. |
| 2015/0015195 A1 | 1/2015 | Leahman et al. |
| 2015/0021990 A1 | 1/2015 | Mver et al. |
| 2015/0022008 A1 | 1/2015 | Leahman et al. |
| 2015/0022010 A1 | 1/2015 | Leahman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leahman et al. |
| 2015/0028697 A1 | 1/2015 | Leahman et al. |
| 2015/0028875 A1 | 1/2015 | Irie et al. |
| 2015/0029397 A1 | 1/2015 | Leahman et al. |
| 2015/0035378 A1 | 2/2015 | Calhoun et al. |
| 2015/0035709 A1 | 2/2015 | Lim |
| 2015/0035715 A1 | 2/2015 | Kim et al. |
| 2015/0039482 A1 | 2/2015 | Fuinaga |
| 2015/0041459 A1 | 2/2015 | Leahman et al. |
| 2015/0042265 A1 | 2/2015 | Leahman et al. |
| 2015/0042287 A1 | 2/2015 | Liu et al. |
| 2015/0044977 A1 | 2/2015 | Ramasamv et al. |
| 2015/0046526 A1 | 2/2015 | Bush et al. |
| 2015/0061404 A1 | 3/2015 | Lamenza et al. |
| 2015/0076917 A1 | 3/2015 | Leahman et al. |
| 2015/0076927 A1 | 3/2015 | Leahman et al. |
| 2015/0077036 A1 | 3/2015 | Leahman et al. |
| 2015/0077037 A1 | 3/2015 | Leahman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102764 A1 | 4/2015 | Leahman et al. |
| 2015/0102769 A1 | 4/2015 | Leahman et al. |
| 2015/0102942 A1 | 4/2015 | Houser et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0116153 A1 | 4/2015 | Chen et al. |
| 2015/0128733 A1 | 5/2015 | Taylor et al. |
| 2015/0130285 A1 | 5/2015 | Leahman et al. |
| 2015/0130293 A1 | 5/2015 | Haiimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leahman et al. |
| 2015/0162662 A1 | 6/2015 | Chen et al. |
| 2015/0162751 A1 | 6/2015 | Leahman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171516 A1 | 6/2015 | Chen et al. |
| 2015/0171656 A1 | 6/2015 | Leahman et al. |
| 2015/0171658 A1 | 6/2015 | Manoya-Elssibony et al. |
| 2015/0171931 A1 | 6/2015 | Won et al. |

(56) References Cited

U.S. PATENT DOCUMENTS

| | | |
|---|---|---|
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0180284 A1 | 6/2015 | Kang et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leahman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0236877 A1 | 8/2015 | Peng et al. |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0260835 A1 | 9/2015 | Widmer et al. |
| 2015/0262465 A1 | 9/2015 | Pritchett |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leahman et al. |
| 2015/0278558 A1 | 10/2015 | Priev et al. |
| 2015/0280429 A1 | 10/2015 | Makita et al. |
| 2015/0280484 A1 | 10/2015 | Radziemski et al. |
| 2015/0288074 A1 | 10/2015 | Harper et al. |
| 2015/0288214 A1 | 10/2015 | Bomgraber |
| 2015/0288438 A1 | 10/2015 | Maltsev et al. |
| 2015/0306063 A1 | 10/2015 | McGinnis et al. |
| 2015/0311585 A1 | 10/2015 | Church et al. |
| 2015/0312721 A1 | 10/2015 | Singh |
| 2015/0318729 A1 | 11/2015 | Leahman |
| 2015/0326024 A1 | 11/2015 | Bell et al. |
| 2015/0326070 A1 | 11/2015 | Petras et al. |
| 2015/0326072 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leahman |
| 2015/0333573 A1 | 11/2015 | Leahman |
| 2015/0333800 A1 | 11/2015 | Perry et al. |
| 2015/0339497 A1 | 11/2015 | Kurian |
| 2015/0340759 A1 | 11/2015 | Bridgelall et al. |
| 2015/0340903 A1 | 11/2015 | Bell et al. |
| 2015/0341087 A1 | 11/2015 | Moore et al. |
| 2015/0356482 A1 | 12/2015 | Whioole et al. |
| 2015/0358222 A1 | 12/2015 | Berger et al. |
| 2015/0365003 A1 | 12/2015 | Sadwick |
| 2015/0365137 A1 | 12/2015 | Miller et al. |
| 2015/0365138 A1 | 12/2015 | Miller et al. |
| 2016/0001136 A1 | 1/2016 | King et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013661 A1 | 1/2016 | Kurs et al. |
| 2016/0013677 A1 | 1/2016 | Bell et al. |
| 2016/0013855 A1 | 1/2016 | Campos |
| 2016/0020636 A1 | 1/2016 | Khlat |
| 2016/0028403 A1 | 1/2016 | McCaughan et al. |
| 2016/0033254 A1 | 2/2016 | Zeine et al. |
| 2016/0042206 A1 | 2/2016 | Pesavento et al. |
| 2016/0043571 A1 | 2/2016 | Kesler et al. |
| 2016/0043572 A1 | 2/2016 | Cooper et al. |
| 2016/0054395 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056664 A1 | 2/2016 | Partovi |
| 2016/0057268 A1 | 2/2016 | Jiang |
| 2016/0062319 A1 | 3/2016 | Kim et al. |
| 2016/0064959 A1 | 3/2016 | Jung et al. |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0087687 A1 | 3/2016 | Kesler et al. |
| 2016/0089987 A1 | 3/2016 | Ichikawa et al. |
| 2016/0094091 A1 | 3/2016 | Shin et al. |
| 2016/0094092 A1 | 3/2016 | Davlantes et al. |
| 2016/0099601 A1 | 4/2016 | Leahman et al. |
| 2016/0099611 A1 | 4/2016 | Leahman et al. |
| 2016/0099612 A1 | 4/2016 | Leahman et al. |
| 2016/0099614 A1 | 4/2016 | Leahman et al. |
| 2016/0099755 A1 | 4/2016 | Leahman et al. |
| 2016/0099757 A1 | 4/2016 | Leahman et al. |
| 2016/0112787 A1 | 4/2016 | Rich |
| 2016/0114687 A1 | 4/2016 | Ichikawa et al. |
| 2016/0126749 A1 | 5/2016 | Shichino et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0172890 A1 | 6/2016 | Jeong |
| 2016/0174162 A1 | 6/2016 | Nadakuduti et al. |
| 2016/0181849 A1 | 6/2016 | Govindaraj |
| 2016/0181867 A1 | 6/2016 | Daniel et al. |
| 2016/0181873 A1 | 6/2016 | Mitcheson et al. |
| 2016/0197511 A1 | 7/2016 | Atasoy et al. |
| 2016/0197522 A1 | 7/2016 | Zeine et al. |
| 2016/0202343 A1 | 7/2016 | Okutsu |
| 2016/0204642 A1 | 7/2016 | Oh |
| 2016/0204643 A1 | 7/2016 | Manova-Elssibony |
| 2016/0218545 A1 | 7/2016 | Schroeder et al. |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322833 A1 | 11/2016 | Moshfeghi et al. |
| 2016/0322868 A1 | 11/2016 | Akuzawa et al. |
| 2016/0323000 A1 | 11/2016 | Liu et al. |
| 2016/0325680 A1 | 11/2016 | Curtis et al. |
| 2016/0336804 A1 | 11/2016 | Son et al. |
| 2016/0339258 A1 | 11/2016 | Perryman et al. |
| 2016/0344098 A1 | 11/2016 | Ming |
| 2016/0359367 A1 | 12/2016 | Rothschild |
| 2016/0368510 A1 | 12/2016 | Simon et al. |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leahman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025887 A1 | 1/2017 | Hyun et al. |
| 2017/0025903 A1 | 1/2017 | Song et al. |
| 2017/0026087 A1 | 1/2017 | Tanabe |
| 2017/0033611 A1 | 2/2017 | Shin et al. |
| 2017/0040700 A1 | 2/2017 | Leung |
| 2017/0043675 A1 | 2/2017 | Jones et al. |
| 2017/0047784 A1 | 2/2017 | Jung et al. |
| 2017/0063168 A1 | 3/2017 | Uchida |
| 2017/0077733 A1 | 3/2017 | Jeong et al. |
| 2017/0077764 A1 | 3/2017 | Bell et al. |
| 2017/0077765 A1 | 3/2017 | Bell et al. |
| 2017/0077979 A1 | 3/2017 | Papa et al. |
| 2017/0077995 A1 | 3/2017 | Leahman |
| 2017/0085112 A1 | 3/2017 | Leahman et al. |
| 2017/0085120 A1 | 3/2017 | Leahman et al. |
| 2017/0085437 A1 | 3/2017 | Condeixa et al. |
| 2017/0092115 A1 | 3/2017 | Sloo et al. |
| 2017/0093229 A1 | 3/2017 | Sindia et al. |
| 2017/0110886 A1 | 4/2017 | Reynolds et al. |
| 2017/0110910 A1 | 4/2017 | Zeine et al. |

(56) References Cited

U.S. PATENT DOCUMENTS

| | | |
|---|---|---|
| 2017/0117756 A1 | 4/2017 | Muratov |
| 2017/0118714 A1 | 4/2017 | Kaechi |
| 2017/0127196 A1 | 5/2017 | Blum et al. |
| 2017/0134686 A9 | 5/2017 | Leahman |
| 2017/0141582 A1 | 5/2017 | Adolf et al. |
| 2017/0141583 A1 | 5/2017 | Adolf et al. |
| 2017/0141622 A1 | 5/2017 | Meichle |
| 2017/0163076 A1 | 6/2017 | Park et al. |
| 2017/0168595 A1 | 6/2017 | Sakaguchi et al. |
| 2017/0179763 A9 | 6/2017 | Leahman |
| 2017/0179771 A1 | 6/2017 | Leahman |
| 2017/0187422 A1 | 6/2017 | Hosseini |
| 2017/0214422 A1 | 7/2017 | Na et al. |
| 2017/0274787 A1 | 9/2017 | Salter et al. |
| 2017/0338695 A1 | 11/2017 | Port |
| 2017/0346349 A1 | 11/2017 | Shimokawa |
| 2018/0006611 A1 | 1/2018 | de Jong et al. |
| 2018/0012082 A1 | 1/2018 | Satazoda et al. |
| 2018/0040929 A1 | 2/2018 | Chaooelle |
| 2018/0048178 A1 | 2/2018 | Leahman |
| 2018/0090992 A1 | 3/2018 | Shrivastava et al. |
| 2018/0131449 A1 | 5/2018 | Kare et al. |
| 2018/0159338 A1 | 6/2018 | Leahman et al. |
| 2018/0198199 A1 | 7/2018 | Hosseini |
| 2018/0205265 A1 | 7/2018 | Park et al. |
| 2018/0212474 A1 | 7/2018 | Hosseini |
| 2018/0226840 A1 | 8/2018 | Leahman |
| 2018/0227018 A1 | 8/2018 | Moshfeghi |
| 2018/0241255 A1 | 8/2018 | Leahman |
| 2018/0248409 A1 | 8/2018 | Johnston |
| 2018/0262050 A1 | 9/2018 | Yankowitz |
| 2018/0262060 A1 | 9/2018 | Johnston |
| 2018/0269570 A1 | 9/2018 | Hosseini |
| 2018/0301934 A1 | 10/2018 | Prabhala et al. |
| 2018/0309314 A1 | 10/2018 | White et al. |
| 2018/0331581 A1 | 11/2018 | Hosseini |
| 2018/0337534 A1 | 11/2018 | Bell et al. |
| 2018/0343040 A1 | 11/2018 | Luzinski et al. |
| 2018/0375368 A1 | 12/2018 | Leahman et al. |
| 2018/0376235 A1 | 12/2018 | Leahman |
| 2019/0044392 A1 | 2/2019 | Chowdhury et al. |
| 2019/0052115 A1 | 2/2019 | Hosseini |
| 2019/0052979 A1 | 2/2019 | Chen et al. |
| 2019/0074133 A1 | 3/2019 | Contopanagos |
| 2019/0074722 A1 | 3/2019 | Shahsavari et al. |
| 2019/0074728 A1 | 3/2019 | Leahman |
| 2019/0074862 A1 | 3/2019 | Wang et al. |
| 2019/0130215 A1 | 5/2019 | Kaestle et al. |
| 2019/0131827 A1 | 5/2019 | Johnston |
| 2019/0229397 A1 | 7/2019 | Rizzo et al. |
| 2019/0288567 A1 | 9/2019 | Leahman et al. |
| 2019/0296586 A1 | 9/2019 | Moshfeghi |
| 2019/0326782 A1 | 10/2019 | Graham et al. |
| 2019/0363588 A1 | 11/2019 | Daetwyler et al. |
| 2019/0372384 A1 | 12/2019 | Hosseini et al. |
| 2019/0386522 A1 | 12/2019 | Park et al. |
| 2019/0393729 A1 | 12/2019 | Contopanagos et al. |
| 2019/0393928 A1 | 12/2019 | Leahman |
| 2020/0006988 A1 | 1/2020 | Leahman |
| 2020/0021128 A1 | 1/2020 | Bell et al. |
| 2020/0091608 A1 | 3/2020 | Alpman et al. |
| 2020/0112204 A1 | 4/2020 | Hosseini et al. |
| 2020/0144846 A1 | 5/2020 | Shin |
| 2020/0153117 A1 | 5/2020 | Papio-Toda et al. |
| 2020/0202145 A1 | 6/2020 | Mao et al. |
| 2020/0203837 A1 | 6/2020 | Komaros et al. |
| 2020/0225673 A1 | 7/2020 | Ebrahimi Afrouzi et al. |
| 2020/0235614 A1 | 7/2020 | Swan et al. |
| 2020/0244102 A1 | 7/2020 | Leahman et al. |
| 2020/0244104 A1 | 7/2020 | Kataiamaki et al. |
| 2020/0244111 A1 | 7/2020 | Johnston et al. |
| 2020/0274397 A1 | 8/2020 | Hwang et al. |
| 2020/0313464 A1 | 10/2020 | Leahman |
| 2020/0403452 A1 | 12/2020 | Leahman |
| 2021/0091602 A1 | 3/2021 | Woo |
| 2021/0104919 A1 | 4/2021 | Leahman |
| 2021/0135502 A1 | 5/2021 | Lin et al. |
| 2021/0135510 A1 | 5/2021 | Lin et al. |
| 2021/0152922 A1 | 5/2021 | Leahman et al. |
| 2021/0184503 A1 | 6/2021 | Leahman |
| 2021/0184509 A1 | 6/2021 | Muryanto et al. |
| 2021/0296936 A1 | 9/2021 | Hosseini |
| 2021/0313840 A1 | 10/2021 | Leahman et al. |
| 2021/0313841 A1 | 10/2021 | Johnston et al. |
| 2021/0320529 A1 | 10/2021 | Sengupta et al. |

FOREIGN PATENT DOCUMENTS

| | | |
|---|---|---|
| CN | 101465471 A | 6/2009 |
| CN | 101496222 A | 7/2009 |
| CN | 201278367 Y | 7/2009 |
| CN | 101507044 A | 8/2009 |
| CN | 101630357 A | 1/2010 |
| CN | 101699709 A | 4/2010 |
| CN | 102004442 A | 4/2011 |
| CN | 102027690 A | 4/2011 |
| CN | 102089952 A | 6/2011 |
| CN | 102227884 A | 10/2011 |
| CN | 102292896 A | 12/2011 |
| CN | 102474109 A | 5/2012 |
| CN | 202333847 U | 7/2012 |
| CN | 102860037 A | 1/2013 |
| CN | 103151848 A | 6/2013 |
| CN | 103296767 A | 9/2013 |
| CN | 103348563 A | 10/2013 |
| CN | 103594776 A | 2/2014 |
| CN | 103683443 A | 3/2014 |
| CN | 104040789 A | 9/2014 |
| CN | 203826555 U | 9/2014 |
| CN | 104090265 A | 10/2014 |
| CN | 104113814 A | 10/2014 |
| CN | 104167773 A | 11/2014 |
| CN | 104347915 A | 2/2015 |
| CN | 104584449 A | 4/2015 |
| CN | 104617680 A | 5/2015 |
| CN | 104659927 A | 5/2015 |
| CN | 105207373 A | 12/2015 |
| CN | 105491472 A | 4/2016 |
| CN | 105762946 A | 7/2016 |
| CN | 105765821 A | 7/2016 |
| CN | 105932407 A | 9/2016 |
| CN | 106329116 A | 1/2017 |
| CN | 103380561 B | 9/2017 |
| CN | 110098669 A | 8/2019 |
| DE | 20016655 U1 | 2/2002 |
| DE | 102013216953 A1 | 2/2015 |
| DE | 102014219679 A1 | 3/2016 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 2747195 A1 | 6/2014 |
| EP | 3067983 A1 | 9/2016 |
| EP | 3118970 A1 | 1/2017 |
| EP | 3145052 A1 | 3/2017 |
| EP | 3496231 A1 | 6/2019 |
| GB | 2404497 A | 2/2005 |
| GB | 2556620 A | 6/2018 |
| JP | H 06327172 | 11/1994 |
| JP | 2000323916 A | 11/2000 |
| JP | 2002209343 A | 7/2002 |
| JP | 2002319816 A | 10/2002 |
| JP | 2006157586 A | 6/2006 |
| JP | 2007043432 A | 2/2007 |
| JP | 2007135335 A | 5/2007 |
| JP | 2008092704 A | 4/2008 |
| JP | 2008167017 A | 7/2008 |
| JP | 2008295176 A | 12/2008 |
| JP | 2009071835 A | 4/2009 |
| JP | 2009525715 A | 7/2009 |
| JP | 2009201328 A | 9/2009 |
| JP | 2009290764 A | 12/2009 |
| JP | 2011083078 A | 4/2011 |

(56) References Cited

FOREIGN PATENT DOCUMENTS

| | | | |
|---|---|---|---|
| JP | 2011514781 A | 5/2011 |
| JP | 2012016171 A | 1/2012 |
| JP | 2012023950 A | 2/2012 |
| JP | 2012095226 A | 5/2012 |
| JP | 2012157167 A | 8/2012 |
| JP | 2013099249 A | 5/2013 |
| JP | 2013162624 A | 8/2013 |
| JP | 2014501080 A | 1/2014 |
| JP | 2014075927 A | 4/2014 |
| JP | 2014112063 A | 6/2014 |
| JP | 2014176125 A | 9/2014 |
| JP | 2014176131 A | 9/2014 |
| JP | 2014223018 A | 11/2014 |
| JP | 2015027345 A | 2/2015 |
| JP | 2015128349 A | 7/2015 |
| JP | 2015128370 A | 7/2015 |
| JP | 2015139276 A | 7/2015 |
| JP | 2017034935 A | 2/2017 |
| JP | WO2015177859 | 4/2017 |
| KR | 20060061776 A | 6/2006 |
| KR | 20070044302 A | 4/2007 |
| KR | 100755144 B1 | 9/2007 |
| KR | 100819604 B1 | 4/2008 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| KR | 20140023409 A | 2/2014 |
| KR | 20140023410 A | 3/2014 |
| KR | 20140025410 A | 3/2014 |
| KR | 20140085200 A | 7/2014 |
| KR | 20140148270 A | 12/2014 |
| KR | 20150077678 A | 7/2015 |
| KR | 20160018826 A | 2/2016 |
| KR | 20160087671 A | 7/2016 |
| KR | 20180108317 A | 10/2018 |
| KR | 20180114721 A | 10/2018 |
| RU | 2658332 C1 | 6/2018 |
| WO | WO 199508125 A1 | 3/1995 |
| WO | WO 199831070 A1 | 7/1998 |
| WO | WO 199952173 A1 | 10/1999 |
| WO | WO 2000111716 A1 | 2/2001 |
| WO | WO 2003091943 A1 | 11/2003 |
| WO | WO 2004077550 A1 | 9/2004 |
| WO | WO 2006122783 A2 | 11/2006 |
| WO | WO 2007070571 A2 | 6/2007 |
| WO | WO 2008024993 A2 | 2/2008 |
| WO | WO 2008156571 A2 | 12/2008 |
| WO | WO 2010022181 A1 | 2/2010 |
| WO | WO 2010039246 A1 | 4/2010 |
| WO | WO 2010116441 A1 | 10/2010 |
| WO | WO 2010138994 A1 | 12/2010 |
| WO | WO 2011112022 A2 | 9/2011 |
| WO | WO 2012153529 A1 | 11/2012 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013088238 A2 | 6/2013 |
| WO | WO 2013105920 A2 | 7/2013 |
| WO | WO 2013175596 A1 | 11/2013 |
| WO | WO 2014068992 A1 | 5/2014 |
| WO | WO 2014075103 A1 | 5/2014 |
| WO | WO 2014113093 A1 | 7/2014 |
| WO | WO 2014132258 A1 | 9/2014 |
| WO | WO 2014134996 A1 | 9/2014 |
| WO | WO 2014156465 A1 | 10/2014 |
| WO | WO 2014170773 A2 | 10/2014 |
| WO | WO 2014182788 A2 | 11/2014 |
| WO | WO 2014182788 A3 | 11/2014 |
| WO | WO2014194061 A2 | 12/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015130902 A1 | 9/2015 |
| WO | WO 2015161323 A1 | 10/2015 |
| WO | WO 2016024869 A1 | 2/2016 |
| WO | WO 2016048512 A1 | 3/2016 |
| WO | WO 2016088261 A1 | 6/2016 |
| WO | WO 2016187357 A1 | 11/2016 |
| WO | WO2021094930 A1 | 5/2021 |

* cited by examiner

FIG. 13B   1300B

1302B: providere a rechargeable power bank comprising: a charging system comprising a controller coupled to a receiving system in electrical communication with an electrical storage device; configured to harvest energy from one or more directional electromagnetic energy beams provided by an external wireless charging system over a distance of greater than about 50 cm, convert the harvested energy into electrical energy, and direct the electrical energy into the electrical storage device, wherein the controller is configurable to direct or not direct the electrical energy from the electrical storage device into an attached electronic device to power and/or recharge the attached electronic device based on one or more authorization criteria;

1304B: directing one or more directional electromagnetic energy beams provided by an external wireless charging system over a distance of greater than about 50 cm to a location of the power bank;

1306B: harvesting energy from one or more directional electromagnetic energy beams provided by an external wireless charging system over a distance of greater than about 50 cm, convert the harvested energy into electrical energy, and directing the electrical energy into the electrical storage device;

1308B: directing electrical energy from the electrical storage device into an attached electronic device to power and/or recharge the attached electronic device based on one or more authorization criteria

1310B: direct at least one secondary directional electromagnetic energy beam from the rechargeable power bank towards a location of at least one second rechargeable power bank, utilizing at least a portion of the energy stored in the electrical storage device, independent of a status of the rechargeable power bank and/or the attached electronic device, wherein the at least one second rechargeable power bank is configured to harvest energy from one or more of the secondary directional electromagnetic energy beams and convert the harvested energy into electrical energy and direct at least a portion of the electrical energy into a corresponding second electrical storage device.

RECHARGEABLE WIRELESS POWER BANK AND METHOD OF USING

CROSS REFERENCE TO RELATED APPLICATIONS

The present application is claims priority to U.S. Provisional Pat. App. 63/318,620 filed Mar. 10, 2022, and is a continuation-in-part of U.S. patent application Ser. No. 17/699,092, filed Mar. 19, 2022, now U.S. Pat. No. 11,462,949 issued Oct. 4, 2022, which is a continuation-in-part of U.S. patent application Ser. No. 17/163,001, filed Jan. 29, 2021, which is a continuation-in-part of U.S. patent application Ser. No. 17/033,824, filed Sep. 27, 2020, and is a continuation-in-part of U.S. patent application Ser. No. 17/033,824, filed Sep. 27, 2020, which is a continuation in part of U.S. patent application Ser. No. 17/019,312, filed Sep. 13, 2020; now U.S. Pat. No. 11,557,927 issued Aug. 12, 2021, which is a continuation in part of U.S. patent application Ser. No. 16/482,347, filed Jul. 31, 2019, now U.S. Pat. No. 10,992,158 issued Apr. 27, 2021, which is a 35 U.S.C. § 371 National Stage patent application of International Pat. App. PCT/US18/15625, filed on Jan. 28, 2018, which is a Continuation-in-Part of U.S. patent application Ser. No. 15/640,574, filed Jul. 2, 2017, now U.S. Pat. No. 9,985,465 issued May 29, 2018, all of which claim priority to U.S. Provisional Pat. App. 62/506,737, filed May 16, 2017. The disclosures of all the above patents, provisional applications and non-provisional patent applications are hereby incorporated herein by reference.

BACKGROUND

This invention relates to a wireless charging method and system for charging an electronic power-consuming device.

Microwave radio frequency (RF) technology has enabled transformative changes in our society via innovations such as wireless communication, radio wave sensing and wireless power transfer. In relation to the power needs of mobile devices, RF technology offers a new vision of wirelessly powered world. This can be realized through a wireless power transmission grid, which could be applied for a range of applications from traditional mobile phones to wearable health and fitness devices, implantable devices, and other Internet of Things (IoT) type devices. This vision is specially becoming true on account of ever reducing power usage of modern electronics and innovations in rechargeable batteries.

Because of the growth of mobile computing and wearables, the demand for wireless sources of power is increasing for the scenarios where cable-based charging is not feasible or where the issue of battery depletion and replacement exists. Among wireless approaches, magnetic near-field wireless charging is popular, but the wireless charging distances are limited to a few centimeters. For a most ergonomic use and daily life convenience, wireless charging up to several feet is necessary. This is where the radiative near-zone and far zone charging methodologies are becoming mainstream while using the open ISM frequency bands and adhering to the power limits in accordance with FDA and FCC guidelines. A second issue is charging during significant misalignment between the source and receiver, providing a wider region of charging, as compared to specific hot-spot charging. This can be seen as a significant step in achieving a practical wireless power grid.

Power charging requirements of commercially available phones are significant. Typically, an electronic smartphone battery requires power level between 20 mW and 1.3 W, which is significantly higher than the power consumed by the sub-mW sensor nodes, and other IoT devices. There is a need in the art for an efficient wireless powering solution to power and/or recharge a device within several feet of the charging station and which follows the device upon movement.

SUMMARY

In one aspect, an embodiment provides a rechargeable power bank, also referred to herein as a "power bank" or as the "device", comprising a charging system comprising a controller coupled to a receiving system in electrical communication with an electrical storage device; configured to harvest energy from one or more directional electromagnetic energy beams provided by an external wireless charging system over a distance of greater than about 50 cm, convert the harvested energy into electrical energy, and direct the electrical energy into the electrical storage device, wherein the controller is configurable to direct or not direct the electrical energy from the electrical storage device into an attached electronic device to power and/or recharge the attached electronic device based on one or more authorization criteria.

In embodiments, the rechargeable power bank is physically separate from the attached electronic device. In some of such embodiments, the power bank comprises a power outlet which is releasably attachable to a power inlet of the electronic device. In embodiments, the power outlet comprises a releasable electrical connector, a near field (i.e., less than 10 cm from charger to receiver) inductive power charger, or a combination thereof.

In embodiments, the power bank further comprises an intermediate electrical storage device configured and arranged to receive electrical energy from the receiving system and provide electrical energy to the electrical storage device.

In embodiments, the controller is configured to control the receiving system to receive and harvest energy from the directional electromagnetic energy beams provided by the external wireless charging system and/or control the directing of electrical energy into the intermediate electrical storage device when present, and/or control the directing of electrical energy into the electric storage device; and/or control the directing of the electrical energy from the electrical storage device to the attached electronic device.

In embodiments, the power bank is configured to establish an instance of bidirectional electronic communication with the external wireless charging system, request power from the external wireless charging system; and/or provide authorization information to the external wireless charging system. In some of such embodiments, the bidirectional electronic communication with the external wireless charging system comprises direct and/or indirect electronic communication via: a local area data network; an ad-hoc data network; a wide area data network; a wireless computer network; a meshed network; a wired computer network; the internet; a radio data network; a cellular data network; a cellular data network provided at least in part by the electronic device; a wireless power grid local area network; an ad hoc wireless power grid local area network; a meshed ad hoc wireless power grid local area network; or a combination thereof.

In embodiments, the one or more authorization criteria comprises an authorization status of whether or not i) the rechargeable power bank is authorized to receive wireless charging from the wireless charging system; ii) the attached electronic device is authorized to receive wireless charging from the wireless charging system; and/or iii) the attached electronic device is authorized to receive electrical energy from the rechargeable power bank; based on one or more predetermined criteria.

In embodiments, the authorization criteria includes an authorization key; a lookup table; an identifier unique to the device receiver; an identifier unique to the electronic device; a user account; a service subscription; a prepaid subscription; a blockchain permission; a blockchain transaction; or a combination thereof.

In embodiments, the controller is configured to cause the attached electronic device to present an indication perceivable by an end user of the electronic device, indicating the authorization status.

In embodiments, the power bank is configured such that when the determination of the authorization status results in the rechargeable power bank and/or the attached electronic device not being authorized to receive wireless charging from the wireless charging system, and/or the attached electronic device is not authorized to receive electrical energy from the rechargeable power bank, the controller is configured to prevent the directing of the electrical energy from the electrical storage device to the attached electronic device.

In embodiments, the power bank is configured such that when the determination of the authorization status results in the rechargeable power bank and/or the attached electronic device not being authorized to receive wireless charging from the wireless charging system, and/or the attached electronic device is not authorized to receive electrical energy from the rechargeable power bank, the controller configures the receiving system to harvest energy from one or more directional electromagnetic energy beams provided by the external wireless charging system, convert the harvested energy into electrical energy, and direct the electrical energy into the electrical storage device and to prevent the directing of the electrical energy from the electrical storage device to the attached electronic device.

In embodiments, the power bank is configured such that when the determination of the authorization status results in the rechargeable power bank and/or the attached electronic device not being authorized to receive wireless charging from the wireless charging system, and/or the attached electronic device is not authorized to receive electrical energy from the rechargeable power bank, the controller is configured to cause the attached electronic device to present an indication perceivable by the end user of the electronic device allowing the end user to change the authorization status of the rechargeable power bank to being authorized to receive wireless charging from the wireless charging system, wherein the changing of the authorization status comprises a financial transaction. In embodiments, the financial transaction includes a blockchain transaction, a cryptocurrency transaction, or a combination thereof.

In embodiments, the power bank is configured such that wherein the determining of the authorization status results in the rechargeable power bank and/or the attached electronic device as being authorized to receive wireless charging from the wireless charging system, and/or the attached electronic device is authorized to receive electrical energy from the rechargeable power bank, the controller configures the receiving system to receive wireless charging from the wireless charging system according to one or more configuring criteria, and/or the controller allows the directing of electrical energy from the electrical storage device to the attached electronic device.

In embodiments, the power bank is configured to request wireless charging from the external wireless charging system based on a request or a status of the attached electronic device. In embodiments, the power bank is configured to request wireless charging from the external wireless charging system independent of any attached electronic device.

In embodiments, the power bank is configured to request wireless charging from the external wireless charging system based at least on a level of charge of the electrical storage device.

In embodiments, the power bank is configurable to allow the directing of electric energy from the electric storage device to the attached electronic device independent of and/or in the absence of any external wireless charging system. In some of such embodiments, the directing of electric energy from the electric storage device to the attached electronic device independent of and/or in the absence of any external wireless charging system comprises electronic communication between the power bank and a remote system.

In embodiments, the power bank is configured for peer-to-peer power transmission, wherein the rechargeable power bank further comprises a transmitter and/or a transceiver configurable for electronic communication with another rechargeable power bank, and the controller configurable to direct at least one secondary directional electromagnetic energy beam from the rechargeable power bank towards a location of at least one second rechargeable power bank, utilizing at least a portion of the energy stored in the electrical storage device, independent of a status of the rechargeable power bank and/or the attached electronic device, wherein the at least one second rechargeable power bank is configured to harvest energy from one or more of the secondary directional electromagnetic energy beams and convert the harvested energy into electrical energy and direct at least a portion of the electrical energy into a corresponding second electrical storage device.

In embodiments, the power bank is configured to form a meshed ad-hoc wireless power grid local area network with the external wireless charging system and/or other rechargeable power banks comprising directional wireless charger system-to-rechargeable power bank power distribution, and/or peer-to-peer directional wireless rechargeable power bank-to-rechargeable power bank power distribution, in which each of the rechargeable power banks and each of the wireless charger systems present are nodes of the meshed network.

In some of such embodiments, the meshed ad-hoc wireless power grid local area network comprises a WiGL routing policy comprising a system of defined rules embodied in machine instructions and/or software and/or hardware configured to make and/or guide decisions in transferring energy wirelessly to electronic devices, a WiGL routing table comprising a data structure of defined rules that can be queried by machine instructions and/or software and/or hardware configured to make and/or guide decisions in transferring energy to electronic devices.

In embodiments, the power bank comprises a converter that is constructed to harvest electrical energy from directional electromagnetic energy beams transmitted over a distance greater than about 50 cm, and convert the energy into direct current, a base band processor, a radio frequency processor, one or more oscillators, one or more band pass filters, one or more phase shifters, one or more power amplifiers, an antenna, preferably a multidirectional antenna array configured to receive and/or emit substantially wireless directional energy beams.

BRIEF DESCRIPTION OF THE DRAWINGS

A wide variety of potential practical and useful embodiments will be more readily understood through the following detailed description of various embodiments, with reference to the accompanying drawings in which.

DETAILED DESCRIPTION

Figure 1:
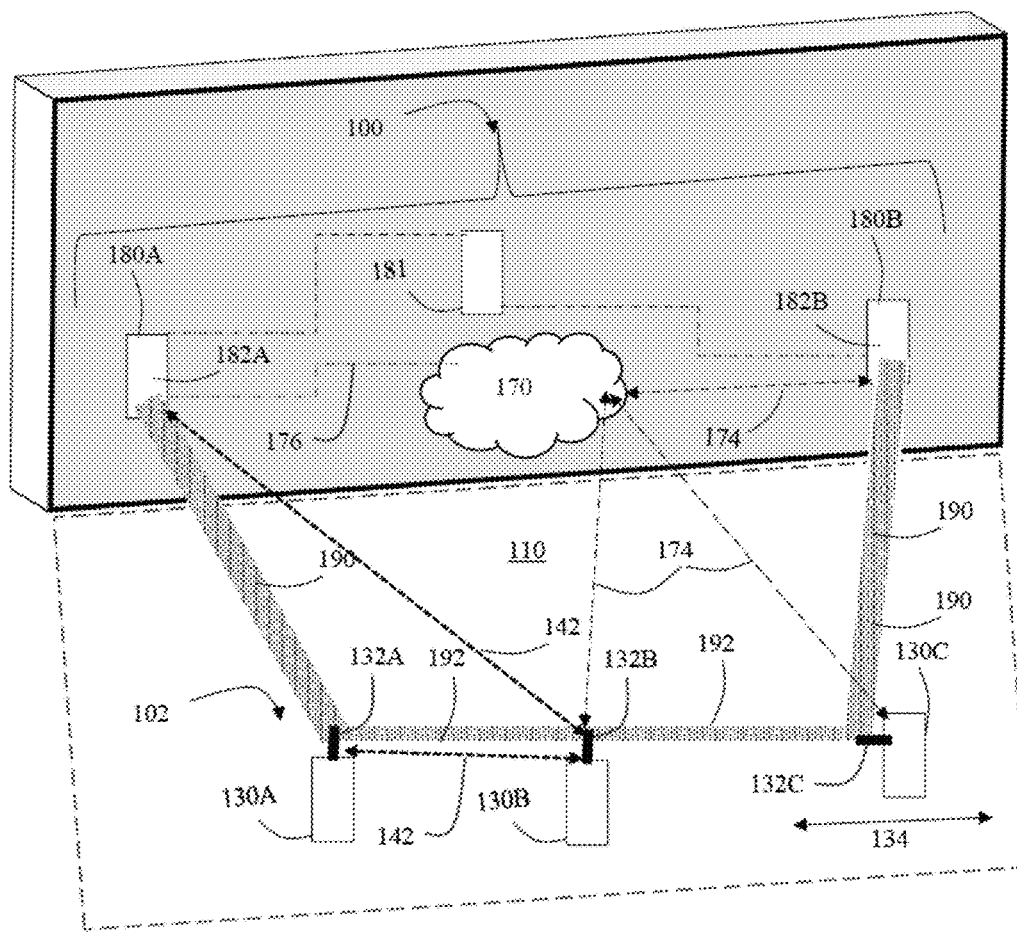
FIG. 1 is a block diagram of a system according to an embodiment disclosed herein.

At the outset, it should be noted that in the development of any such actual embodiment, numerous implementation-specific decisions must be made to achieve the developer's specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of this disclosure. In addition, the article, construction, and/or system used/disclosed herein can also comprise components other than those cited.

In the summary and this detailed description, each numerical value should be read once as modified by the term "about" (unless already expressly so modified), and then read again as not so modified unless otherwise indicated in context.

Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specifically, it is to be understood that inventors appreciate and understand that any and all data points within the range are to be considered to have been specified, and that inventors possessed knowledge of the entire range and all points within the range.

It is to be understood that various embodiments of the present disclosure will be described with reference to the accompanying drawings. Accordingly, those of ordinary skill in the art will recognize that modifications, equivalents, and/or alternatives of the various embodiments described herein can be made without departing from the scope and spirit of the present disclosure. With regard to description of drawings, similar components may be marked by similar reference numerals.

For use herein, the expressions "have", "may have", "include", "comprise", "may include", and "may comprise" indicate the existence of corresponding features (e.g., such as numeric values, functions, operations, or components) but do not exclude the presence of additional features.

In the present disclosure, expressions such as, "A or B" represents an alternative selection which, for example, refer to the case (1) where A is included or (2) where B is included, but does not represent the case where both A and B are included.

In the present disclosure, expressions such as, "A and/or B", "at least one of A and/or B", "one or more of A and/or B", and the like, refer to a case which may include any and all combinations of one or more of the associated listed items. For example, the terms "A and/or B", and "at least one of A or B" may refer to the case (1) where A is included, (2) where B is included, or (3) where both A and B are included.

Terms such as "first", "second", and the like used herein may refer to various elements of various embodiments disclosed herein, but it is to be understood that these labels do not limit the elements to any particular order, amount, or importance; such terms are used only to distinguish an element from another element and do not limit the order and/or priority of the elements. For example, a first user device and a second user device may represent different user devices irrespective of sequence or importance. Likewise, such terms are used relative to others and do not represent absolute location, place, or order. For example, without departing from the scope of the present disclosure, a first element of one embodiment may be referred to as a second element in another embodiment, and similarly, a second element may be referred to as a first element.

It will be understood that when an element (for example, a first element) is referred to as being coupled, configured, operatively or communicatively "coupled with/to" or "connected to" another element (for example, a second element), it can be directly coupled with/to or connected to the other element or an intervening element (for example, a third element or more) may be present between the two elements disclosed.

As used herein, the expression "configured to" used herein may be used interchangeably with, for example, the expression "suitable for", "having the capacity to", "designed to", "adapted to", "made to", or "capable of". The term "configured to (or set to)" does not mean only "specifically designed to" in hardware. Instead, the expression "a device configured to" may mean that the device is "capable of" operating together with another device or other components. For example, an "electronic memory assembly" configured to (or set to) store data for subsequent retrieval, refers to any such memory module or modules, with the associated circuitry, power source, and programming which render it capable of performing the corresponding operation of storage and retrieval utilizing a generic-purpose processor (e.g., a central processing unit (CPU) or an application processor) which may perform corresponding operations by executing one or more software programs which are stored on the memory device.

The various illustrative logical blocks, modules and the like described in connection with the present disclosure may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The controller and/or processor refers to a controlling system which typically includes a processor and the related circuitry and components, e.g., power source, memory, storage, processors, coprocessors, gates, relays, other integrated circuits, software, and/or the like, necessary for its function. The processor may be responsible for managing general processing, including the execution of software stored on a machine-readable media. The processor may be implemented with one or more general-purpose and/or special-purpose processors.

Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may comprise a computer-readable medium having instructions stored (and/or encoded) thereon, the instructions being executable by one or more processors to perform the operations described herein and be embodied in a computer-program product.

Computer readable medium may also include, by way of example, a carrier wave, a transmission line, and any other suitable medium for transmitting software and/or instructions that may be accessed and read by a computer or the processor. The non-transient computer readable medium may reside in the device, external to the device, or distributed across multiple entities including the device. The non-transient computer readable medium may be embodied in a computer program product. Those skilled in the art will recognize how best to implement the described functionality presented throughout this disclosure depending on the particular application and the overall design constraints imposed on the overall system.

Within the present disclosure, the word "exemplary" and/or "preferably" are used to mean "serving as an example, instance, or illustration." Any implementation or aspect described herein as "exemplary" and/or "preferably" are not necessarily to be construed as preferred or advantageous over other aspects of the disclosure in an overall limiting sense, but only in relation to specific embodiments. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The terms used herein are used to describe specific embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning as that generally understood by a person skilled in the art to which the present disclosure pertains. It will be further understood that terms, which are defined in a dictionary and commonly used, should also be interpreted as is customary in the relevant related art and not in an idealized or overly formal manner unless expressly so defined herein. In some cases, even if terms are defined in the specification, they may not be interpreted to exclude embodiments of the present disclosure.

In various embodiments of the present disclosure, the electronic components referred to in embodiments of the device are not limited to currently known devices but may include new electronic devices suitable for the intended purpose which are subsequently produced due to the development of new technologies.

As used herein, the term "determining" encompasses a wide variety of actions. For example, "determining" may include calculating, computing, processing, deriving, investigating, looking up (e.g., looking up in a table, a database, or another data structure), ascertaining and the like. Also, "determining" may include receiving (e.g., receiving information), accessing (e.g., accessing data in a memory) and the like. Furthermore, "determining" may include resolving, selecting, choosing, establishing and the like. Likewise, "controlling" encompasses a wide variety of actions, the totality of which results in the functioning of the device for the intended purpose.

The following detailed description is of the best currently contemplated modes of carrying out the various aspects of the disclosure. The description is not to be taken in a limiting sense, but is made merely for the purpose of illustrating the general principles of the aspects of the disclosure.

For purposes herein, a network refers to two or more network devices coupled so that signal communications, such as in the form of signal packets, for example, may be exchanged, such as between a server and a client device and/or other types of devices, including between wired devices, wireless devices and/or the like. Unless indicated otherwise, this term (these terms) are used according to their plain and common understanding in the art.

For purposes herein, a cellular network refers to a radio network distributed over land through cells where each cell includes a fixed location transceiver known as base station. These cells together provide radio coverage over geographical areas. Unless indicated otherwise, this term (these terms) are used according to their plain and common understanding in the art.

As used herein, a local area network (LAN) refers to a collection of devices connected together in one general location, and is not limited in size or scale. A wide area network WAN, also referred to as a metropolitan area network MAN, which covers a larger geographic areas relative to a LAN, and may include any number of LANs. Unless indicated otherwise, these terms are used according to their plain and common understanding in the art.

For purposes herein, the electronic device may include a suitable receiver, or may be equipped or otherwise associated with a suitable receiver according to embodiments disclosed herein, e.g., a WiGL receiver. For example, the WiGL receiver may be integral to a device and/or may be a dongle or other externally attachable attachment to the electronic device. Unless specified, reference to the electronic device is used interchangeably with the receiver, e.g., the WiGL receiver.

In embodiments, a method comprises the steps of providing a wireless charging system comprising one or more power chargers comprising one or more transmitting antennas configured to direct one or more directional electromagnetic energy beams to a receiver of the power bank located within a physical space, wherein the power bank and/or the electronic device is adapted to issue a request to the wireless charging system, and wherein a receiver of the power bank is adapted to receive and convert one or more electromagnetic energy beams provided by the wireless charging system to electrical energy in an amount sufficient to power and/or charge the power bank and/or the electronic device; determining a location of the power bank and/or the electronic device within the physical space; upon receiving a request from the power bank and/or the electronic device; directing one or more directional electromagnetic energy beams from the one or more transmitting antennas towards the receiver of the power bank at or near the determined location within the physical space in an amount sufficient to power and/or charge the power bank and/or the electronic device. In embodiments, upon motion of the power bank and/or the electronic device within the physical space, updating the location of the power bank and/or the electronic device therein; and redirecting at least one of the plurality of the directional electromagnetic energy beams from the one or more transmitting antennas toward the receiver of the power bank at or near the updated location in an amount sufficient to power and/or charge the power bank and/or the electronic device.

In one or more embodiments, the method further comprises establishing an instance of electronic communication between the wireless charging system and the power bank and/or the electronic device. In some embodiments, an instance of bidirectional electronic communication is established between the wireless charging system and the power bank and/or the electronic device.

In embodiments, the electronic communication between the wireless charging system and the power bank and/or the electronic device comprises direct and/or indirect electronic communication via:

a local area network; an ad-hoc network; a wide area network; a wireless computer network; a wired computer network; a cellular data network; a cellular data network provided at least in part by the power bank and/or the electronic device; or a combination thereof.

In one or more embodiments, the method further comprises determining a status of the power bank and/or the electronic device. In some embodiments, the determining of the status of the power bank and/or the electronic device is conducted prior to and/or coincident which receiving the request from the power bank and/or the electronic device; after receiving the request from the power bank and/or the electronic device; prior to and/or coincident with determining the location of the power bank and/or the electronic device within the physical space; after determining the location of the power bank and/or the electronic device within the physical space; prior to and/or coincident with updating the location of the power bank and/or the electronic device within the physical space; after updating the location of the power bank and/or the electronic device within the physical space; prior to and/or coincident with receiving of a request from the power bank and/or the electronic device; after receiving of a request from the power bank and/or the electronic device; or any combination thereof.

In one or more embodiments, the determining of a status comprises determination of an authorization status. The determination of an authorization status comprised making a determination of whether or not (if) the power bank and/or the electronic device is authorized to receive wireless charging from the wireless charging system, and/or the electronic device is authorized to receive electrical power from the power bank, or is not authorized to receive wireless charging from the wireless charging system and/or the electronic device not being authorized to receive electrical power from the power bank. In embodiments, this determination is based on one or more predetermined authorization criteria.

In embodiments, the authorization criteria includes any one of an authorization key, a lookup table, an identifier unique to the power bank and/or the electronic device, an indication of the power bank and/or the electronic device comprising an active service subscription, an indication of the power bank and/or the electronic device comprising an active prepaid subscription, or a combination thereof.

In some embodiments, the determining of the authorization status of the power bank and/or the electronic device comprises determining if the power bank and/or the electronic device is, or is not associated with a user account which is predetermined to be authorized to receive wireless charging from the wireless charging system, based on one or more predetermined criteria.

In one or more embodiments, the method may further cause the electronic device to present an indication perceivable by an end user of the electronic device, e.g., a text message, a webpage, a vibration, sound, or automated telephone call, indicating the authorization status of the power bank and/or the electronic device. In some embodiments in which the determining of the authorization status results in the power bank and/or the electronic device not being authorized to receive wireless charging from the wireless charging system and/or the electronic device not being authorized to receive electrical power from the power bank, the method may further comprise causing the electronic device to present an indication perceivable by the end user of the electronic device as outlined above, that allows the end user to change the authorization status of the power bank and/or the electronic device to being authorized to receive wireless charging from the wireless charging system and/or the electronic device being authorized to receive power from the power bank. For example, an opportunity to purchase a subscription or for a period of time to allow the device to be charged.

In some embodiments, the allowing the end user to change the authorization status of the power bank and/or the electronic device to being authorized to receive wireless charging from the wireless charging system comprises a request for, and a verification of a financial transaction resulting in a transfer of funds, e.g., authorize and/or make a payment via a payment system, e.g., an online payment system. In embodiments, the financial transaction includes a blockchain transaction.

In embodiments, the determining of the authorization status results in the power bank and/or the electronic device being authorized to receive wireless charging from the wireless charging system, and/or the electronic device is authorized to receive electrical power from the power bank, (i.e., a positive authorization result), the method further comprises configuring the receiver of the power bank to receive wireless charging from the wireless charging system and/or allowing the attached electronic device to receive power from the power bank, according to one or more configuring criteria and/or the method further comprises the directing of one or more directional electromagnetic energy beams from the one or more transmitting antennas towards the receiver of the power bank at or near the determined location within the physical space in an amount sufficient to power and/or charge the power bank and/or the electronic device according to one or more of the configuring criteria and/or directing electrical power from the power bank to the electronic device. In embodiments, the configuring criteria may include one or more of a time stamp; a level of charge of the power bank and/or the electronic device; an identification variable specific to the power bank and/or the electronic device; a predetermined criteria, e.g., set by the end user, the charging system, and/or the like; or any combination thereof.

In embodiments wherein the determining of a status comprises a determination of one or more physical properties and/or states of the power bank and/or the electronic device. In such embodiments, the directing of the one or more directional electromagnetic energy beams from the one or more transmitting antennas towards the receiver of the power bank at or near the determined location within the physical space in an amount sufficient to power and/or charge the power bank and/or the electronic device is based at least in part on at least one of the determined properties, such as one or more physical properties and/or states of the power bank and/or the electronic device and/or is based on one or more predetermined authorization criteria.

In embodiments wherein the determining of the authorization status results in the power bank and/or the electronic device not being authorized to receive wireless charging from the wireless charging system and/or the electronic device not being authorized to receive electrical power from the power bank, (i.e., a negative authorization result), the method may further comprise configuring the receiver and/or the power bank and/or the electronic device to prevent the electronic device from receiving at least some or a portion of the wireless charging beam from the wireless charging system and/or the power bank.

In one or more embodiments of the method, wherein the determining of the authorization status results in the power bank and/or the electronic device not being authorized to receive wireless charging from the wireless charging system and/or the electronic device not being authorized to receive electrical power from the power bank, the method may further comprise directing one or more directional electromagnetic energy beams from the one or more transmitting antennas to avoid the determined location of the receiver of the power bank within the physical space, and/or stopping transmission and/or not directing one or more electromagnetic energy beams from the one or more transmitting antennas towards the receiver of the power bank, to at least partially prevent the receiver of the power bank from receiving one or more of the electromagnetic energy beams from the one or more transmitting antennas.

In an embodiment, a method comprises providing a wireless charging system according to one or more embodiments disclosed herein comprising one or more power chargers comprising one or more transmitting antennas configured to direct one or more directional electromagnetic energy beams to a receiver of the power bank located within a physical space, wherein the power bank and/or the electronic device is adapted to issue a request to the wireless charging system to initialize charging or in response to a request from the wireless charging system, and wherein a receiver of the power bank (which may be integral to the device or attached to the device) is adapted to receive and convert one or more electromagnetic energy beams provided by the wireless charging system to electrical energy in an amount sufficient to power and/or charge the power bank and/or the electronic device; determining a location of the power bank and/or the electronic device within the physical space; establishing an instance of electronic communication between the wireless charging system and the power bank and/or the electronic device; determining a status of the power bank and/or the electronic device comprising determination of an authorization status, comprising a determination of if the power bank and/or the electronic device is, or is not authorized to receive wireless charging from the wireless charging system and/or the electronic device not being authorized to receive electrical power from the power bank, based on one or more predetermined authorization criteria, wherein upon receiving a request from the electronic device which has been determined to be authorized to receive wireless charging from the wireless charging system: configuring the electronic device to receive wireless charging from the wireless charging system according to one or more configuring criteria; and/or configuring the power bank to receive wireless charging from the wireless charging system according to one or more configuring criteria; and/or configuring the power bank to direct electrical energy to the electronic device according to one or more configuring criteria; directing of one or more directional electromagnetic energy beams from the one or more transmitting antennas towards the receiver of the power bank at or near the determined location within the physical space in an amount sufficient to power and/or charge the electronic device according to one or more of the configuring criteria; wherein upon determining the electronic device is not authorized to receive wireless charging from the wireless charging system: i) configuring the receiver and/or the electronic device to prevent receiving wireless charging from the wireless charging system, and/or ii) directing one or more directional electromagnetic energy beams from the one or more transmitting antennas to avoid the determined location of the receiver of the power bank within the physical space, and/or stopping and/or not directing one or more electromagnetic energy beams from the one or more transmitting antennas towards the receiver of the power bank, to at least partially prevent the receiver of the power bank from receiving one or more of the electromagnetic energy beams from the one or more transmitting antennas system and/or prevent the electronic device from receiving electrical power from the power bank.

In some embodiments a system comprises a wireless charging system comprising one or more power chargers comprising one or more transmitting antennas configured to direct one or more directional electromagnetic energy beams to a receiver of the power bank located within a physical space, wherein the electronic device is adapted to issue a request to the wireless charging system, and wherein a receiver of the power bank is adapted to receive and convert one or more electromagnetic energy beams provided by the wireless charging system to electrical energy in an amount sufficient to power and/or charge the power bank and/or the electronic device, wherein the system is configured to determine a location of the power bank and/or the electronic device within the physical space; establish an instance of electronic communication between the wireless charging system and the power bank and/or the electronic device; determine a status of the power bank and/or the electronic device comprising determination of an authorization status, comprising a determination of if the power bank and/or the electronic device is, or is not authorized to receive wireless charging from the wireless charging system, and/or the electronic device is not authorized to receive electrical power from the power bank, based on one or more predetermined authorization criteria.

In some embodiments the system is further configured such that upon receiving a request from the electronic device which is has been determined to be authorized to receive wireless charging from the wireless charging system, and/or the electronic device is authorized to receive electrical power from the power bank: i) configuring the electronic device to receive wireless charging from the wireless charging system according to one or more configuring criteria; and/or ii) directing of one or more directional electromagnetic energy beams from the one or more transmitting antennas towards the receiver of the power bank at or near the determined location within the physical space in an amount sufficient to power and/or charge the electronic device according to one or more of the configuring criteria; and wherein the system is configured such that upon determining the electronic device is not authorized to receive wireless charging from the wireless charging system, and/or the electronic device is not authorized to receive electrical power from the power bank i) configuring the receiver and/or the electronic device to prevent receiving wireless charging from the wireless charging system, and/or ii) stopping and/or directing one or more directional electromagnetic energy beams from the one or more transmitting antennas to avoid the determined location of the receiver of the power bank within the physical space, and/or not directing one or more electromagnetic energy beams from the one or more transmitting antennas towards the receiver of the power bank, to at least partially prevent the receiver of the power bank from receiving one or more of the electromagnetic energy beams from the one or more transmitting antennas.

Importantly, and in contrast to systems known in the art, the wireless charging system according to embodiments disclosed herein is suitable for functioning in the open, outside of a building or other structure e.g., in plain air. By virtue of directing one or more directional electromagnetic energy beams towards the determined location of the device receiver, the instant system will function to deliver substantial amounts of electrical energy to receivers without relying on the reflection of electromagnetic energy off of walls, furniture, and the like, as is required by other systems to deliver a non-trivial amount to power suitable for charging an electronic device.

In embodiments, the power bank is configured to receive and harvest electrical energy from directional electromagnetic energy beams having a beam width of less than 360° (for a unidirectional antenna), and less than 180° for a wall mounted or planer antennas. In embodiments, the beams are dynamically adjusted according to the distance of the power bank from, the base charger, and/or the direction of movement of the intended power bank. In embodiments, the directional electromagnetic energy beams directed to the intended power bank receiver have a beam width of less than or equal to about 60°, or 55°, or 50°, or 45°, or 40°, or 35°, or 30°, or 25°, or 20°, or 15°, or 10°, or 5°.

In one embodiment, the power bank is configured to harvest energy provided by a wireless charging system configured to direct one or more directional electromagnetic energy beams to the power bank, and/or for one or two way electronic communication between a transmitter/device receiver of the wireless charging system and a transmitter/device receiver of the power bank within a frequency range, e.g., comprises antenna elements and associated circuitry, software and control systems, for operating in frequency bands from about 20 KHz to about 50 KHz, and/or from about 150 MHz to about 900 MHZ, and/or from about 900 MHZ to about 1.8 GHZ, and/or from about 1.6 GHz to about 2.0 GHZ, and/or from about 2.0 GHz to about 8.0 GHz, and/or from about 3 GHz to about 300 GHz.

the power bank is configured to harvest energy provided by a wireless charging system configured to direct one or more directional electromagnetic energy beams to the power bank, and/or for one or two way electronic communication between a transmitter/device receiver of the wireless charging system and a transmitter/device receiver of the power bank within a frequency range, e.g., comprises antenna elements and associated circuitry, software and control systems, for operating in frequency bands of about 900 MHZ, 2.5 GHZ, 5.250 GHz, or 5.8 GHz.

the power bank is configured to harvest energy provided by a wireless charging system configured to direct one or more directional electromagnetic energy beams to the power bank, and/or for one or two way electronic communication between a transmitter/device receiver of the wireless charging system and a transmitter/device receiver of the power bank within a frequency range, e.g., comprises antenna elements and associated circuitry, software and control systems, for operating in frequency bands within the "5G" range which include low-band, mid-band or high-band millimeter-wavelengths having frequencies from about 24 GHZ up to 54 GHZ, and/or mid-band 5G using microwave wavelengths having frequencies from about 2.3-4.7 GHZ, and/or high-band 5G wavelengths using frequencies of 24-47 GHZ. These frequencies may be utilized for power transmissions, bidirectional electronic communication between the wireless charging system and the power bank, or any combination thereof.

The Wireless Charging System

In embodiments, the power bank according to one or more embodiments disclosed herein is configured to harvest energy from one or more directional electromagnetic energy beams provided by an external wireless charging system over a distance of greater than about cm, or 20 cm, or 30 cm, or 40 cm, or 50 cm, or 100 cm, or 5 m, or 10 m, or 50 m, convert the harvested energy into electrical energy, and direct the electrical energy into the electrical storage device. Suitable wireless charging systems include those comprising at least one base multi point power and base multi point power charger ("base multi point power charger"), for providing wireless energy to at least one, preferably a plurality of untethered, spaced apart electronic devices that consume energy for a function other than charging or powering another device ("electronic devices"). These electronic devices are spaced away from the base multi point power charger. Preferably, the system comprises a plurality of the base multi point power chargers.

The base multi point power charger is coupled to an electrical energy source. The base multi point power charger is constructed to emit a plurality of primary directional beams. Each of the plurality of directional beams is directable toward a determined location/direction of at least one of the power bank and/or the electronic devices that are powered or chargeable via the base multi point power charger.

Each electronic device comprises an auxiliary multi point power charger constructed to emit a plurality of secondary directional electromagnetic charging beams. Each of the plurality of secondary beams is directable toward a determined direction of one of the other electronic devices to wirelessly charge or power the other electronic device.

Some embodiments include a system controller configured to enable the power bank and/or the electronic devices to be followed by the respective primary and secondary beams responsive to motion of the power bank and/or the electronic devices. The controller allows for a formation of an ad hoc WiGL network comprised of the power bank and/or the electronic devices and base multi point power charger, and can repeatedly calculate positions of the power bank and/or the electronic devices so as to redirect the respective primary and secondary beams.

In embodiments of the system wherein one or more of the power bank and/or the electronic devices request power, e.g., for charging or powering the device. The base and auxiliary multi point power chargers are dimensioned, arranged and configured to:

a. determine locations of the power bank requesting power;
b. direct one of the plurality of directional charging beams toward the determined location of a respective one of the power bank requesting power to supply power to the power bank and/or the electronic device;
c. automatically update the location(s) of the respective electronic device(s) requesting power; and
d. redirect one or more of the plurality of primary and secondary beams toward the updated location of the respective electronic device requesting power, wherein the power bank is in a range within which the respective charging beam can cause powering, a self-charge or recharge of the power bank and/or the electronic device.

In embodiments of the system, a charging beam is selected based on an optimum power delivered to the power bank and/or the electronic device.

In embodiments, a peer-to-peer power distribution network is formed, e.g., wherein each one of the plurality of electronic devices is within charging or powering range of at least another base or auxiliary multi point wireless charger.

In embodiments, the primary and secondary beams are selected to supply power based on a WiGL routing policy and/or table. The WiGL routing policy and/or table is preferably based on one or more or all of:
 a. whether the primary or secondary beam originates from a base or auxiliary multi point power charger;
 b. proximity and line of sight of the respective base or auxiliary multi point power charger relative to the power bank and/or the electronic device requesting power;
 c. relative levels of charge of batteries in or of power sent to the power bank and/or the electronic devices; and
 d. proximity and line of sight of the auxiliary multi point wireless chargers from which the charging beam originates, to other respective auxiliary and base multi point chargers available to supply power to the auxiliary multi point wireless charger from which the charging beam originates.

In embodiments, the electrical power distribution network utilizes packet switching. Some embodiments further comprise added redundancy by proving routing resiliency similar to methods used in data communication. Accordingly, embodiments of the system disclosed herein may substantially eliminate charging cords, eliminate and/or reduce demands for electrical wiring, reduce wasted charging power by requesting only what is desired, and direct the power where it is needed, and/or reduce battery usage.

For purposes herein, a directional electromagnetic energy beams refers to a ray or plurality of rays of electromagnetic radiation energy having a general direction and width.

It is to be understood that reference to a directional electromagnetic energy beam does not refer to, and is in contrast to power transmission signals made up of power transmission waves, in one or more trajectories by manipulating the phase, gain, and/or other waveform features of the power transmission waves, and/or by selecting different transmit antennas in which the underlying power transmission waves converge at a location in space, resulting in certain forms of interference, one form being "constructive interference," formed by a field of energy caused by the convergence of the power transmission waves such that they add together and strengthen the energy concentrated at that location establishing a field of energy, or "pocket of energy" at that relative location, and another being "destructive interference" wherein the waves subtract from each other and diminish the energy concentrated at that location.

In some embodiments, an adaptable multi point power charger is provided which utilizes a smart antenna, which may further be coupleable to an ad hoc network. The multi point power charger adaptively directs power to power and/or charge remote devices. The multi point power charger is relatively efficient and reduces ambient radio frequency ("RF") power to provide low interference.

In some embodiments the base and auxiliary multi point power chargers each comprise:
 i. a converter that is constructed to convert electrical energy having an alternating current or direct current into wireless electrical energy;
 ii. a base band processor;
 iii. an electromagnetic radiation processor;
 iv. a multidirectional antenna array; and
 v. a wireless electrical grid router.

In some embodiments, a power booster is utilized to expand a range of the base multi point power charger.

In some embodiments, the base multi point power charger is one of a plurality of base multi point chargers. Preferably, the base multi point power charger is dynamically selected from the plurality of base multi point chargers based upon the determined locations of the respective electronic devices and/or the power requests of the devices.

In some embodiments, the base multi point power charger obtains electrical energy from a long-haul transmission line i.e., utilizes "line voltage" or "line power" from a wall or other outlet.

In some embodiments, the charging beam comprises light, e.g., a laser, or a radiofrequency beam, e.g., Wi-Fi.

In some embodiments, the power bank comprises a battery as the electric storage device. In other embodiments, the power bank comprises an intermediate electrical storage device configured and arranged to receive electrical energy from the receiving system and provide electrical energy to the electrical storage device. In embodiments, this intermediate electrical storage device may include a battery and/or a capacitor for storing power.

In embodiments, the power bank further includes a drive circuit to power an electrical element such as a light, mobile phone, laptop, TV, radio, etc., and a transceiver to communicate with an ad hoc WiGL network. The transceiver can be configured to send and receive charging beams via a multi-point power charger, wherein the multi point power chargers are constructed to emit a plurality of directional electromagnetic charging beams. Each of the plurality of directional beams can be directable toward a determined direction of another electronic device, the multi point power charger constructed to wirelessly supply power to the other electronic device.

The power bank may further comprise a controller constructed to enable the other electronic device to be followed by the charging beams responsive to motion of the other electronic device. In embodiments, this power bank is configured to function with the wireless charging system to:
 a. send and receive charging or powering requests to and from other electronic devices via the WiGL network;
 b. determine a location of the other electronic device requesting power;
 c. direct one of the plurality of directional charging beams toward the determined location of the other electronic device requesting power to charge or power the other electronic device;
 d. automatically update the location of the other electronic device requesting power; and
 e. redirect one of the plurality of directional charging beams toward the updated location of the other electronic device requesting power, wherein the other electronic device is in a range within which the charging beam can cause powering, a self-charge or recharge of the power bank and/or the electronic device.

In one or more embodiments, the electronic device is connectable to the power bank via a charging cable to an external source of electrical energy, the power bank can thus function as a wireless charger according to embodiments disclosed herein to wirelessly charge or power other untethered electronic devices within range in a peer-to-peer power distribution network.

In some embodiments, a method comprises coupling at least one of a plurality of base multi point power chargers to a respective electrical energy source, spacing a plurality of untethered electronic devices apart and away from the base multi point power chargers, and emitting a plurality of primary directional electromagnetic charging beams from each base multi point power charger. Each of the plurality of primary beams can be directable toward a determined direction of one of the power bank. The base multi point power chargers can be constructed to wirelessly supply power to the power bank.

In one or more embodiments of the method, each electronic device can comprise an auxiliary multi point power charger emitting a plurality of secondary directional electromagnetic charging beams, wherein each of the plurality of secondary beams is directable toward a determined direction of one of another power bank to wirelessly supply power to another power bank and/or electronic device. This location of the other power bank may be provided by communication between the two power banks, by the external wireless charging system, and/or a combination thereof.

In some embodiments of the method, a system controller can enable the power bank to be followed by the respective primary and secondary beams responsive to motion of the power bank and/or the electronic devices, allowing for formation of an ad hoc WiGL network comprised of the power banks and base multi point power charger(s), and repeatedly calculating positions of the power banks so as to redirect the respective charging beams.

In some embodiments of the method, one or more of the plurality of the power bank and/or the electronic devices request charging or power. The base and auxiliary multi point power chargers determine locations of the power bank requesting charging or power, direct one of the plurality of directional charging beams toward the determined location of a respective one of the power bank requesting power to charge or power the power bank and/or the electronic device, automatically update the location(s) of the respective electronic device(s) requesting power, and redirect one of the plurality of directional charging beams toward the updated location of the respective electronic device requesting power, wherein the power bank is in a range within which the respective charging beam can cause powering, a self-charge or recharge of the power bank and/or the electronic device.

In some embodiments of the method, a charging beam is selected based on an optimum power delivered to the power bank and/or the electronic device.

In some embodiments of the method, each one of the plurality of electronic devices is within charging range of at least another base or auxiliary multi point wireless charger, so as to form a peer-to-peer power distribution network.

In some embodiments, the method can further comprise selecting the charging beams based on a WiGL routing policy and/or table. The WiGL routing policy and/or table can be based on one or more of:
  a. whether the charging beam originates from a base or auxiliary multi point power charger;
  b. proximity and line of sight of the respective base or auxiliary multi point power charger relative to the power bank and/or the electronic device requesting power;
  c. relative levels of charge of batteries or of power needs in the power bank and/or the electronic devices; and
  d. proximity and line of sight of the auxiliary multi point power charger from which the charging beam originates, to other respective auxiliary and base multi point chargers available for charging the auxiliary multi point power charger from which the charging beam originates.

FIG. 1 is a block diagram of an exemplary embodiment of a wireless charging system according to embodiments disclosed herein. The wireless charging system generally indicated as 100 comprises a plurality, e.g., two or more, base multi point power chargers 180A, 180B, each comprising one or more transmitting antennas 182A and 182B, respectively, configured to direct one or more directional electromagnetic energy beams 190 to a receiver 132A, 132B, and 132C, of a like plurality of corresponding electronic devices 130A, 130B, and 130C, respectively, located within a physical space 110. Each of the receivers 132 and/or the power bank and/or the electronic devices 130 in electrical communication with the receivers are adapted to issue a request 142 (only one instance of which is shown for simplicity), to the wireless charging system 100, e.g., to a receiving antenna coupled to the power charger 180. The receiver 132 of the power bank and/or the electronic device 130 is adapted to receive and convert one or more electromagnetic energy beams 190 provided by the wireless charging system to electrical energy in an amount sufficient to power and/or charge the power bank and/or the electronic device 130.

As is further shown in FIG. 1, in embodiments the plurality of electronic devices 130 form a peer-to-peer power distribution network system 102 that generates directional beams 192, which can provide power to another one of the power bank and/or the electronic devices e.g., 130B.

The base multi point power chargers 180A, 180B are electrically coupled to respective electrical energy sources 181, e.g., electrical outlets as illustrated or high-capacity batteries (not shown) or any other suitable power source.

Figure 2:
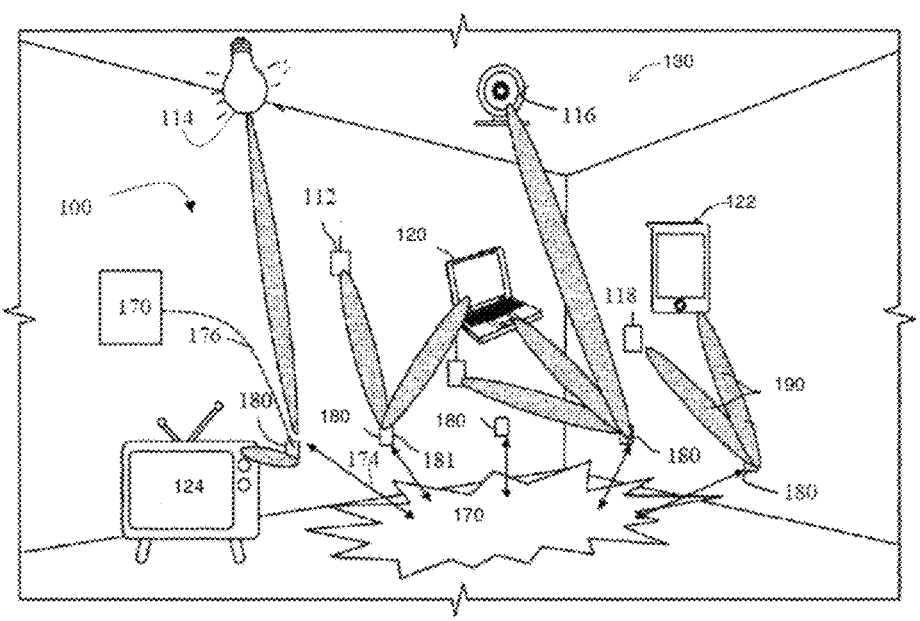
FIG. 2 is a block diagram of a system according to an embodiment disclosed herein.

As shown in FIG. 2, the plurality of base multi point power chargers 180 can be electrically and/or communicatively coupled to untethered electronic devices 130, which may include consumer electronic devices, e.g., a cell phone 112, a lighting device 114, home security systems 116, sensors 118, relatively high-power devices such as computers 120, tablets 122, televisions/home gateways 124, and the like. In embodiments, one or more components of the wireless charging system 100 may be in electronic communication with a data network 170 via wireless electronic communication 174 and/or wired electronic communication 176.

As shown in FIGS. 1 and 2, in embodiments, one or more components of the wireless charging system 100 and/or one or more of the receivers 132, and/or one or more of the power bank and/or the electronic devices 130 may further be in electronic communication with a data network 170 via wireless electronic communication 174 and/or wired electronic communication 176.

The base multi point power chargers 180 can be mounted and/or be coupled to electrical energy sources 181 and generate directional beams 190 (only a sample of which are labeled for simplicity), which directional beams provide power to electronic devices that are chargeable and/or powerable via the electric energy provided by the wireless charging system 100.

Base multi point power chargers 180 and any auxiliary chargers can be communicatively coupled to a local area network ("LAN"), and/or a personal area network ("PAN"), a cellular network, and/or a wireless LAN ("WLAN"), and/or a wireless PAN ("WPAN"), collectively herein referred to as "WP/LAN" 170 to communicate information concerning one or more of:
  a. identify one or more devices in need of power or charging;
  b. location information concerning one or more devices;
  c. a selection of a power or charge controller to power or charge one or more identified devices; and/or
  d. a state of the power bank and/or the electronic device.

In embodiments, the wireless charging system 100 is configures such that the base multi point power chargers 180 and the power bank and/or the electronic devices (generally referred to as 130) participate in the peer-to-peer power distribution network system 102. For example, the devices 130A, 130C can receive charging beams 190 from respective base chargers 180A, 180B, and in turn transmit charging beams 192 to wirelessly power or charge device 130B, which may be out of range and/or have poor line of sight to base chargers 180A, 180B, and/or may be more efficiently charged by devices 130A and/or 130C.

One or more identified devices can request charging 142 from a component of the wireless charging system, e.g., a multi-point power charger 180 and/or other ones of the power bank and/or the electronic devices e.g., 130B requesting power charging 142 from device 130A. This request 142 may be via a wireless network communication 174 and or wired network communication 176 to network 170, or may be a direct communication between the charging system and the receiver and/or the device. A directional beam of directional beams 190, 192 can be assigned to the device requesting power to begin operating or charging.

In embodiments, the location of a particular device e.g., 130C is updated by the wireless charging system 100 as the location of the device changes, indicated by arrow 134. Thereby, selected multi point power chargers 180 and/or devices 130 providing powering and recharging can be powered or changed based upon movement of a given device. In embodiments, the system is configured to "follow" the device as it moves through the space 110. In embodiments, power is transmitted via RF or other electromagnetic radiation ("EMR") sources, which can be dynamically adjusted based upon device location, power requirements, charging need, and or the like.

Multi point power chargers 180 and/or devices 130 generate directed beams of power to target a device that needs and/or requests power and/or charging. Multi point power chargers 180 and devices 130 can be communicatively coupled to WP/LAN 170 to communicate information such as:

a. each device that requests power or charging is assigned a number and becomes a node of the network;
b. each device that requests power or charging can elect to request to be powered, charged or not;
c. what devices need to be powered and/or charged;
d. where each device to located;
e. a determined state, e.g., a physical state and/or an authorization state of the device; and/or
f. which of multi point power chargers 180 and/or devices 130 charge which device 130.

Figure 3:
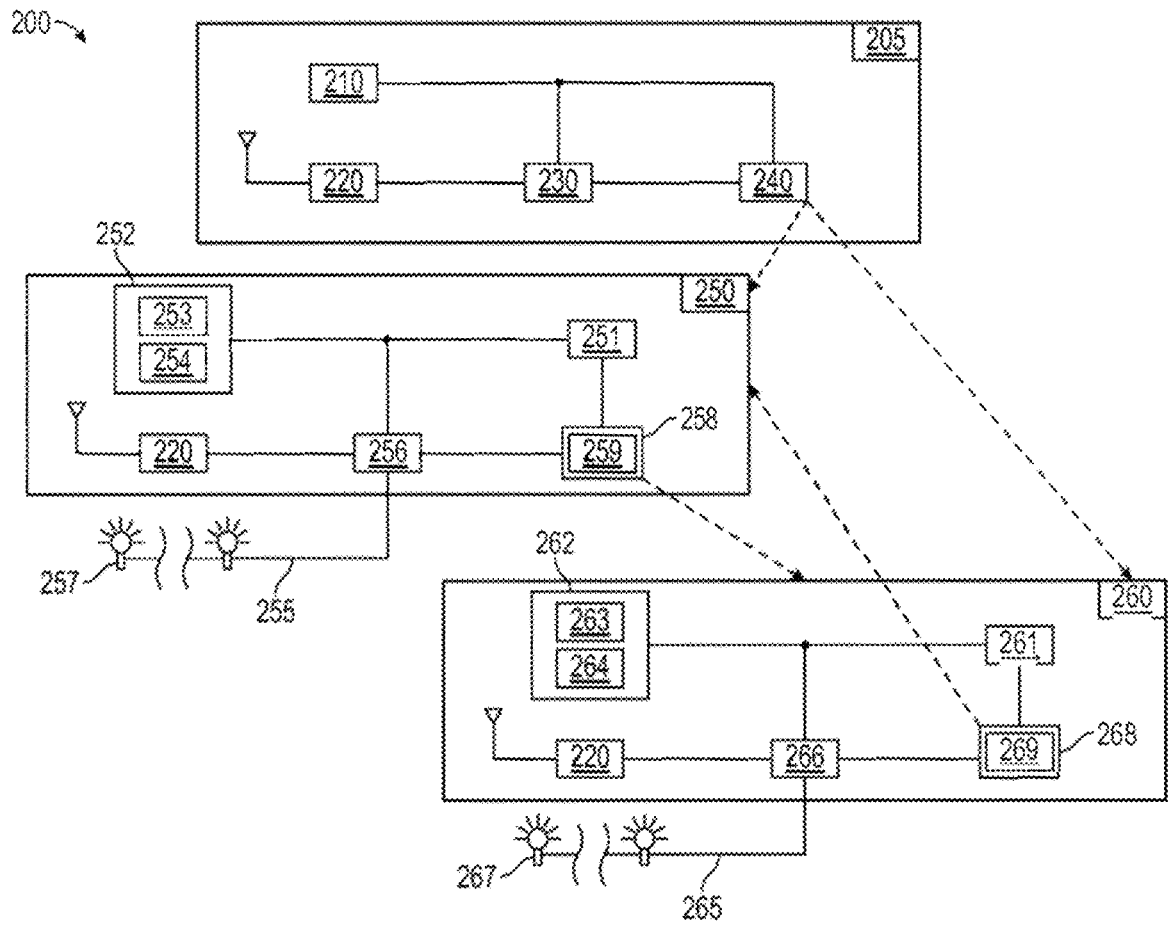
FIG. 3 is a block diagram of a system according to an embodiment disclosed herein.

In other embodiments, the power bank and/or the electronic devices 130 and/or the receivers 132 may in turn comprise auxiliary multi point chargers (such as chargers 258, 268 as shown in FIG. 3).

In embodiments, the system is configured to establish at least one instance of bidirectional electronic communication between the wireless charging system and the power bank and/or the electronic device. For example, devices 130 are communicatively coupled to WP/LAN 170. If a device needs and/or requests power and/or charging, the device sends a request via WP/LAN 170. A directional beam is assigned to the device and direct powering and/or charging starts. Locations of devices are repeatedly updated 134.

FIG. 3 is a block diagram of an exemplary embodiment of a peer-to-peer power distribution network system 200, which comprises a base WiGL multi point power charger 205 (which can be wall mounted), untethered electronic device 250, and untethered electronic device 260. Base WiGL multi point power charger 205 comprises energy source 210 (which can include wall alternating current ("AC") to direct current ("DC") energy converter) and a controller 230. In embodiments, the base WIGL multi point power charger 205 is communicatively coupled to a WP/LAN 220 and is constructed to transmit multi-directional beams from multi directional antenna 240. Electronic device 250 comprises a battery charger 251, a power supply 252 comprising a battery 253 and/or capacitor 254, a controller 256, and a transceiver 258 including auxiliary multi directional antenna 269. Device 250 may be further coupled 255 to another electronic device 257. Electronic device 250 is communicatively coupled to WP/LAN 220. Receiver 260 is coupled to an electronic device 267. The receiver either comprises or is in electrical communication with a battery charger 261, a power supply 262 comprising a battery 263 and/or capacitor 264, a controller 266, and a transceiver 268 including auxiliary multi direction antenna 269. Receiver 260 is communicatively coupled to WP/LAN 220.

In embodiments, the power charger is augmented by a controller. The system provides RF beam forming capabilities, which RF beams are formed and directed via communications transmitted via a formed ad hoc WiGL network. This ad hoc WiGL network may be created by software (code, application or other methods as outlined in the Institute of Electrical and Electronics Engineers (IEEE) standard 802.11) to determine the size, scope and needs of the WP/LAN. When an untethered device (e.g., an electronic device) needs charging, it requests charging via a signal transmitted via the ad hoc WiGL network. A particular multi point power charger (base or auxiliary) is selected by an information device coupled to the ad hoc WiGL network, which causes generation of a directed beam that is a radio frequency ("RF") beam, for example. The information device determines the location of the untethered device and assigns a different beam if necessary. RF transmitted power is dynamically adjusted based the location and charging needs of the untethered device receiving power.

In an embodiment, one or more electronic devices can request charging from the wireless charging system, e.g., a base multi point power charger (and/or from auxiliary multi point power chargers). The system then directs one or more directional electromagnetic energy beams to the device requesting power or a charge, to begin operating or charging the device. In some embodiments, the device location is updated as the devices moves. Thereby, selected base multi point power chargers provide powering and recharging can power or charge based upon movement of a given device. Power transmitted via RF or other electromagnetic radiation ("EMR") sources can be dynamically adjusted based upon device location and power and/or charging need.

In embodiments, the system and/or a method employed by the system establishes an instance of bidirectional electronic communication between the wireless charging system and the power bank and/or the electronic device. This bidirectional electronic communication between the wireless charging system and the power bank and/or the electronic device may comprise direct electronic communication (peer to peer) between the wireless charging system and the device, and/or indirect electronic communication via a local area network; an ad-hoc network; another peer to peer network, a wide area network, a wireless computer network, a wired computer network, a cellular data network, a cellular and/or Wi-Fi data network provided at least in part by the power bank and/or the electronic device, e.g., using the network provided by a smartphone or computer, combinations thereof, and/or the like. For example, a smart phone may utilize a cellular and/or a Wi-Fi network to which it is connected to form an electronic communication e.g., an internet connection, a LAN connection, and/or the like to communicate with the charging system. In other embodiments, the communication link is included in or coincident with the directional electromagnetic energy beam provided by the wireless charging system. In embodiments, the system is configured to determine a status of the power bank and/or the electronic device. This status may include device requests for power or charging, which may then be assigned an identifier and become a node of a network; a location of the device, a level of charge of the power bank and/or the electronic device; an identification variable specific to the power bank and/or the electronic device; a predetermined criteria specific to the device and/or to the type of device, and/or the like.

Figure 4:
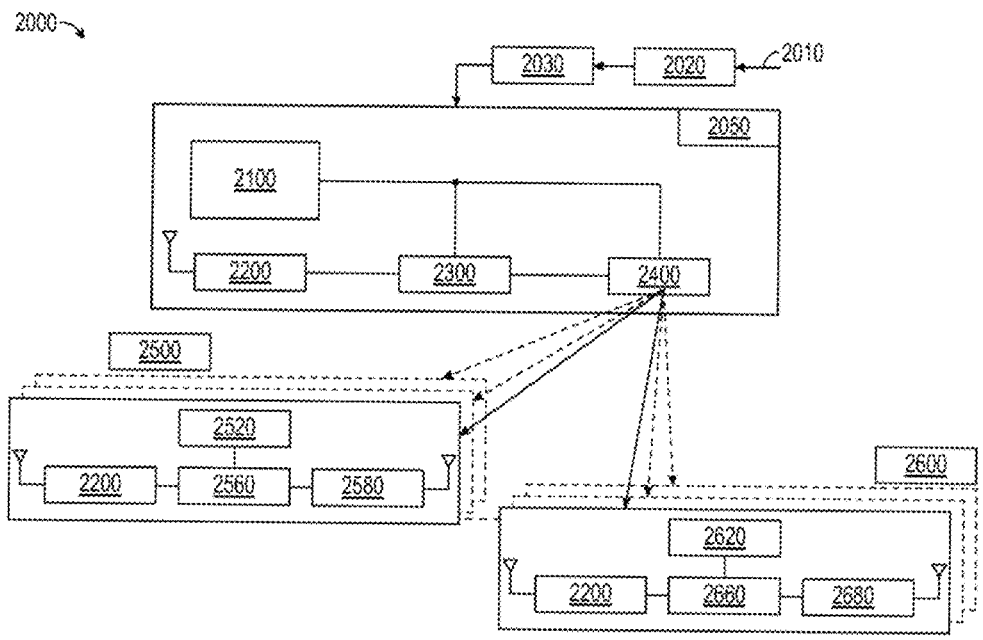
FIG. 4 is a block diagram of an embodiment of a system according to an embodiment disclosed herein.

FIG. 4 is a block diagram of an exemplary embodiment of a system 2000, which comprises a power generation source 2010, a long-haul transmission line 2020, a tower 2030, a WiGL multi point power charger 2050 (which can be mounted), mobile units 2500, and mobile units 2600. WiGL multi point power charger 2050 comprises energy source 2100 (e.g., line current or power ("AC") to direct current ("DC") energy converter) and a controller 2300. Wall mounted unit is communicatively coupled to a WP/LAN 2200 and is constructed to transmit multi-directional beams from multi directional antenna 2400. Mobile units 2500 comprise a battery charger 2520, a controller 2560, and a receiver 2580. Mobile units are communicatively coupled to WP/LAN 2200. Mobile units 2600 comprise a battery charger 2620, a controller 2660, and a receiver 2680. Mobile units are communicatively coupled to WP/LAN 2200. Mobile units 2500 and mobile units 2600 consume energy.

A mounted or stationary multi point power charger is augmented by a controller. The system provides RF beam forming capabilities, which RF beams are formed and directed via communications transmitted via a formed ad hoc WiGL network. This Ad Hoc WiGL network may be created by software (code, application or other methods as outlined in the Institute of Electrical and Electronics Engineers (IEEE) standard 802.11) to determine the size, scope and needs of the WP/LAN. When an untethered device (e.g., an electronic device) needs charging, it requests charging via a signal transmitted via the ad hoc WiGL network. A particular multi point power charger is selected by an information device coupled to the ad hoc WiGL network, which causes generation of a directed beam that is a radio frequency ("RF") beam. Upon receiving a request from the power bank and/or the electronic device; one or more directional electromagnetic energy beams from the one or more transmitting antennas of the system are directed towards the receiver of the power bank at or near the determined location within the physical space in an amount sufficient to power and/or charge the power bank and/or the electronic device. Upon motion of the power bank and/or the electronic device as indicated by the dotted rectangles 2500 and 2600 within the physical space, the location of the power bank and/or the electronic device is updated and at least one of the plurality of the directional electromagnetic energy beams is redirected from the one or more transmitting antennas toward the receiver of the power bank at or near the updated location in an amount sufficient to power and/or charge the power bank and/or the electronic device. In embodiments, the information device determines the updated location of the untethered device and assigns a different beam if necessary. RF transmitted power may also be dynamically adjusted based the updated physical location and/or charging needs of the power bank and/or the electronic device.

Figure 5:
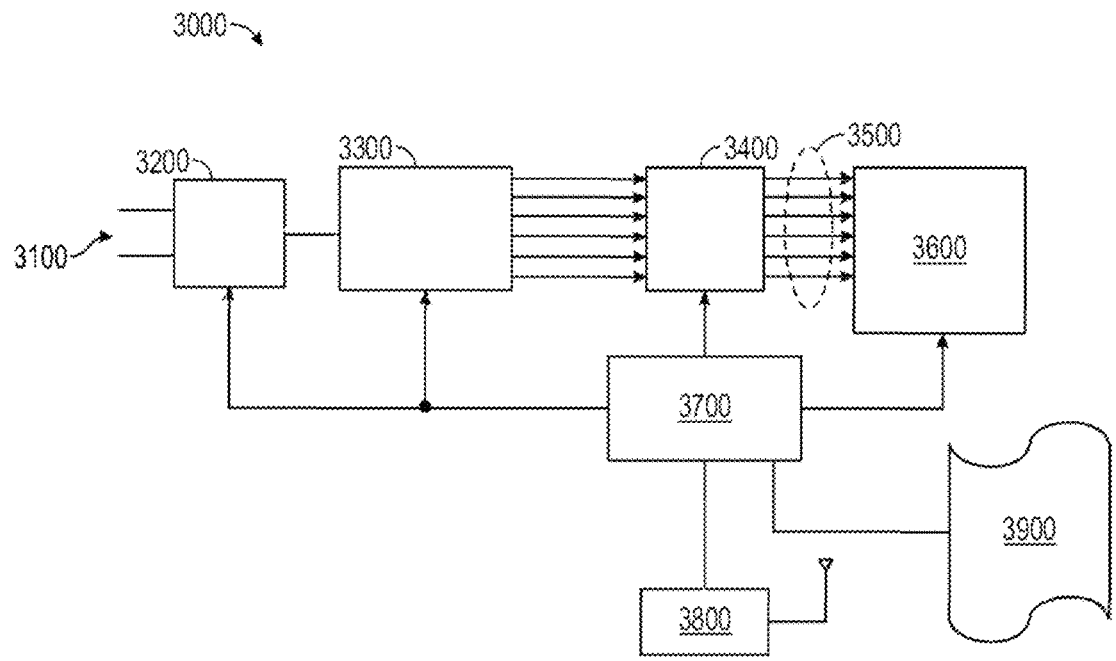
FIG. 5 is a block diagram of an embodiment a system according to an embodiment disclosed herein.

FIG. 5 is a block diagram of an exemplary embodiment of a system 3000. AC power 3100 enters system 3000 and is converted to DC power via converter 3200. System 3000 comprises a base band processor 3300, an RF processor 3400, a beam formation controller 3500, a multidirectional antenna array 3600 (which can comprise an antenna—e.g., a parabolic antenna), a system controller 3700, a LAN 3800, and machine instructions and/or software and/or hardware 3900.

As shown in FIG. 5, a base multi point power charger (and any auxiliary multi point power charger) may comprise a converter 3200 that is constructed to convert electrical energy having an alternating current or direct current into wireless electrical energy; one or more base band processors 3300; an RF and/or an electromagnetic radiation processor ("EMR") 3400; a beam formation controller 3500; a wireless electrical grid router, e.g., which may be coincident with a system controller 3700; a multidirectional antenna array 3600, the multidirectional antenna array constructed to route and emit substantially wireless directional beams that are at least one of: directed in any of a plurality of directions; and transmitted substantially wirelessly via a locally available electromagnetic radiation, piezoelectricity, nanocrystal, or RF signal, RF signal comprising a RF charging beam; a system controller 3700 constructed to route energy based on a wireless electrical grid policy and routing tables; and enable electronic devices to be followed by the electromagnetic radiation (e.g. radio frequency) charging beams, which can be one of plurality of directional beams responsive to motion of electronic device, and which allows for a formation of an Ad hoc network that repeatedly calculates a position of electronic devices so as to redirect the electromagnetic radiation (e.g. radio frequency) charging beams to the device.

Figure 6:
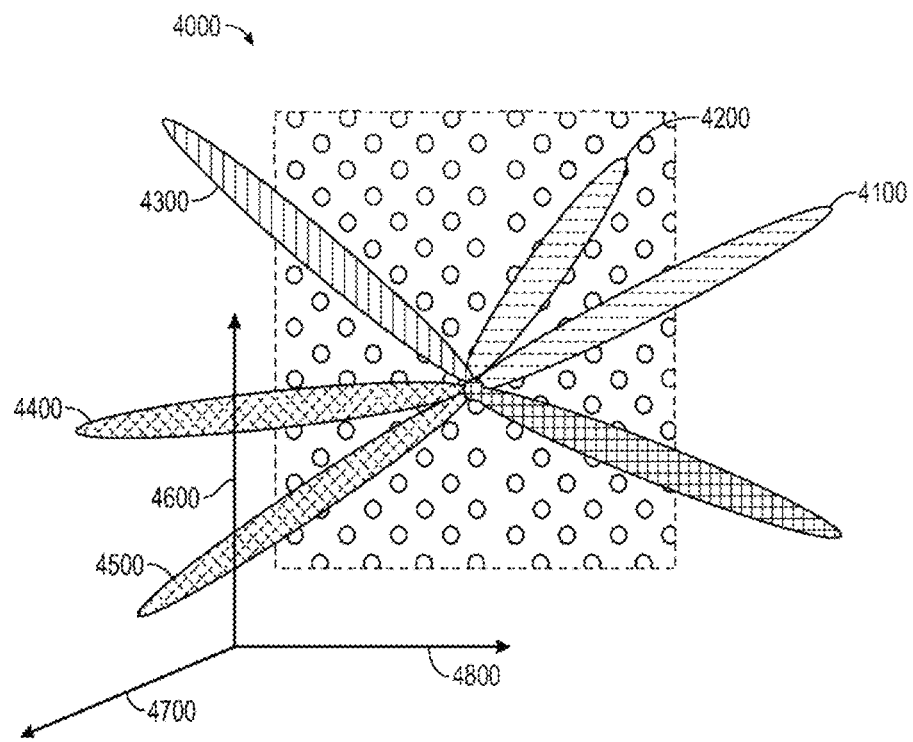
FIG. 6 is a block diagram of an embodiment of a multi directional antenna array according to an embodiment disclosed herein.

FIG. 6 is a block diagram of an exemplary embodiment of a multi directional antenna array 4000. RF energy is directed to a mobile device on a transmit side. The system detects a presence of the mobile device and assigns a charging RF beam for it. Multi directional antenna array 4000 transmits a first charging beam 4100, a second charging beam 4200, a third charging beam 4300, a fourth charging beam 4400, and a fifth charging beam 4500. Each charging beam can be directed in three-dimensional space relative to an x-axis 4800, a y-axis 4600, and a z-axis 4700. Via multi directional antenna array 4000, radio frequency energy is directed to a mobile device on the transmit side. In one or more embodiments, the systems can detect the presence of a mobile device and assign a charging radio frequency beam for the mobile device.

Figure 7:
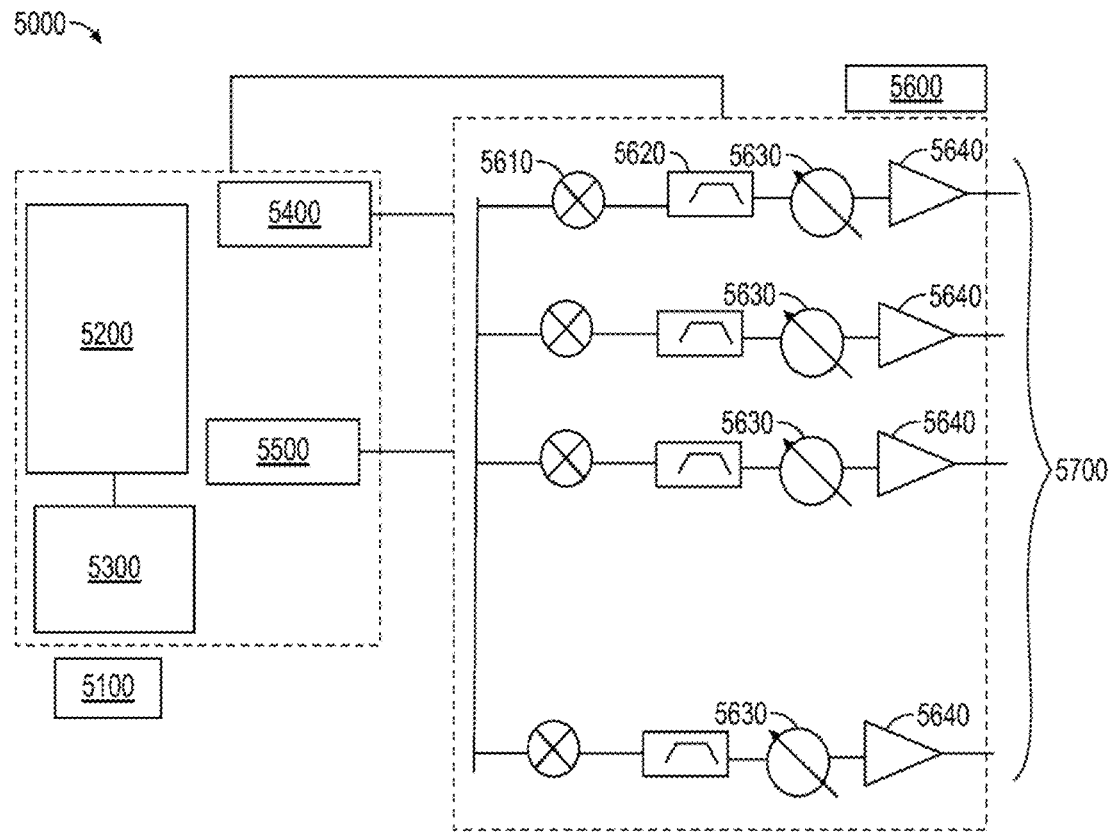
FIG. 7 is a block diagram of a wall mounted multi point power charger system according to an embodiment disclosed herein.

FIG. 7 is a block diagram of an exemplary embodiment of a wall mount multi point power charger system 5000, which comprises a baseband processor 5100 and an RF processor 5600. Baseband processor 5100 comprises a processor 5200, a controller 5300, modulators 5400, and beam control 5500. RF processor 5600 comprises a plurality of local oscillators 5610, a plurality of band pass filters 5620, a plurality of phase shifters 5630, and a plurality of power amplifiers 5640 (e.g., power boosters). An output 5700 from multi point power charger system 5000 flows to antenna elements.

Figure 8:
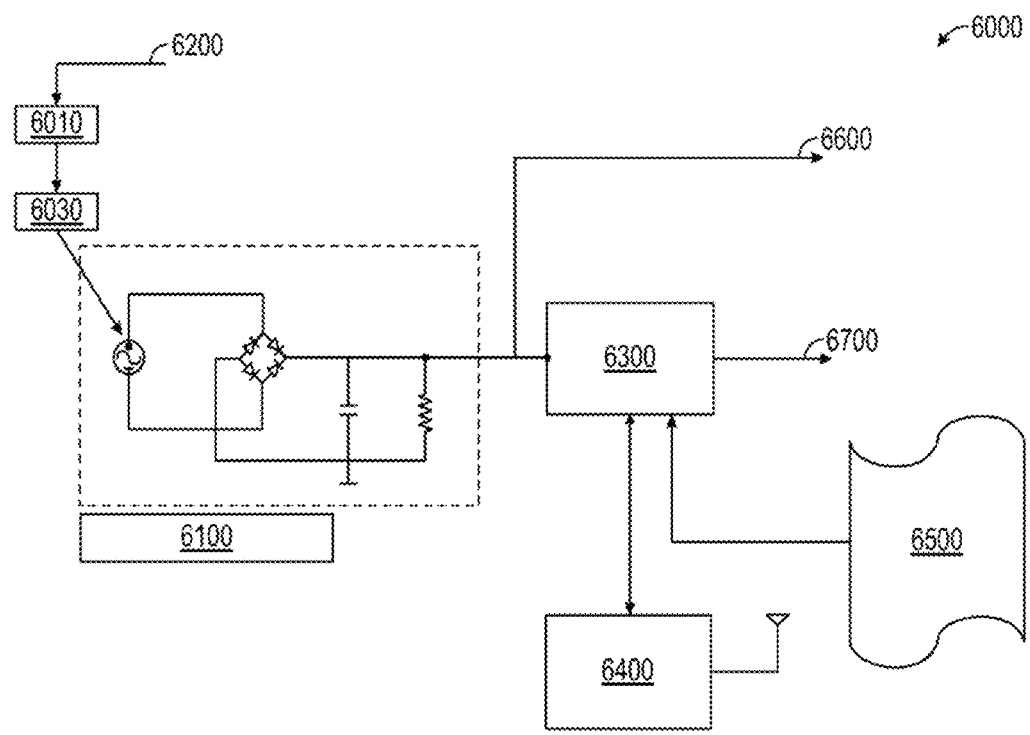
FIG. 8 is a block diagram of a wall mount multi point power charger system according to an embodiment disclosed herein.

FIG. 8 is a block diagram of an exemplary embodiment of a wall mount base multi point power charger system 6000, which comprises an AC to DC power converter 6100 and a system controller 6300. AC to DC power converter 6100 receives electrical energy 6200, such as from a power circuit from a household wall outlet. In some embodiments, electrical energy 6200 can be received via an energy detector 6010 and/or an energy harvester 6030, which can receive energy into multi point power charger system 6000 wirelessly. Outputs from AC to DC power converter 6100 comprise a power flow 6600 to an RF processor and an input signal to system controller 6300. System controller 6300 operates via machine instructions and/or software and/or hardware 6500 (e.g., a program). System controller 6300 is communicatively coupled to a WP/LAN 6400. System controller 6300 outputs a control signal 6700 to an RF and/or broad band processor.

In some embodiments, substantially untethered devices (e.g., electronic devices) determine a need for power and/or charging and requests power via an ad hoc WiGL network. An information device coupled to the ad hoc WiGL network determines locations of each of the substantially untethered devices.

The information device coupled to the ad hoc WiGL network determines which device needs to be charging, where it is and which wall mounted multi point power charger will be directed to perform the charging. The selected wall multi point power charger generates a directed beam pointing toward a particular untethered unit and charging starts. Untethered unit locations are constantly being determined and/or updated by information device coupled to the ad hoc WiGL network. Each untethered unit monitors its own charging state, its location and communicates that charging state to the information device.

Figure 9:
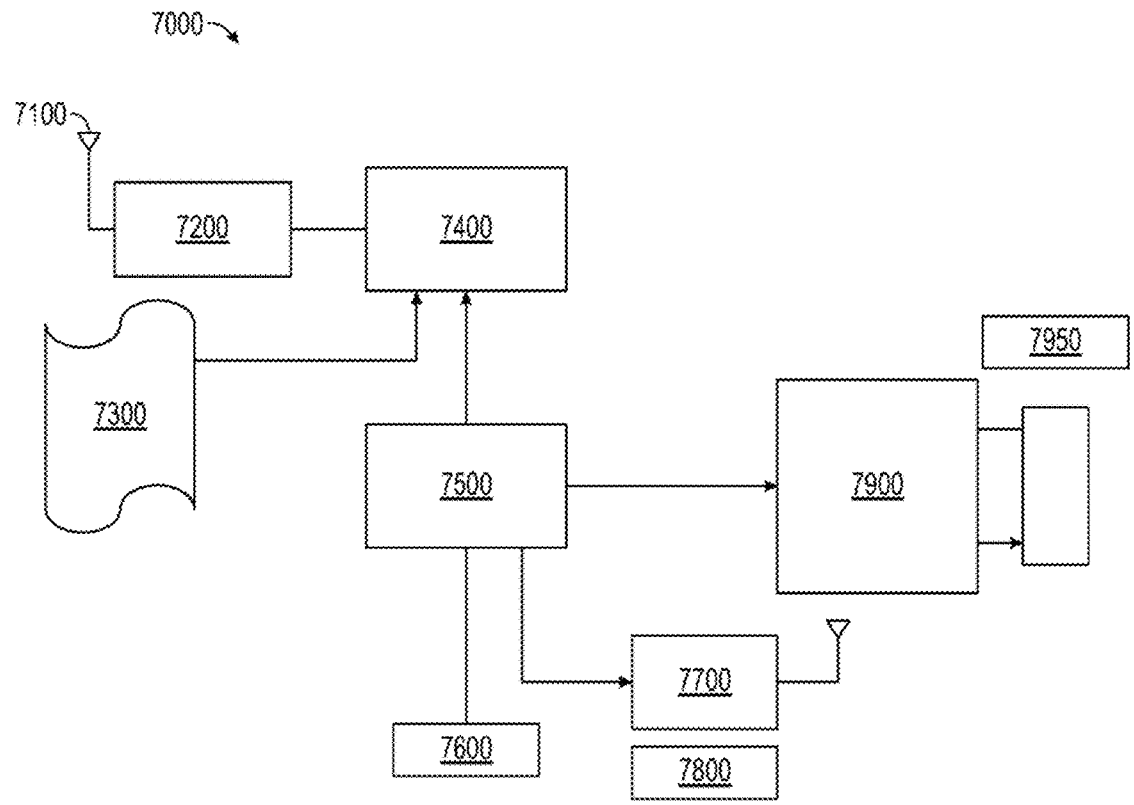
FIG. 9 is a block diagram of an embodiment of a system according to an embodiment disclosed herein.

FIG. 9 is a block diagram of an exemplary embodiment of a system 7000, which comprises an antenna 7100, an RF processor 7200, a baseband processor 7400, a controller 7500, an inertia measurement unit ("IMU") 7600, a baseband battery charging circuit 7900, and a battery 7950. Controller 7500 is communicatively coupled to a WP/LAN 7700. WP/LAN 7700 is communicatively coupled to a transmission channel 7800. Machine instructions and/or software and/or hardware 7300 are utilized by controller 7500 in processing signals that direct charging of battery 7950 via baseband battery charging circuit 7900. IMU 7600 assists in determining locations of devices communicatively coupled to controller 7500. Some embodiments can be implemented as an appliqué or as an integral part of the device that needs to be charged.

Figure 10:
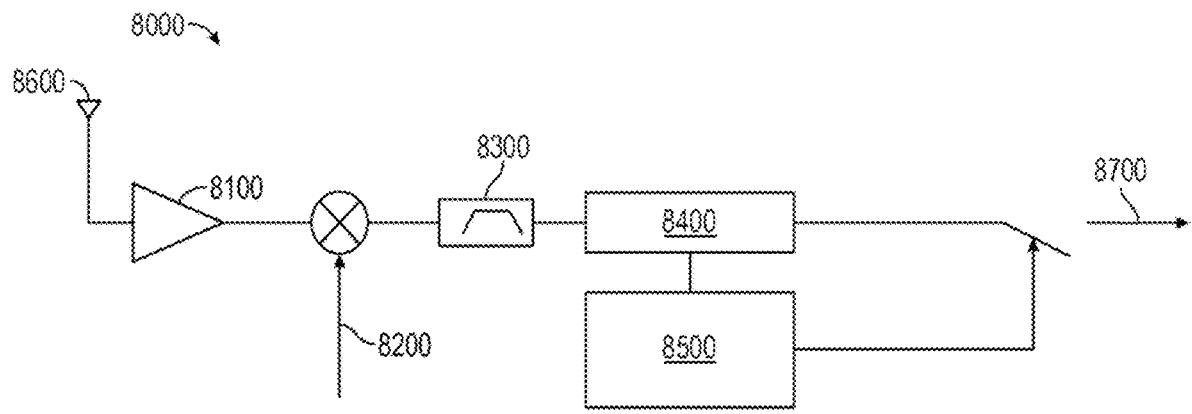
FIG. 10 is a block diagram of an embodiment of a mobile unit RF/BB processor system according to an embodiment disclosed herein.

FIG. 10 is a block diagram of an exemplary embodiment of a mobile unit RF/BB processor system 8000, which comprises a low noise amplifier 8100, a local oscillator 8200, a band pass filter 8300, a demodulator 8400, and a processor 8500. Processor 8500 performs an RF destination calculation and causes an RF signal 8700 to a battery charger. An omnidirectional antenna 8600 receives RF energy, demodulates, and determines the destination of a directional beam. If the directional beam is assigned to charge an electronic device, the DC electrical energy is available to charge a battery of the power bank and/or the electronic device.

Figure 11:
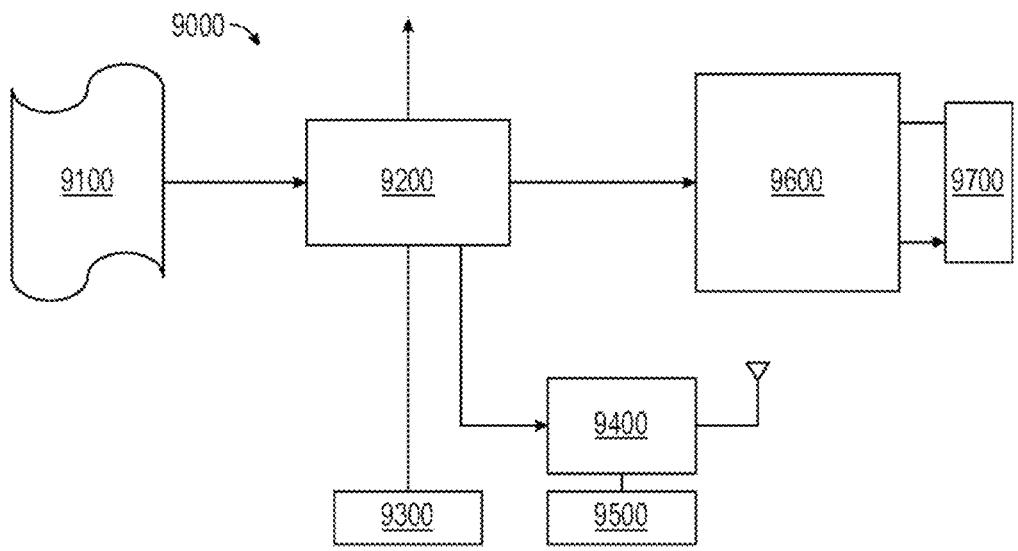
FIG. 11 is a block diagram of an embodiment of a system according to an embodiment disclosed herein.

FIG. 11 is a block diagram of an exemplary embodiment of a system 9000, which comprises a controller 9200, an IMU 9300, a baseband battery charging circuit 9600, and a battery 9700. Controller 9200 is communicatively coupled to a LAN 9400. LAN 9400 is communicatively coupled to a transmission channel 9500. Machine instructions and/or software and/or hardware 9100 are used by controller 9200 to facilitate charging of battery 9700.

Via machine instructions and/or software and/or hardware 9100, controller 9200 determines if an electronic device comprising battery 9700 needs charging and issues a request via LAN 9400. LAN 9400 can be an ad hoc WiGL network. IMU 9300 provides a coarse (i.e., loosely approximated) location information that is transmitted collaboratively via the ad hoc network to determine a fine (i.e., more accurately approximated) location. In some embodiments, LAN 9400 can be coupled to an ad hoc network. When a beam is assigned to battery 9700, the charging of battery 9700 starts.

Machine instructions and/or software and/or hardware 9100 determine if a unit needs charging and issues a request via the ad hoc WiGL network. IMU 9300 provides a coarse location information that is used collaboratively via signals transmitted over the ad hoc WiGL network to determine fine location information. When a beam is assigned, the charging starts.

Figure 12A:
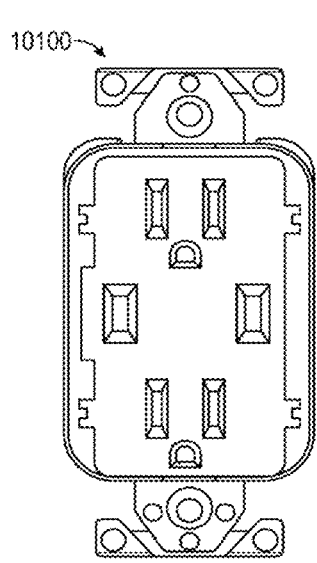
FIG. 12A is a drawings of components of a system according to embodiments disclosed herein.
Figure 12B:
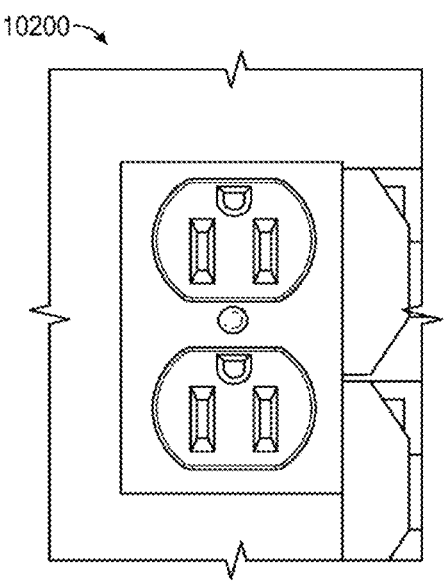
FIG. 12B is a drawings of components of a system according to embodiments disclosed herein.
Figure 12C:
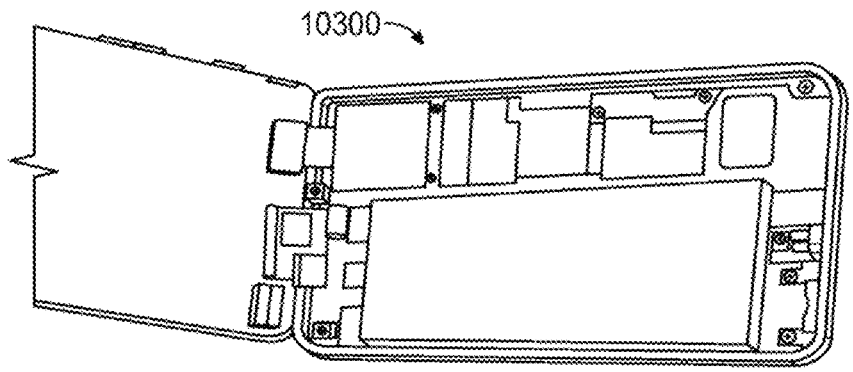
FIG. 12C is a drawings of components of a system according to embodiments disclosed herein.

FIG. 12 comprises images 10000 of exemplary embodiments, which comprise an electrical receptacle 10100. A multi-point power charger 10300 can be of a form to be directly coupled to electrical receptacle 10100. When so coupled, multi point power charger 10300 can cause electrical receptacle 10100 to have an appearance of installed multi point power charger 10200.

In some embodiments, a WiGL packet switching power network is provided in which WiGL acts as an energy delivery from a source to any energy consuming entity. WiGL entities comprise electronic devices such as phone, laptops, home appliances, trucks, cars, buses, motorcycles, unmanned aerial vehicles ("UAVs"), planes and satellites. Energy to be distributed by WiGL can be solar or any other form. WiGL determines what devices need how much energy and delivers energy to devices in an efficient manner. WiGL treats energy consuming entities that store energy as possible sharers of energy to other devices, e.g., via auxiliary multi point power chargers present in electronic devices. WiGL uses wired and wireless media to transfer energy. WiGL wireless delivery systems can use spark; acoustic; low, high, and very high RF frequencies; and/or laser energy.

In some embodiments the system detects devices that request power. In embodiments, WiGL requests energy from an energy source and packages energy into packets for delivery to devices. Each packet is sent to a selected device. In embodiments, WiGL queries devices concerning available energy to be delivered to other devices in the network. In some embodiments, WiGL delivers power based on routing protocols in consideration of quality of service ("QoS"), which may be defined by a user for each entity.

Figure 14:
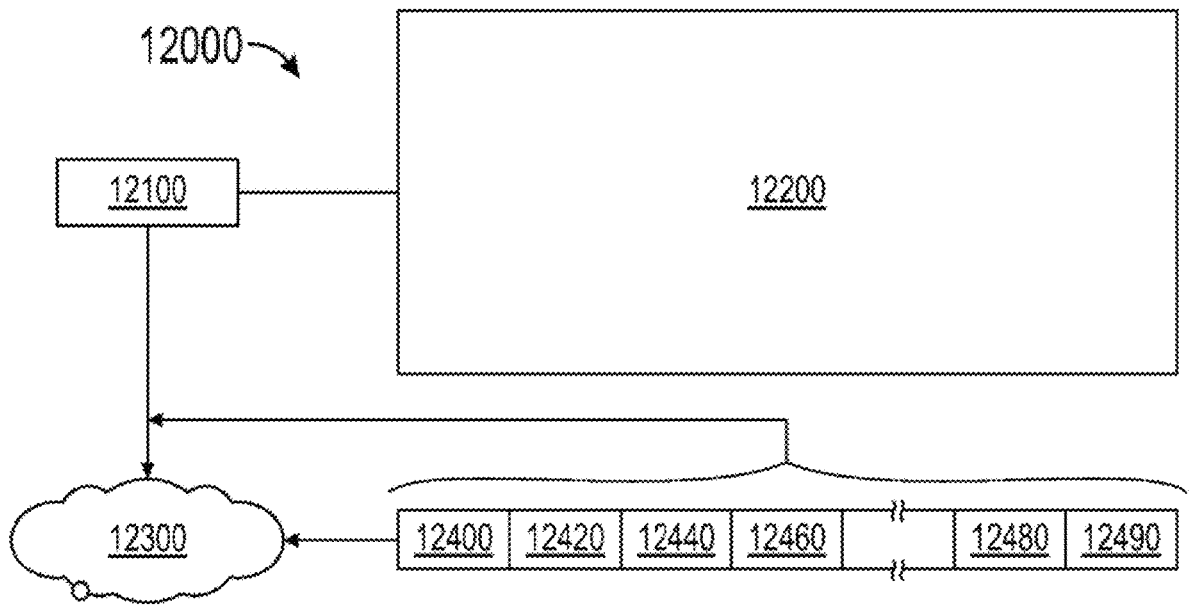
FIG. 14 is a block diagram of a system according to an embodiment disclosed herein.

FIG. 14 is a block diagram of an exemplary embodiment of a system 12000, which comprises a WiGL multi point power charger 12100, machine instructions and/or software and/or hardware 12200 utilizable by WiGL multi point power charger 12100, LAN of mobile electronic devices 12300, and set of packets 12400, 12420, 12440, 12460, 12480, and 12490. Machine instructions and/or software and/or hardware 12200 can direct WiGL multi point power charger 12100 to assign packets of energy to be delivered to predetermined devices. Machine instructions and/or software and/or hardware 12200 can direct WiGL multi point power charger 12100 to assign and route the set of packets to the predetermined devices. Machine instructions and/or software and/or hardware 12200 can route packets based upon a quality of service, which can be a function of urgency, how much power is needed, how often is the energy needed, and/or device local storage size, etc.

Set of packets 12400, 12420, 12440, 12460, 12480, and 12490 are delivered to LAN of mobile electronic devices 12300 via WiGL multi point power charger 12100 in time as a function of a routing protocols.

Some WiGL processes deliver power in two modes:
 a. Wired: from energy sources to wireless edge WiGL routers;

b. Wireless: from point to point or point to multipoint radio frequency connections.

Some WiGL devices, systems, and/or methods package power in packets with destination addresses of the devices they are meant to go to. Some WiGL devices, systems, and/or methods utilize a routing protocol to optimize energy delivery. When a device and/or system desires charging, it requests charging via an ad hoc network. An associated WiGL router is selected by the ad hoc network and packs the energy packets them via a technique such as time-division multiple access or frequency-division multiplexing. Energy packets are routed based on quality-of-service parameters defined by a user. A WiGL multi point power charger determines the location of the un-tethered unit and assigns a different beam if necessary. Radio frequency transmitted power can be dynamically adjusted based the location and/or charging requests of an untethered unit.

Figure 15:
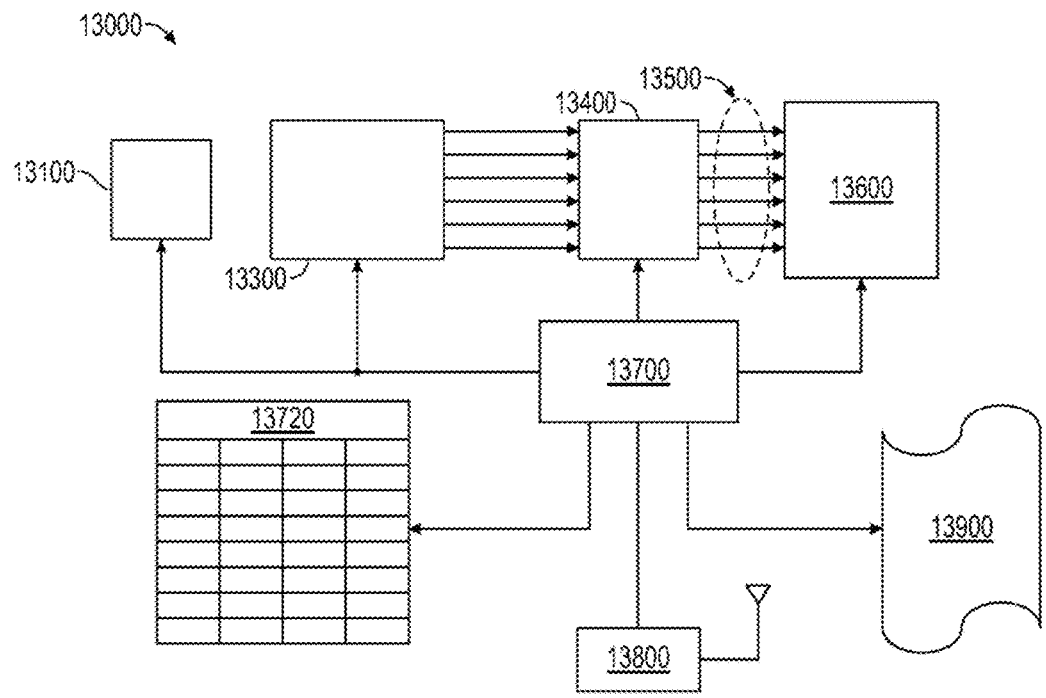
FIG. 15 is a block diagram of a system according to an embodiment disclosed herein.

FIG. 15 is a block diagram of an embodiment of a system 13000. Deliverable energy 13100 enters system 13000 and is processed via base band processor 13300 (e.g., converted to DC power). System 13000 comprises a radio frequency ("RF") processor 13400, a beam formation control 13500, a multidirectional antenna array 13600 (which can comprise an antenna—e.g., a parabolic antenna), a system controller 13700, a LAN 13800, and machine instructions and/or software and/or hardware 13900. System controller 13700 utilizes a WiGL routing table 13720, which can be utilized to route packets of energy to electronic devices via system 13000.

Figure 16:
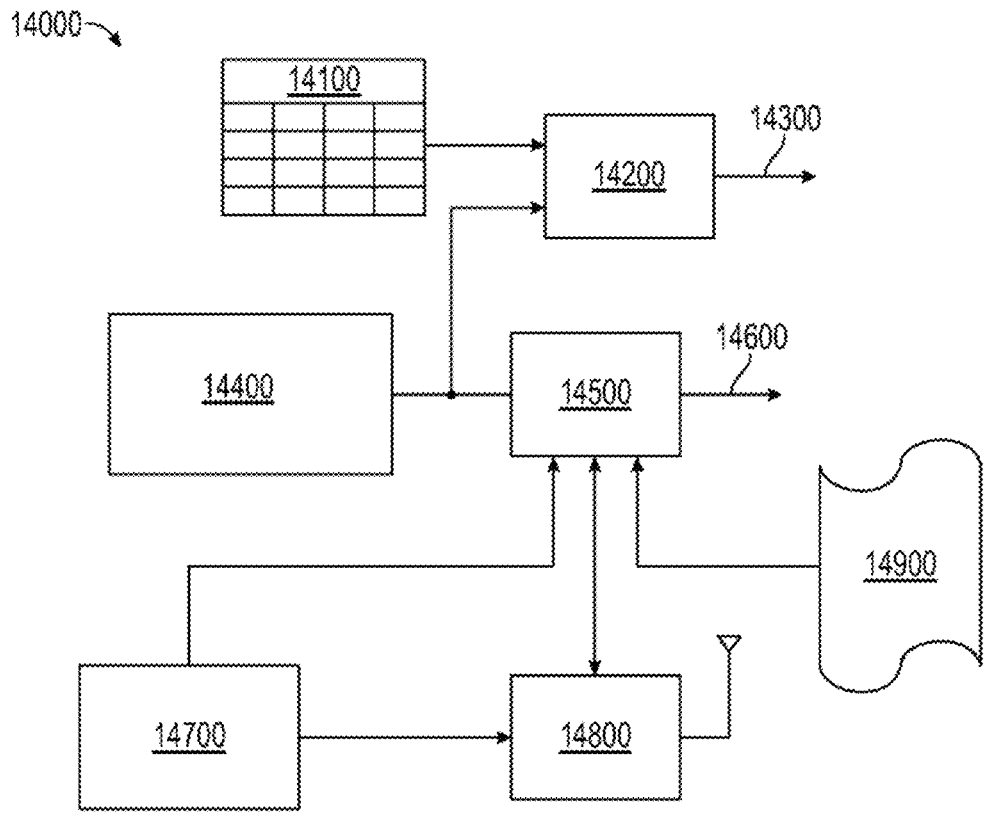
FIG. 16 is a block diagram of a system according to an embodiment disclosed herein.

FIG. 16 is a block diagram of an embodiment of a system 14000, which comprises a WiGL routing table 14100, a routing engine 14200, outgoing energy 14300 directed to an RF processor, energy to be delivered 14400, a system controller 14500, control signals 14600 routable to the RF processor and/or a base band processor, an energy saving monitor 14700, a LAN 14800, and machine instructions and/or software and/or hardware 14900.

In embodiments, WiGL systems provide for substantially untethered operation. Untethered devices signal a desire for charging and signal via an Ad hoc network to determine locations of the devices. One or more information devices coupled to the Ad hoc network determines and assigns one or more wall mounted units to perform the charging. The selected wall unit(s) generates a directed beam pointing toward the respective untethered devices and charging starts. Untethered device locations are substantially continuously being determined by the one or more information devices coupled to the ad hoc network. The untethered devices monitor their respective charging states. A new charging base (or auxiliary) station can be selected should a current one become obstructed and/or unreachable.

Figure 17:
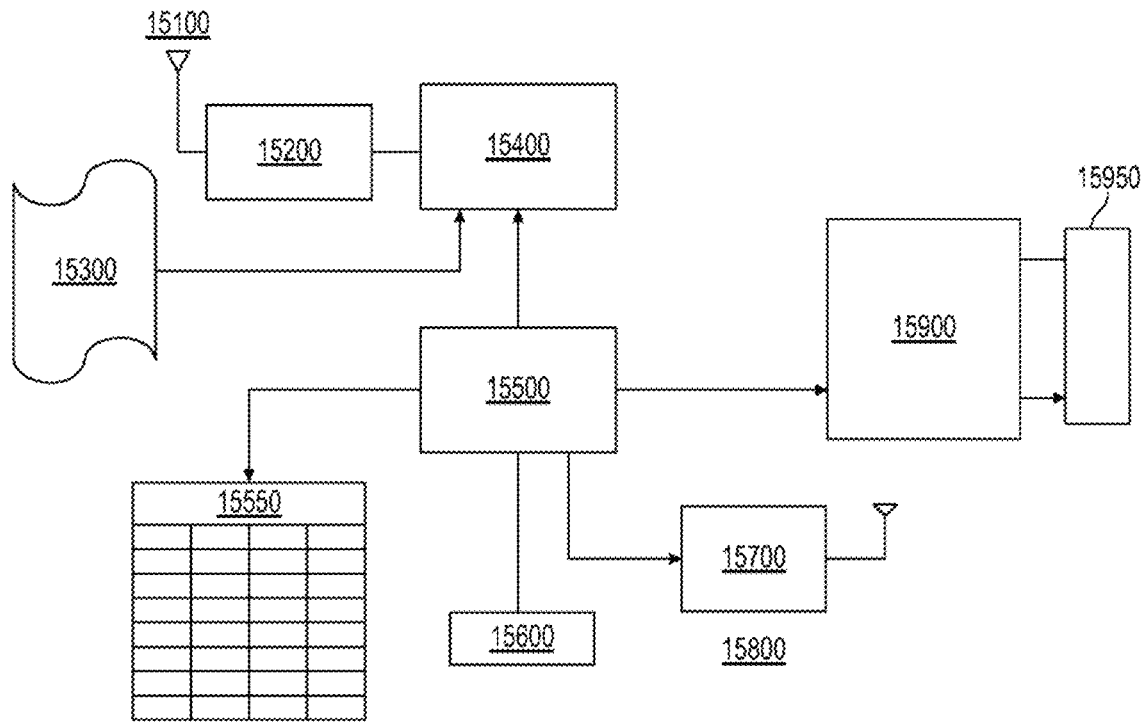
FIG. 17 is a block diagram of a system according to an embodiment disclosed herein.

FIG. 17 is a block diagram of an embodiment of a system 15000, which comprises an antenna 15100, an RF processor 15200, a baseband processor 15400, a controller 15500, an IMU 15600, a baseband battery charging circuit 15900, and a battery 15950. Controller 15500 is communicatively coupled to a WP/LAN 15700. WP/LAN 15700 is communicatively coupled to a transmission channel 15800. Machine instructions and/or software and/or hardware 15300 are utilized by controller 15500 in processing signals that direct charging of battery 15950 via baseband battery charging circuit 15900. IMU 15600 assists in determining locations of devices communicatively coupled to controller 15500. Controller 15500 can utilize a WiGL routing table 15550. Some embodiments can be implemented as a machine instruction application or as an integral part of the device that needs to be charged.

Figure 18:
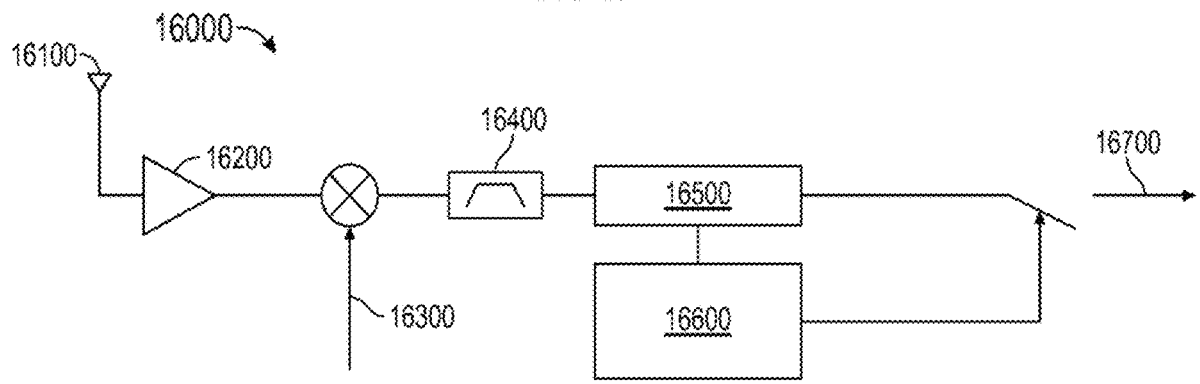
FIG. 18 is a block diagram of a WiGL mobile unit RFs and/or base band processors according to embodiments disclosed herein.

FIG. 18 is a block diagram of an embodiment of WiGL mobile unit RFs and/or base band processors 16000, which comprises antennae 16100, a low noise amplifier 16200, a local oscillator 16300, a band pass filter 16400, a demodulator 16500, and an RF destination calculation device 16600. Energy 16700 is routable to a battery charger and/or other electronic device and/or system. An omnidirectional antenna receives RF energy, demodulates, and determines the destination of a beam. If the beam is assigned to provide energy to a device and/or system, energy (e.g., DC electrical energy is made available to charge one or more batteries).

Figure 19:
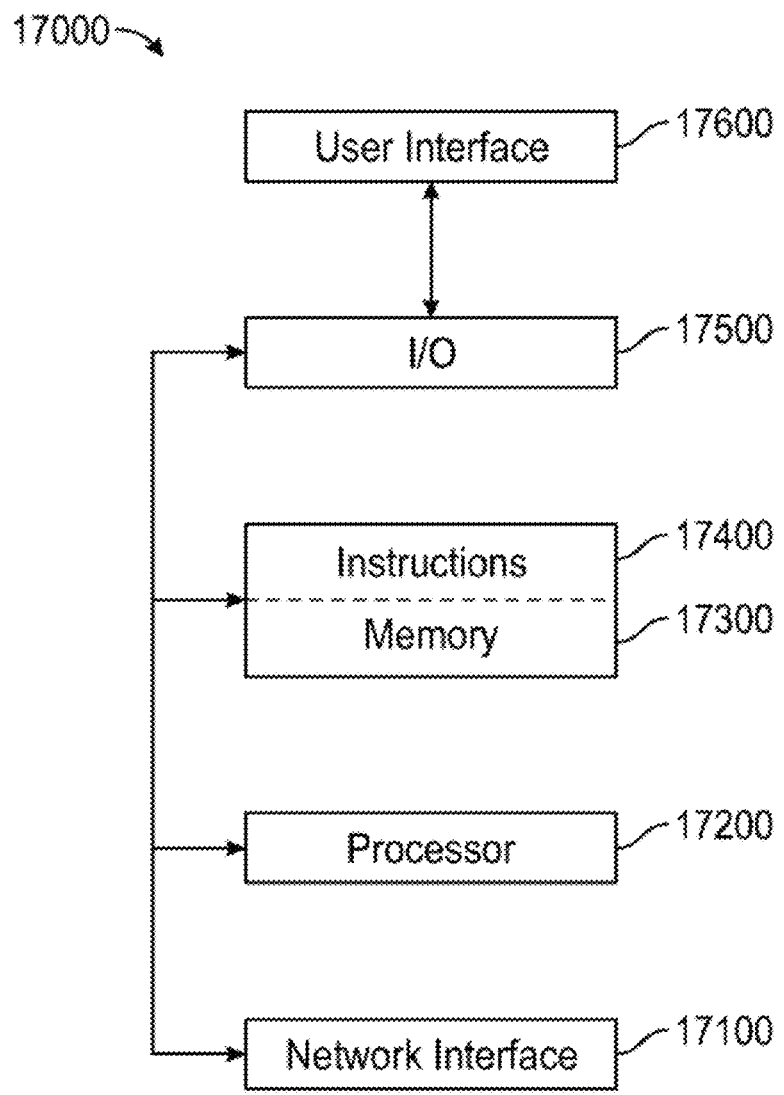
FIG. 19 is a block diagram of an information device according to an embodiment disclosed herein.

FIG. 19 is a block diagram of an embodiment of an information device 17000, which in certain operative embodiments can comprise, for example, the controllers 230, 256, and/or 266 shown in FIG. 3. Information device 17000 can comprise any of numerous circuits and/or components, such as for example, one or more network interfaces 17100, one or more processors 17200, one or more memories 17300 containing instructions 17400, one or more input/output (I/O) devices 17500, and/or one or more user interfaces 17600 coupled to one or more input/output (I/O) devices 17500, etc.

In some embodiments, via one or more user interfaces 17600, such as a graphical user interface, a user can view a rendering of information related to charging and/or energizing devices via a charge controller. The user can also disable the charging and/or set the charging at certain times or power levels.

Figure 20:
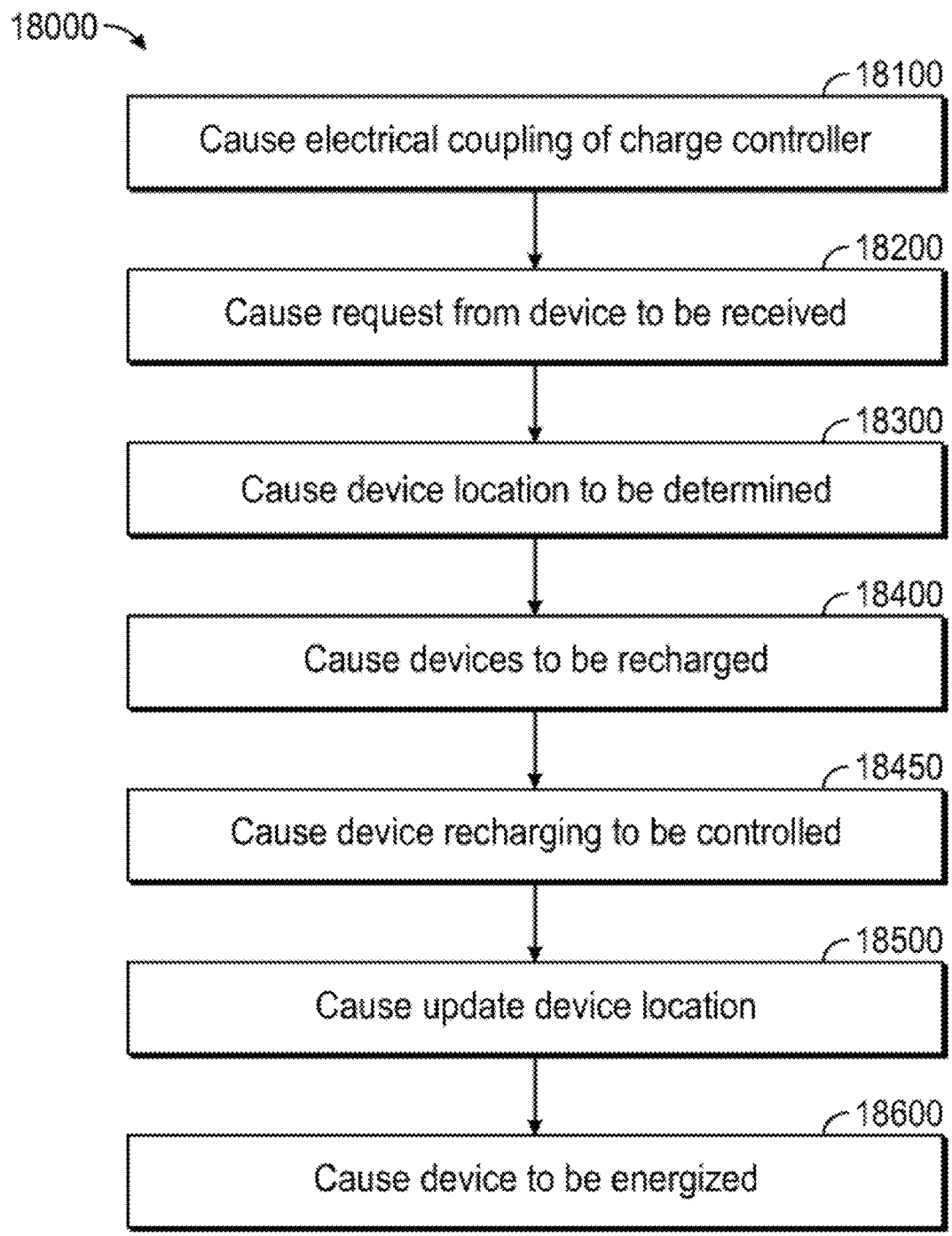
FIG. 20 is a flowchart of a method according to an embodiment disclosed herein.
Figure 21:
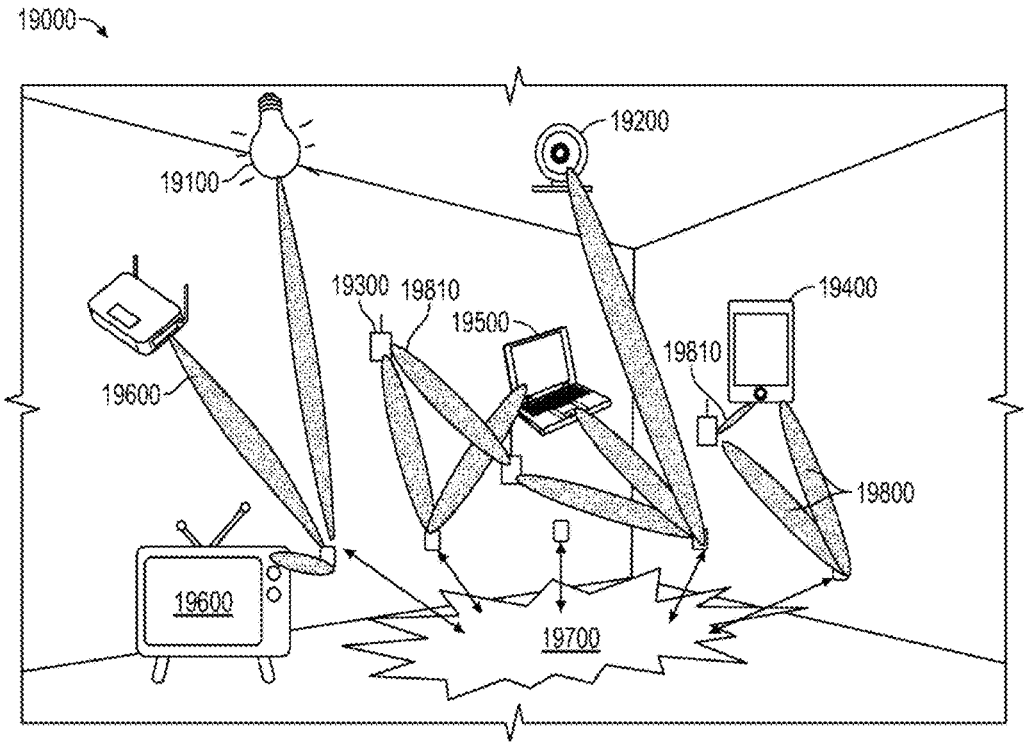
FIG. 21 is a block diagram of a system according to an embodiment disclosed herein.
Figure 22:
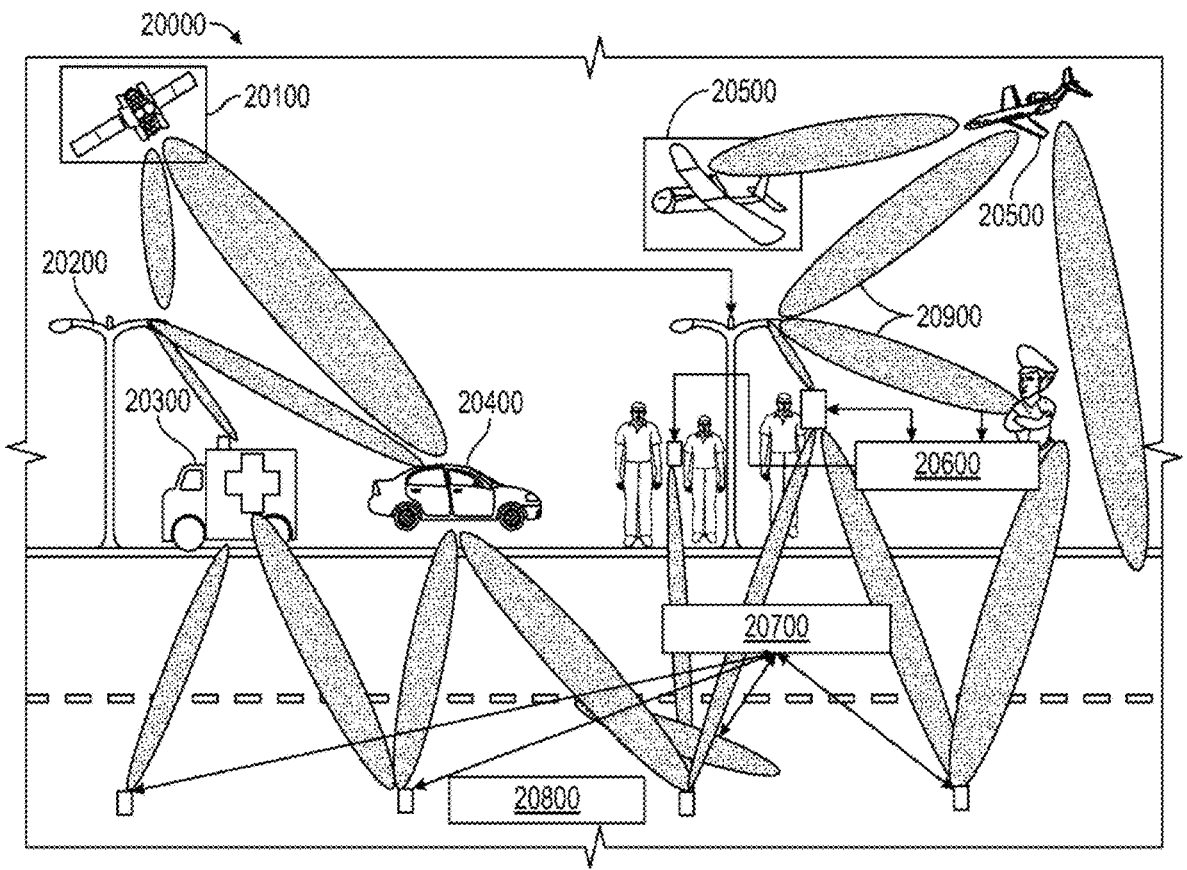
FIG. 22 is a block diagram of an embodiment of a system 20000.

FIG. 20 is a flowchart of an embodiment of a method 18000. At activity 18100, which in embodiments can cause a coupling of a charge controller to an electrical energy source (e.g., an electrical outlet, etc.). At activity 18200, in some embodiments can cause a request from a device to be received (e.g., a request to recharge a partially or nearly fully depleted battery). At activity 18300, in some embodiments can cause an electronic device to be located.

At activity 18400, some embodiments can cause the power bank and/or the electronic device to be charged via the charge controller. Some embodiments comprise causing an electronic device to charge via a base and/or auxiliary multi point power chargers of a plurality of base and/or auxiliary multi point power chargers. Some of such embodiments comprise receiving a request to charge the power bank and/or the electronic device. The base multi point power charger is coupleable to the electrical energy source. The multi point power charger is constructed to direct and/or redirect a beam of electrical energy toward the power bank and/or the electronic device such as to wirelessly charge and/or wirelessly power the power bank and/or the electronic device. The multi point power charger can be selected from the plurality of multi point power chargers responsive to a first determination of a location of the power bank and/or the electronic device and a second determination that a charging request has been received the power bank and/or the electronic device. The beam of electrical energy is routed and/or directed responsive to the determination of the location of the power bank and/or the electronic device. The power bank and/or the electronic device can be coupled to a local area network and the multi point power charger can also be coupled to the local area network. The local area network can comprise and/or be coupled to the electrical energy source. Radio frequency charging power can be dynamically controlled to provide low radiant power losses in the vicinity of devices to be charged. A charging element can be selected based on an optimum power delivered to the power bank and/or the electronic device, based on at least one of:

a. a requested speed of charging;
b. request voltage or current;
c. request a type of transmission or receiver energy (e.g., RF, DC, AC, piezoelectricity, and/or nanocrystal) based on a WiGL routing policy and/or table; and/or
d. a level of charge of a battery comprised by the power bank and/or the electronic device.

At activity 18450, some embodiments cause device recharging to be controlled via the charge controller. At activity 18500, some embodiments cause the location of the power bank and/or the electronic device to be automatically updated. Some of such embodiments cause redirection of one of the plurality of directional beams toward the updated location of the power bank and/or the electronic device. Some embodiments provide a plurality of wireless electrical power electromagnetic radiation (e.g., radio frequency) transmissions into a general location. In embodiments, the power bank and/or the electronic device charged is in range within which the multi point power charger can cause a wireless powering, self-charge or recharge. In embodiments, a charging element is selected based on an optimum power delivered to the power bank and/or the electronic device, based on at least one of:

a. a requested speed of charging; and/or
b. a level of charge of a battery comprised by the power bank and/or the electronic device.

At activity 18600, some embodiments cause electrical devices to be energized via the charge controller.

Some embodiments cause routing tables, policies, methods, models, flow of wireless electrical grid LAN usage to be created, published and/or used. Some embodiments provide certifications of or related to the usage, maintenance, repair, and diagnosis of wireless electrical grid LAN usage. Some of such embodiments provide educational models or courses related to or credited with educating students, theorists, practitioners, or laymen in wireless electrical grid LAN usage. Some of such embodiments provide published papers or articles, be they online or in print of or related to wireless electrical grid LAN usage.

Some embodiments provide for substantially wireless recharging of electronic devices. Some embodiments provide for recharging of electronic devices substantially without cords and/or outlets that are directly coupled to an electrical grid. Other embodiments provide for wireless recharging of electronic devices via a wireless charging system available via a network in a form of WiGL.

Some embodiments utilize an existing infrastructure via an alternating current or direct current power source. In some embodiments an existing infrastructure is utilized via universal serial bus ("USB") ports and/or recharger ports, etc. of electronic devices. In some of such embodiments, WiGL systems are coupled to a power source such as via plugging into an electrical outlet. In other embodiments, WiGL systems are wirelessly coupled to electronic devices via an interface plugged into one or more USB ports of the power bank and/or the electronic devices.

Some embodiments can utilize an antenna having a suitable gain ("dBi") (e.g., a 24 dBi parabolic antenna). The multi point power charger can comprise a parabolic antenna. The multi point power charger can comprise a parabolic antenna. Some embodiments can utilize components made by companies such as RF Diagnostics, LLC detect and/or harvest energy (e.g., one or more model number RFD102A-DET microwave energy detectors and/or one or more model number RFD102A-A microwave energy harvesting modules). Some embodiments transmit energy at a predetermined power output and frequency (e.g., approximately 0.5 watts at approximately 2.4 gigahertz). The multi point power charger can comprise an energy detector. Some embodiments can light up to a predetermined count of detectors (e.g., eight or more detectors) at predetermined distances (e.g., distances of greater than approximately three feet and/or up to over 100 feet for transmission and/or reception). The multi point power charger can be constructed to charge the power bank and/or the electronic device with the power bank and/or the electronic device at a distance of over 100 feet from the multi point power charger. Some embodiments can provide a predetermined charge current at a predetermined voltage (e.g., approximately five milliamps at approximately 1.4 volts). Other embodiments can provide an energy efficiency for charging (e.g., greater than approximately 15% efficiency). Still other embodiments can use or cause WiGL to use communications access technologies to multiplex smart energy such as, frequency division multiple access (FDMA); time division multiple access (TDMA); code division multiple access (CDMA); orthogonal frequency division multiple access (OFDMA); and/or spatial division multiple access (SDMA), etc.

Some embodiments provide for battery-to-battery WiGL capability (e.g., direct current to direct current charging) such as in vehicle and/or airplanes, etc. The multi point power charger can provide direct current to direct current charging.

Other embodiments provide wireless charging capabilities in systems comprising hardware, software and/or firmware constructed to implement methods of embodiments. Some of such embodiments can utilize one or more of apps, cards, radios and/or board technologies.

Some embodiments can provide laser or directed energy based WiGL, which can utilize substantially any energy source frequency on the sound or light spectrums.

Other embodiments can utilize a substantially single beam of WiGL.

Still other embodiments can utilize long haul transmissions, relays, and/or power boosting. The multi point power charger can obtain electrical energy from a long-haul transmission line. A power booster can be utilized to expand a range of the multi point power charger. Some embodiments can utilize cell towers and/or other tower technologies constructed to implement Wi-GL devices, systems, and/or methods. Other systems can comprise a tower that is constructed to provide energy via the multi point power charger.

Figure 13:
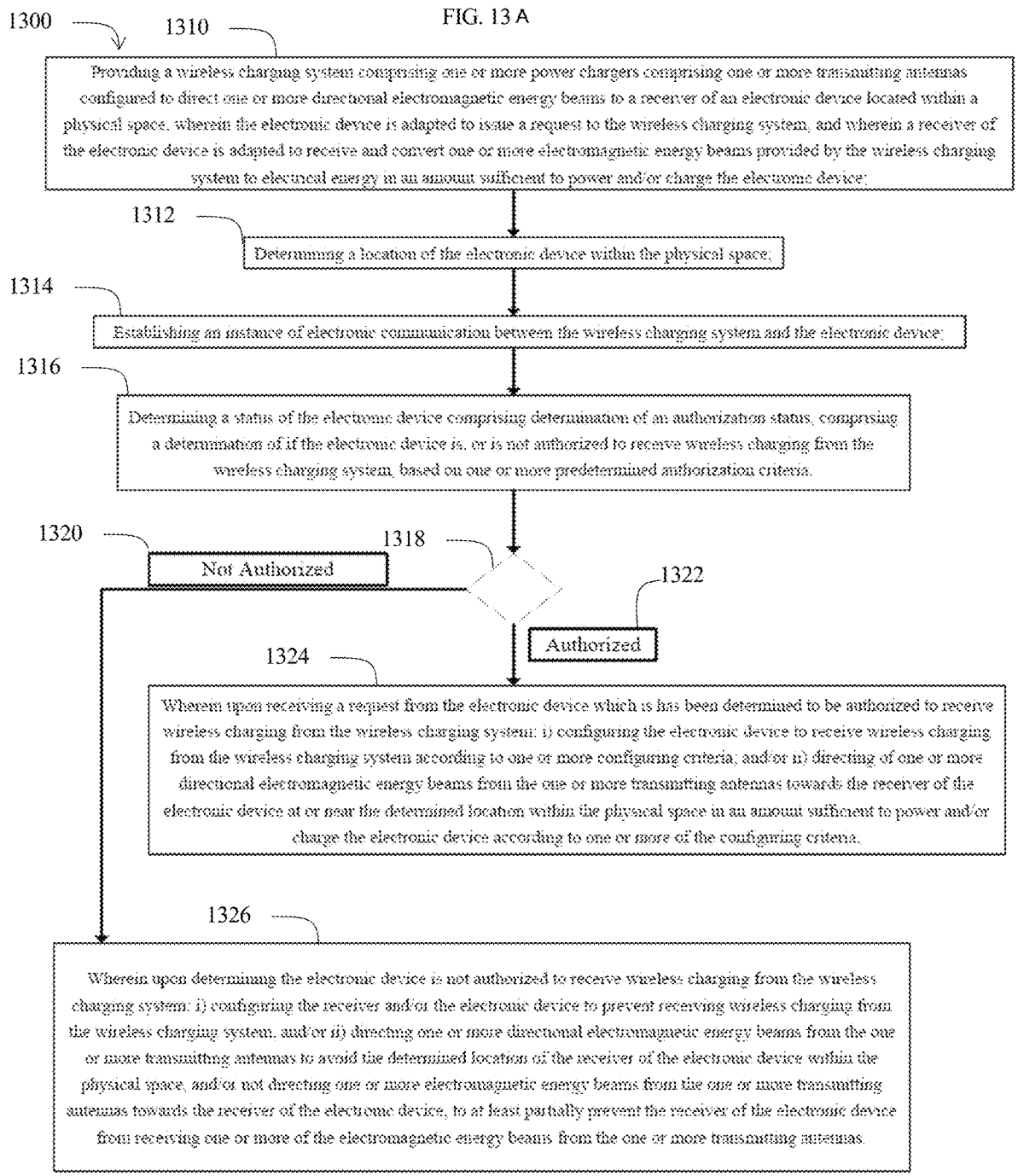
FIG. 13A is a flowchart of a method according to an embodiment disclosed herein.
FIG. 13B is a flowchart of a method of proving electrical power to a rechargeable power bank according to an embodiment disclosed herein.

In embodiments, the system determines a status of the power bank and/or the electronic device. This status may include a physical property of the power bank and/or the electronic device, e.g., a level of charge of the device, information on the brand, capacity, and/or requirements of the device, and/or the like. As shown in FIG. 13A, in some embodiments, the method 1300 comprises providing a wireless charging system according to one or more embodiments disclosed herein 1310, determining a location of the power bank and/or the electronic device with a physical space of the wireless charging system 1312, establishing electronic communication between the wireless charging system and the power bank and/or the electronic device 1314, and determining of a status of the power bank and/or the electronic device 1316, which in embodiments comprises determination of an authorization status of the device based on predetermined criteria according to a determination step 1318. FIG. 13 is a flow chart of a process 1300, according to an embodiment of the present disclosure. According to the embodiment, one or more process blocks of FIG. 13 may be performed by a wireless charging system according to embodiments disclosed herein, and a rechargeable wireless power bank according to embodiments disclosed herein.

As shown in FIG. 13B, process 1300B may include providing a rechargeable power bank having: a charging system having a controller coupled to a receiving system in electrical communication with an electrical storage device; configured to harvest energy from one or more directional electromagnetic energy beams provided by an external wireless charging system over a distance of greater than about 50 cm, convert the harvested energy into electrical energy, and direct the electrical energy into the electrical storage device; In embodiments, the controller is configurable to direct or not direct the electrical energy from the electrical storage device into an attached electronic device to power and/or recharge the attached electronic device based on one or more authorization criteria (block 1302B); direct one or more directional electromagnetic energy beams provided by an external wireless charging system over a distance of greater than about 50 cm to a location of the power bank (block 1304B); harvest energy from one or more directional electromagnetic energy beams provided by an external wireless charging system over a distance of greater than about 50 cm, convert the harvested energy into electrical energy, and directing the electrical energy into the electrical storage device (block 1306B); and direct electrical energy from the electrical storage device into an attached electronic device to power and/or recharge the attached electronic device based on one or more authorization criteria (block 1308B), and/or direct at least one secondary directional electromagnetic energy beam from the rechargeable power bank towards a location of at least one second rechargeable power bank, utilizing at least a portion of the energy stored in the electrical storage device, independent of a status of the rechargeable power bank and/or the attached electronic device, wherein the at least one second rechargeable power bank is configured to harvest energy from one or more of the secondary directional electromagnetic energy beams and convert the harvested energy into electrical energy and direct at least a portion of the electrical energy into a corresponding second electrical storage device (block 1310B).

It should be noted that while FIG. 13B shows example blocks of process 1300B, in some implementations, process 1300B may include additional blocks, fewer blocks, different blocks, or differently arranged blocks than those depicted in FIG. 13B. Additionally, or alternatively, two or more of the blocks of process 1300B may be performed in parallel.

In embodiments, the bidirectional communication between the wireless charging system and the power bank and/or the electronic device comprises, consists essentially of, or consists of a radio data network, commonly referred to in the art as Bluetooth communication. In embodiments, the presence of, and the relative location of the power bank and/or the electronic device being within a suitable distance to the wireless charging system for wireless power delivery, comprises, consists essentially of, or consists of a radio data network. In embodiments, the wireless charging system issues a request to locate receivers of the power bank and/or the electronic device according to predefined criteria, and the power bank and/or the electronic device provides a response to the wireless charging system comprising data required to establish an identity, a location, or other information required for establishing and/or comprising the bidirectional electronic communication. In embodiments, the wireless charging system receives a request issued by the power bank and/or the electronic device according to predefined criteria, and the wireless charging system provides a response to the power bank and/or the electronic device comprising data required to establish an identity, a location, or other information required for establishing and/or comprising the bidirectional electronic communication. In embodiments, this process is conducted without input from the end user of the power bank and/or the electronic device.

In embodiments, the data communication may be conducted utilizing a concatenation including at least one additional power bank and/or electronic device providing a link between the wireless charging system and the final power bank and/or the electronic device, e.g., via a meshed local area network, a meshed ad hoc local area network, a meshed ad hoc wireless power grid local area network, and/or the like.

In other embodiments, an intermediate power bank and/or the electronic device provides the wireless power delivery and the bidirectional electronic communication in the absence of the wireless charging system.

If the determination of an authorization status of the device returns a negative or "not authorized" status 1320, wherein the power bank and/or the electronic device is not authorized to receive wireless charging from the wireless charging system, and/or is not authorized to receive electrical power from the power bank, the method may include configuring the receiver and/or the power bank and/or the electronic device to prevent receiving wireless charging from the wireless charging system, and/or directing one or more directional electromagnetic energy beams from the one or more transmitting antennas to avoid the determined location of the receiver of the power bank within the physical space, and/or not directing one or more electromagnetic energy beams from the one or more transmitting antennas towards the receiver of the power bank, to at least partially prevent the receiver of the power bank from receiving one or more of the electromagnetic energy beams from the one or more transmitting antennas 1326.

If the determination 1318 of an authorization status of the device returns a positive or "authorized" status 1322, wherein the power bank and/or the electronic device is authorized to receive wireless charging from the wireless charging system, and/or the electronic device is authorized to receive electrical power from the power bank, the method may include configuring the electronic device to receive wireless charging from the wireless charging system according to one or more configuring criteria; and/or directing one or more directional electromagnetic energy beams from the one or more transmitting antennas towards the receiver of the power bank at or near the determined location within the physical space in an amount sufficient to power and/or charge the electronic device according to one or more of the configuring criteria 1324.

This authorization status comprising a determination by the system whether or not the electronic device is authorized to receive wireless charging from the wireless charging system, and/or the electronic device is authorized to receive electrical power from the power bank may be based on one or more predetermined authorization criteria. For example, in an embodiment wherein the wireless charging of an electronic device is provided on a fee-based arrangement, such as via subscription. When the system determines that the device is authorized to receive wireless charging from the wireless charging system, and/or the electronic device is authorized to receive electrical power from the power bank, a "positive" authorization is obtained. When the system determines that the device is not authorized or unauthorized to receive wireless charging from the wireless charging system, a "negative" authorization is obtained.

In embodiments, the determining of the authorization status comprises determining if the electronic device is, or is not associated with a user account authorized to receive wireless charging from the wireless charging system, and/or the electronic device is authorized to receive electrical power from the power bank, based on one or more predetermined authorization criteria.

In some embodiments, the authorization criteria include an authorization key, a lookup table, an identifier unique to the electronic device, an indication of the electronic device comprising an active service subscription, an indication of the electronic device comprising an active prepaid subscription, or a combination thereof.

In embodiments, the subscription verification comprises a machine-to-machine (M2M) process. In embodiments, the device to be charged receives a subscription request message for a subscription target resource. In embodiments, the subscription request message contains identification information of the electronic device and/or identification information of the of the wireless charging device. The verification may further include a checking step, wherein the wireless charging system determines whether or not the first device has a right for the subscription target resource.

In embodiments, the process may further include a determination by the wireless charging system whether or not the first device is compatible with, and/or what the optimum parameters are for wireless charging of the first device and/or if the resources are available to the wireless charging system, based at least partially on the identification information of the power bank and/or the electronic device.

When the power bank and/or the electronic device and the wireless charging device are determined to be compatible, the process may include a step comprising transmitting a notification message to the wireless charging device, the notification message including the identification information of the first device, identification information of the M2M device, and parameter information indicating a verification request; and receiving a response message from the wireless charging device in response to the notification message.

In embodiments, a privilege check for the subscription request may be performed by the wireless charging system based at least partially on the identification information of the first device and the response message may comprise a result of the privilege check performed by the wireless charging device.

In embodiments, the privilege check performed by the wireless charging device includes checking whether or not the first device has a right capable of transmitting a notification message to the wireless charging device. In some embodiments, the privilege check performed by the wireless charging device includes checking whether or not the first device has a right capable of configuring subscription for transmitting a notification message to the wireless charging device.

In one or more embodiments, the process may further comprise transmitting a temporary acceptance message for the subscription request message to the first device before the step of transmitting the notification message to the wireless charging device. In some embodiments, the process may further comprise determining whether or not a result of the privilege check performed by the wireless charging device is successful. When the result of the privilege check is successful, transmitting a subscription grant message to the first device. When the result of the privilege check is failure, cancelling the resource subscription. In embodiments, when the result of the privilege check is failure, transmitting a message for indicating that the resource subscription has been canceled to the first device, which in some embodiments the subscription request message comprises subscription information for creating a subscription resource, which may also include temporarily storing the subscription information.

In some embodiments, the subscription request message may comprise subscription information for creating a subscription resource in the first device. In such embodiments, the process may further comprise creating a subscription resource based on the subscription information.

In embodiments, the identification information of the first device is stored in creator attribute information of the subscription resource and the notification message may be generated when a notification event occurs in the device and the notification event comprises a status change of the subscription target resource. In other embodiments, the notification message is generated in the wireless charging system irrespective of an occurrence of a notification event.

In some embodiments, the identification information of the first device comprises address information indicating an originator of the subscription request message, and the identification information of the wireless charging device comprises address information indicating a notification target of the notification message. In one or more embodiments, the resource corresponds at least in-part to a data structure capable of being uniquely addressed using a unique address. In embodiments, the response message type information of the subscription request message indicates one of a blocking request, a synchronous non-blocking request, or an asynchronous non-blocking request.

In other embodiments, a method for determining and granting access of a device to be charged by the wireless charging system via subscriptions between the wireless charging system and the device may include receiving a subscription request associated with a machine-to-machine configuration, and/or a machine-to-machine network server. Responsive to the receipt of a notification associated with the received request, determining the device associated with the received notification, which may include an originator of the received request; and transmitting, to the device a notification message associated with the received notification. In embodiments, the step of determining includes comparing the received subscription request with at least one previously received subscription and/or comparing the received subscription request with a set of subscribed events stored in a table, e.g., a traffic table and/or the like. In embodiments, the method further includes the step of responding to the originator of the request subsequent to the step of determining. In embodiments, the method includes the step of updating a traffic table to reflect the received subscription. In embodiments, the received request is or comprises a hypertext transfer protocol request.

In embodiments, a method for authenticating a wireless device to be charged includes accessing a network via wireless communication with the wireless charging device. This may include utilizing one or more authentication information elements transmitted between the wireless charging device and the device in a bidirectional exchange involving one or more messages, the one or more authentication information elements including data for use in an authentication handshake procedure involving the one or more messages and for establishing that both the wireless charging device and the device possess a common or specific cryptographic key, and/or one or more of a beacon frame, an association request frame, and an association response frame, and wherein the data includes an arbitrary number that can be used just once in a cryptographic communication, e.g., a "nonce", for use in an authentication handshake procedure; and a message integrity check value for use in the authentication handshake procedure. In embodiments, the method may further comprise receiving one or more further authentication information elements received by one or more of the devices, which may be based on exchange of the one or more authentication information elements and the one or more further authentication information elements.

In embodiments, one or more authentication information elements are transmitted from the device to the wireless charging device.

In embodiments, at least some of the steps performed are done in parallel with the authentication procedure. In embodiments, the data includes a key identifier indicative of which key of a plurality of pre-shared keys is to be used in the authentication procedure. In some embodiments, the authentication procedure comprises transmitting a first authentication information element from the wireless charging device to the device, the first authentication information element including a first nonce value; subsequently transmitting a second authentication information element from the device to the wireless charging device, the second authentication information element including a second nonce value and a Message Integrity Check value; and subsequently transmitting a third authentication information element from the wireless charging device to the device, the third authentication information element including a further Message Integrity Check value, wherein the authentication information elements include the first authentication information element and the third authentication information element; or the second authentication information element.

In embodiments, the data between the wireless charging device and the device to be charged includes one or more uniform resource identifiers, a timestamp parameter, or a combination thereof.

In embodiments, the system and/or the method further comprises causing the power bank and/or the electronic device to present an indication perceivable by an end user of the power bank and/or the electronic device, indicating the authorization status of the power bank and/or the electronic device. This may be via a network transmission originated by the wireless charging system to the electronic device, or originated by an ancillary device associated with the wireless charging system, e.g., an access control server or other access control function or system. The indication may be via text (SMS) message, may result in a graphic message displayed on the electronic device, an automated telephone call, a haptic indication, and/or the like.

In some embodiments, wherein the determining of the authorization status results in the power bank and/or the electronic device not being authorized to receive wireless charging from the wireless charging system and/or the electronic device not being authorized to receive electrical power from the power bank, a negative authorization result, the method further comprises causing the electronic device to present an indication perceivable by the end user of the electronic device. I some embodiments the method further comprises allowing the end user to change the authorization status of the electronic device to being authorized to receive wireless charging from the wireless charging system, and/or the electronic device is authorized to receive electrical power from the power bank.

In some embodiments, allowing the end user to change the authorization status of the electronic device to being authorized to receive wireless charging from the wireless charging system, and/or the electronic device is authorized to receive electrical power from the power bank comprises a request for, and a verification of a financial transaction which ultimately results in a transfer of funds. This may include a conventional currency operated device wherein the intended end user may provide currency directly to a recipient device and/or a card-operated device whereby the user paying by card is connected to a credit card transaction center to obtain an authorization code. This may also include the use of prepaid cards and other RFID credit cards for paying small amount offline without the need of signing a credit card voucher.

In other embodiments, and authorization payment may be made via one or more online payment methods, e.g., PayPal, via communication with a bank account direct debit system and a back-end pay-by-phone server computer system, and/or the like so that fees can be directly debited from users' bank accounts, credit card accounts, or telephone payment accounts. In this manner, a user can have multiple payment options including swiping a contactless IC prepaid card, via a contactless IC card reader unit or paying by dialing a cell phone via the remotely controllable pay-by-phone unit according to commonly understood systems known in the art.

In embodiments, wherein the determining of the authorization status results in the electronic device being authorized to receive wireless charging from the wireless charging system, and/or the electronic device is authorized to receive electrical power from the power bank (a positive authorization result), the method further comprises and/or the system is configured to configure the power bank and/or the electronic device (or the receiver associated with the power bank and/or the electronic device) to receive wireless charging from the wireless charging system according to one or more configuring criteria. This may include providing various frequencies to the device, and/or switching of various frequencies of the directional electromagnetic energy beams directed to the device according to a predetermined schedule.

In a related embodiment, the electromagnetic energy beams is not directed to the device, or is only partially directed to the device, but is instead broadcast to an entire area. The ability of the device to receive the wireless charging is controlled by switching of the various frequencies and/or utilizing packet switching and/or the like according to a schedule determined by the wireless charging system and/or the power bank and/or the electronic device to enable the power bank and/or the electronic device to receive adequate power for charging.

In embodiments, a positive authorization result includes the method or the system being configured to directing of one or more directional electromagnetic energy beams from the one or more transmitting antennas towards the receiver of the power bank at or near the determined location within the physical space in an amount sufficient to power and/or charge the power bank and/or the electronic device according to one or more of the configuring criteria, as compared to a negative authorization result wherein directing the electromagnetic energy beam in the direction of, or to the location of the unauthorized device is avoided. In doing so, at least a portion of the energy that would be received by an authorized device is prevented from being received by an unauthorized device.

In some embodiments, the determining of a status comprises a determination of one or more physical properties and/or states of the power bank and/or the electronic device, and directing of the one or more directional electromagnetic energy beams from the one or more transmitting antennas towards the receiver of the power bank at or near the determined location within the physical space in an amount sufficient to power and/or charge the power bank and/or the electronic device, based on at least one of the physical properties and/or states of the power bank and/or the electronic device and/or based on one or more predetermined criteria.

In some embodiments, wherein the authorization status results in the power bank and/or the electronic device not being authorized to receive wireless charging from the wireless charging system and/or the electronic device not being authorized to receive electrical power from the power bank, the method further comprises and/or the system is configuring to configure the receiver and/or the electronic device to prevent receiving wireless charging from the wireless charging system. This may be achieved via a network connection, and/or may be included in or in unison with the electromagnetic beam directed towards the power bank and/or the electronic device.

Likewise, wherein a negative authorization status is determined, the method further comprises or the system is configured to direct one or more directional electromagnetic energy beams from the one or more transmitting antennas to avoid the determined location of the receiver of the unauthorized electronic device within the physical space, and/or the system stops directing one or more electromagnetic energy beams from the one or more transmitting antennas towards the receiver of the power bank, to at least partially prevent the receiver of the power bank from receiving one or more of the electromagnetic energy beams from the one or more transmitting antennas.

EMBODIMENTS LISTING

Embodiments of the instant disclosure include the following:

E1. A rechargeable power bank, comprising:
a charging system comprising a controller coupled to a receiving system in electrical communication with an electrical storage device; configured to harvest energy from one or more directional electromagnetic energy beams provided by an external wireless charging system over a distance of greater than about 50 cm, convert the harvested energy into electrical energy, and direct the electrical energy into the electrical storage device, wherein the controller is configurable to direct or not direct the electrical energy from the electrical storage device into an attached electronic device to power and/or recharge the attached electronic device based on one or more authorization criteria.

E2. The rechargeable power bank according to embodiment E1, wherein the rechargeable power bank is physically separate from the attached electronic device.

E3. The rechargeable power bank according to embodiments E1 through E2, comprising a power outlet which is releasably attachable to a power inlet of the electronic device.

E4. The rechargeable power bank according to embodiments E1 through E3, wherein the power outlet comprises a releasable electrical connector, a near field inductive power charger, or a combination thereof.

E5. The rechargeable power bank according to embodiments E1 through E4, further comprising an intermediate electrical storage device configured and arranged to receive electrical energy from the receiving system and provide electrical energy to the electrical storage device.

E6. The rechargeable power bank according to embodiments E1 through E5, wherein the controller is configured to control the receiving system to receive and harvest energy from the directional electromagnetic energy beams provided by the external wireless charging system.

E6.1. The rechargeable power bank according to embodiments E1 through E6, wherein the controller is configured to control the directing of electrical energy into the intermediate electrical storage device when present.

E6.2. The rechargeable power bank according to embodiments E1 through E6.1, wherein the controller is configured to control the directing of electrical energy into the electric storage device.

E6.3 The rechargeable power bank according to embodiments E1 through E6.2, wherein the controller is configured to control the directing of the electrical energy from the electrical storage device to the attached electronic device.

E7. The rechargeable power bank according to embodiments E1 through E6, configured to establish an instance of bidirectional electronic communication with the external wireless charging system, request power from the external wireless charging system; and/or provide authorization information to the external wireless charging system.

E8. The rechargeable power bank according to embodiments E1 through E7, wherein the bidirectional electronic communication with the external wireless charging system comprises direct and/or indirect electronic communication via at least one of:
a local area data network;
an ad-hoc data network;
a wide area data network;
a wireless computer network;
a meshed network;
a wired computer network;
the internet;
a radio data network;
a cellular data network;
a cellular data network provided at least in part by the electronic device;
a wireless power grid local area network;
an ad hoc wireless power grid local area network; or
a meshed ad hoc wireless power grid local area network.

E9. The rechargeable power bank according to embodiments E1 through E8, wherein the one or more authorization criteria comprises an authorization status of whether or not' the rechargeable power bank is authorized to receive wireless charging from the wireless charging system based on one or more predetermined criteria.

E9.1. The rechargeable power bank according to embodiments E1 through E9, wherein the one or more authorization criteria comprises an authorization status of whether or not the attached electronic device is authorized to receive wireless charging from the wireless charging system based on one or more predetermined criteria.

E9.2. The rechargeable power bank according to embodiments E1 through E9.1, wherein the one or more authorization criteria comprises an authorization status of whether or not the attached electronic device is authorized to receive electrical energy from the rechargeable power bank based on one or more predetermined criteria.

E10. The rechargeable power bank according to embodiments E1 through E9.2, wherein the authorization criteria includes an authorization key; a lookup table; an identifier unique to the device receiver; an identifier unique to the electronic device; a user account; a service subscription; a prepaid subscription; a blockchain permission; a blockchain transaction; or a combination thereof.

E11. The rechargeable power bank according to embodiments E1 through E10, wherein the controller is configured to cause the attached electronic device to present an indication perceivable by an end user of the electronic device, indicating the authorization status.

E12. The rechargeable power bank according to embodiments E1 through E11, configured such that when the determination of the authorization status results in the rechargeable power bank and/or the attached electronic device not being authorized to receive wireless charging from the wireless charging system, and/or the attached electronic device is not authorized to receive electrical energy from the rechargeable power bank, the controller is configured to prevent the directing of the electrical energy from the electrical storage device to the attached electronic device.

E13. The rechargeable power bank according to embodiments E1 through E12 configured such that when the determination of the authorization status results in the rechargeable power bank and/or the attached electronic device not being authorized to receive wireless charging from the wireless charging system, and/or the attached electronic device is not authorized to receive electrical energy from the rechargeable power bank, the controller configures the receiving system to harvest energy from one or more directional electromagnetic energy beams provided by the external wireless charging system, convert the harvested energy into electrical energy, and direct the electrical energy into the electrical storage device and to prevent the directing of the electrical energy from the electrical storage device to the attached electronic device.

E14. T The rechargeable power bank according to embodiments E1 through E13, configured such that when the determination of the authorization status results in the rechargeable power bank and/or the attached electronic device not being authorized to receive wireless charging from the wireless charging system, and/or the attached electronic device is not authorized to receive electrical energy from the rechargeable power bank, the controller is configured to cause the attached electronic device to present an indication perceivable by the end user of the electronic device allowing the end user to change the authorization status of the rechargeable power bank to being authorized to receive wireless charging from the wireless charging system, wherein the changing of the authorization status comprises a financial transaction.

E15. The rechargeable power bank according to embodiments E1 through E14, configured such that wherein the determining of the authorization status results in the rechargeable power bank and/or the attached electronic device as being authorized to receive wireless charging from the wireless charging system, and/or the attached electronic device is authorized to receive electrical energy from the rechargeable power bank, the controller configures the receiving system to receive wireless charging from the wireless charging system according to one or more configuring criteria; the controller allows the directing of electrical energy from the electrical storage device to the attached electronic device, or a combination thereof.

E16. The rechargeable power bank according to embodiments E1 through E15, configured to request wireless charging from the external wireless charging system independent of any attached electronic device.

E17. The rechargeable power bank according to embodiments E1 through E16, configured to request wireless charging from the external wireless charging system based at least on a level of charge of the electrical storage device.

E18. The rechargeable power bank according to embodiments E1 through E17, configurable to allow the directing of electric energy from the electric storage device to the attached electronic device independent of any external wireless charging system.

E19. The rechargeable power bank according to embodiments E1 through E18, configured for peer-to-peer power transmission, wherein the rechargeable power bank further comprises a transmitter and/or a transceiver configurable for electronic communication with another rechargeable power bank, and the controller configurable to direct at least one secondary directional electromagnetic energy beam from the rechargeable power bank towards a location of at least one second rechargeable power bank, utilizing at least a portion of the energy stored in the electrical storage device, independent of a status of the rechargeable power bank and/or the attached electronic device, wherein the at least one second rechargeable power bank is configured to harvest energy from one or more of the secondary directional electromagnetic energy beams and convert the harvested energy into electrical energy and direct at least a portion of the electrical energy into a corresponding second electrical storage device.

E20. The rechargeable power bank according to embodiments E1 through E19, configured to form a meshed ad-hoc wireless power grid local area network with the external wireless charging system and/or other rechargeable power banks comprising directional wireless charger system-to-rechargeable power bank power distribution, and/or peer-to-peer directional wireless rechargeable power bank-to-rechargeable power bank power distribution, in which each of the rechargeable power banks and each of the wireless charger systems present are nodes of the meshed network.

E21. A method comprising: providing a wireless charging system comprising one or more power chargers comprising one or more transmitting antennas configured to direct one or more directional electromagnetic energy beams to a receiver of the power bank according to any one of Embodiments E1 through E20, located within a physical space, wherein the power bank and/or the electronic device is adapted to issue a request to the wireless charging system, and wherein a receiver of the power bank is adapted to receive and convert one or more electromagnetic energy beams provided by the wireless charging system to electrical energy in an amount sufficient to power and/or charge the power bank and/or the electronic device; determining a location of the power bank and/or the electronic device within the physical space; upon receiving a request from the power bank and/or the electronic device; directing one or more directional electromagnetic energy beams from the one or more transmitting antennas towards the receiver of the power bank at or near the determined location within the physical space in an amount sufficient to power and/or charge the power bank and/or the electronic device; wherein upon motion of the power bank and/or the electronic device within the physical space, updating the location of the power bank and/or the electronic device therein; and redirecting at least one of the plurality of the directional electromagnetic energy beams from the one or more transmitting antennas toward the receiver of the power bank at or near the updated location in an amount sufficient to power and/or charge the power bank and/or the electronic device.

E22. The method according to embodiment E21, further comprising establishing an instance of bidirectional electronic communication between the wireless charging system and the power bank and/or the electronic device.

E23. The method according to embodiments E21 through E22, wherein the bidirectional electronic communication between the wireless charging system and the power bank and/or the electronic device comprises direct and/or indirect electronic communication via: a local area network; an ad-hoc network; a wide area network; a wireless computer network; a wired computer network; a cellular data network; a cellular data network provided at least in part by the power bank and/or the electronic device; or a combination thereof.

E24. The method according to embodiments E21 through E23, further comprising determining a status of the power bank and/or the electronic device.

E25. The method according to embodiments E21 through E24, wherein the determining of the status of the power bank and/or the electronic device is conducted prior to and/or coincident which receiving the request from the power bank and/or the electronic device; after receiving the request from the power bank and/or the electronic device; prior to and/or coincident with determining the location of the power bank and/or the electronic device within the physical space; after determining the location of the power bank and/or the electronic device within the physical space; prior to and/or coincident with updating the location of the power bank and/or the electronic device within the physical space; after updating the location of the power bank and/or the electronic device within the physical space; prior to and/or coincident with receiving of a request from the power bank and/or the electronic device; after receiving of a request from the power bank and/or the electronic device; or any combination thereof.

E26. The method according to embodiments E21 through E25, wherein the determining of a status comprises determination of an authorization status, comprising a determination of if the electronic device is authorized to receive wireless charging from the wireless charging system, and/or the electronic device is authorized to receive electrical power from the power bank, or is not authorized to receive wireless charging from the wireless charging system, and/or the electronic device is not authorized to receive electrical power from the power bank, based on one or more predetermined authorization criteria.

E27. The method according to embodiments E21 through E26, wherein the authorization criteria include an authorization key, a lookup table, an identifier unique to the power bank and/or the electronic device, an indication of the power bank and/or the electronic device comprising an active service subscription, an indication of the power bank and/or the electronic device comprising an active prepaid subscription, or a combination thereof.

E28. The method according to embodiments E21 through E27, wherein the determining of the authorization status comprises determining if the power bank and/or the electronic device is, or is not associated with a user account authorized to receive wireless charging from the wireless charging system, and/or the electronic device is authorized to receive electrical power from the power bank, based on one or more predetermined criteria.

E29. The method according to embodiments E21 through E28, further comprising causing the power bank and/or the electronic device to present an indication perceivable by an end user of the power bank and/or the electronic device, indicating the authorization status of the electronic device.

E30. The method according to embodiments E21 through E29, wherein the determining of the authorization status results in the power bank and/or the electronic device not being authorized to receive wireless charging from the wireless charging system, and/or the electronic device is authorized to receive electrical power from the power bank and/or the electronic device not being authorized to receive electrical power from the power bank, the method further comprises causing the electronic device to present an indication perceivable by the end user of the electronic device, and allowing the end user to change the authorization status of the electronic device to being authorized to receive wireless charging from the wireless charging system, and/or the electronic device is authorized to receive electrical power from the power bank.

E31. The method according to embodiments E21 through E30, wherein the allowing the end user to change the authorization status of the electronic device to being authorized to receive wireless charging from the wireless charging system, and/or the electronic device is authorized to receive electrical power from the power bank comprises a request for, and a verification of a financial transaction resulting in a transfer of funds.

E32. The method according to embodiments E21 through E31, wherein the determining of the authorization status results in the electronic device being authorized to receive wireless charging from the wireless charging system, and/or the electronic device is authorized to receive electrical power from the power bank, the method further comprises configuring the electronic device to receive wireless charging from the wireless charging system according to one or more configuring criteria.

E33. The method according to embodiments E21 through E32, further comprising the directing of one or more directional electromagnetic energy beams from the one or more transmitting antennas towards the receiver of the power bank at or near the determined location within the physical space in an amount sufficient to power and/or charge the electronic device according to one or more of the configuring criteria.

E34. The method according to embodiments E21 through E33, wherein the configuring criteria includes a time stamp; a level of charge of the electronic device; an identification variable specific to the electronic device; a predetermined criteria; or a combination thereof.

E35. The method according to embodiments E21 through E34, wherein the determining of a status comprises a determination of one or more physical properties and/or states of the electronic device, and directing of the one or more directional electromagnetic energy beams from the one or more transmitting antennas towards the receiver of the power bank at or near the determined location within the physical space in an amount sufficient to power and/or charge the electronic device, based on at least one of the physical properties and/or states of the electronic device and/or based on one or more predetermined criteria.

E36. The method according to embodiments E21 through E 35, wherein the determining of the authorization status results in the power bank and/or the electronic device not being authorized to receive wireless charging from the wireless charging system, and/or the electronic device is authorized to receive electrical power from the power bank and/or the electronic device not being authorized to receive electrical power from the power bank, the method further comprises configuring the receiver and/or the electronic device to prevent receiving wireless charging from the wireless charging system.

E37. The method according to embodiments E21 through E36, wherein the determining of the authorization status results in the power bank and/or the electronic device not being authorized to receive wireless charging from the wireless charging system, and/or the electronic device is authorized to receive electrical power from the power bank and/or the electronic device not being authorized to receive electrical power from the power bank, the method further comprises directing one or more directional electromagnetic energy beams from the one or more transmitting antennas to avoid the determined location of the receiver of the power bank within the physical space, and/or not directing one or more electromagnetic energy beams from the one or more transmitting antennas towards the receiver of the power bank, to at least partially prevent the receiver of the power bank from receiving one or more of the electromagnetic energy beams from the one or more transmitting antennas.

E38. A method comprising: providing a wireless charging system comprising one or more power chargers comprising one or more transmitting antennas configured to direct one or more directional electromagnetic energy beams to a receiver of the power bank according to any one of embodiments E1 through E20, located within a physical space, wherein the electronic device is adapted to issue a request to the wireless charging system, and wherein a receiver of the power bank is adapted to receive and convert one or more electromagnetic energy beams provided by the wireless charging system to electrical energy in an amount sufficient to power and/or charge the electronic device; determining a location of the electronic device within the physical space; establishing an instance of electronic communication between the wireless charging system and the electronic device; determining a status of the electronic device comprising determination of an authorization status, comprising a determination of if the electronic device is, or is not authorized to receive wireless charging from the wireless charging system, and/or the electronic device is not authorized to receive electrical power from the power bank, based on one or more predetermined authorization criteria; wherein upon receiving a request from the electronic device which is has been determined to be authorized to receive wireless charging from the wireless charging system, and/or the electronic device is authorized to receive electrical power from the power bank: i.) configuring the electronic device to receive wireless charging from the wireless charging system according to one or more configuring criteria; and/or ii) directing of one or more directional electromagnetic energy beams from the one or more transmitting antennas towards the receiver of the power bank at or near the determined location within the physical space in an amount sufficient to power and/or charge the electronic device according to one or more of the configuring criteria; wherein upon determining the electronic device is not authorized to receive wireless charging from the wireless charging system, and/or the electronic device is not authorized to receive electrical power from the power bank: i) configuring the receiver and/or the electronic device to prevent receiving wireless charging from the wireless charging system, and/or ii) directing one or more directional electromagnetic energy beams from the one or more transmitting antennas to avoid the determined location of the receiver of the power bank within the physical space, and/or not directing one or more electromagnetic energy beams from the one or more transmitting antennas towards the receiver of the power bank, to at least partially prevent the receiver of the power bank from receiving one or more of the electromagnetic energy beams from the one or more transmitting antennas.

E39. A system comprising:
a wireless charging system comprising one or more power chargers comprising one or more transmitting antennas configured to direct one or more directional electromagnetic energy beams to a receiver of the power bank according to embodiments E1 through E20, located within a physical space, wherein the electronic device is adapted to issue a request to the wireless charging system, and wherein a receiver of the power bank is adapted to receive and convert one or more electromagnetic energy beams provided by the wireless charging system to electrical energy in an amount sufficient to power and/or charge the electronic device;
the system configured according to the method of Embodiments E21 through E38.

E40. A system comprising:
a wireless charging system comprising one or more power chargers comprising one or more transmitting antennas configured to direct one or more directional electromagnetic energy beams to a receiver of the power bank according to embodiments E1 through E20, located within a physical space, wherein the electronic device is adapted to issue a request to the wireless charging system, and wherein a receiver of the power bank is adapted to receive and convert one or more electromagnetic energy beams provided by the wireless charging system to electrical energy in an amount sufficient to power and/or charge the electronic device;
the system configured to:
determine a location of the electronic device within the physical space;
establish an instance of electronic communication between the wireless charging system and the electronic device;
determine a status of the electronic device comprising determination of an authorization status, comprising a determination of if the electronic device is, or is not authorized to receive wireless charging from the wireless charging system, and/or the electronic device is not authorized to receive electrical power from the power bank, based on one or more predetermined authorization criteria;

wherein upon receiving a request from the electronic device which is has been determined to be authorized to receive wireless charging from the wireless charging system, and/or the electronic device is authorized to receive electrical power from the power bank:

i. configures the electronic device to receive wireless charging from the wireless charging system according to one or more configuring criteria; and/or ii. directs of one or more directional electromagnetic energy beams from the one or more transmitting antennas towards the receiver of the power bank at or near the determined location within the physical space in an amount sufficient to power and/or charge the electronic device according to one or more of the configuring criteria;

wherein upon determining the electronic device is not authorized to receive wireless charging from the wireless charging system, and/or the electronic device is not authorized to receive electrical power from the power bank:

i. configures the receiver and/or the electronic device to prevent receiving wireless charging from the wireless charging system, and/or ii. directs one or more directional electromagnetic energy beams from the one or more transmitting antennas to avoid the determined location of the receiver of the power bank within the physical space, and/or does not direct one or more electromagnetic energy beams from the one or more transmitting antennas towards the receiver of the power bank, to at least partially prevent the receiver of the power bank from receiving one or more of the electromagnetic energy beams from the one or more transmitting antennas.

E41. A system comprising:

a wireless charging system comprising one or more power chargers comprising one or more transmitting antennas configured to direct one or more directional electromagnetic energy beams to a receiver of the power bank located within a physical space, wherein the electronic device is adapted to issue a request to the wireless charging system, and wherein a receiver of the power bank is adapted to receive and convert one or more electromagnetic energy beams provided by the wireless charging system to electrical energy in an amount sufficient to power and/or charge the electronic device;

the system configured to:

determine a location of the electronic device within the physical space;

establish an instance of electronic communication between the wireless charging system and the electronic device;

determine a status of the electronic device comprising determination of an authorization status, comprising a determination of if the electronic device is, or is not authorized to receive wireless charging from the wireless charging system, and/or the electronic device is not authorized to receive electrical power from the power bank, based on one or more predetermined authorization criteria;

wherein upon receiving a request from the electronic device which is has been determined to be authorized to receive wireless charging from the wireless charging system, and/or the electronic device is authorized to receive electrical power from the power bank:

i. configures the electronic device to receive wireless charging from the wireless charging system according to one or more configuring criteria; and/or ii. directs of one or more directional electromagnetic energy beams from the one or more transmitting antennas towards the receiver of the power bank at or near the determined location within the physical space in an amount sufficient to power and/or charge the electronic device according to one or more of the configuring criteria;

wherein upon determining the electronic device is not authorized to receive wireless charging from the wireless charging system, and/or the electronic device is not authorized to receive electrical power from the power bank:

i. configures the receiver and/or the electronic device to prevent receiving wireless charging from the wireless charging system, and/or ii. directs one or more directional electromagnetic energy beams from the one or more transmitting antennas to avoid the determined location of the receiver of the power bank within the physical space, and/or does not direct one or more electromagnetic energy beams from the one or more transmitting antennas towards the receiver of the power bank, to at least partially prevent the receiver of the power bank from receiving one or more of the electromagnetic energy beams from the one or more transmitting antennas.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

I claim:

1. An untethered mobile rechargeable power bank, comprising:

a charging system comprising:
 a controller;
 a receiving system;
 an intermediate electrical storage device;
 a rechargeable electrical storage device;

wherein the controller is coupled to the receiving system and is in electrical communication with the electrical storage device;

the controller further configured to harvest energy from one or more laser based electromagnetic energy beams provided by an external wireless charging system to the receiving system over a distance of greater than about 50 cm, and convert the harvested energy into harvested electrical energy, and direct the harvested electrical energy into the intermediate electrical storage device configured and arranged to receive the harvested electrical energy and direct the harvested electrical energy to recharge the rechargeable electrical storage device, wherein the controller is configurable to direct or not direct the harvested electrical energy from the rechargeable electrical storage device into an electronic device to power and/or recharge the electronic device, based on one or more authorization criteria;

wherein the untethered mobile rechargeable power bank further comprises a transmitter and/or a transceiver configurable for electronic communication with the external wireless charging system, and with at least one second untethered mobile rechargeable power bank;

wherein the untethered mobile rechargeable power bank is configured to redirect at least a portion of the one or more laser based electromagnetic energy beams to the second untethered mobile rechargeable power bank; and wherein the untethered mobile rechargeable power bank is configured to function as a link in a concatenation of a plurality of untethered mobile rechargeable power banks providing electronic communication and wireless power delivery between the wireless charging system and a final untethered mobile rechargeable power bank and/or a final electronic device.

2. The untethered mobile rechargeable power bank of claim 1, configured to form a meshed ad-hoc wireless power grid local area network with the external wireless charging system and the untethered mobile rechargeable power banks
comprising peer-to-peer electronic communication and redirecting of one or more laser based electromagnetic energy beams between the external wireless charging system and each of the untethered mobile rechargeable power banks in which the external wireless charging system and each of the untethered mobile rechargeable power banks present are nodes of the meshed ad-hoc network.

3. The untethered mobile rechargeable power bank of claim 1, further configured to provide the electronic communication and the redirecting of the second rechargeable power bank in the absence of the external wireless charging system.

4. The untethered mobile rechargeable power bank of claim 1, wherein the external wireless charging system is an untethered mobile wireless charging system.

5. The untethered mobile rechargeable power bank of claim 1, wherein the controller is further configurable to redirect at least a portion of the one or more laser based electromagnetic energy beams from the untethered mobile rechargeable power bank towards a location of at least one second untethered mobile rechargeable power bank, utilizing at least a portion of the harvested energy from the one or more laser based electromagnetic energy beams provided by the external wireless charging system and/or energy stored in the rechargeable electrical storage device.

6. The untethered mobile rechargeable power bank of claim 1, wherein the controller is further configurable to redirect the at least a portion of the one or more laser based electromagnetic energy beams from the untethered mobile rechargeable power bank towards a location of at least one second untethered mobile rechargeable power bank, independent of a status of the second untethered mobile rechargeable power bank and/or a corresponding second electronic device.

7. The untethered mobile rechargeable power bank of claim 1, wherein the at least one second untethered mobile rechargeable power bank is configured to harvest energy from one or more of the redirected laser based electromagnetic energy beams and convert the harvested energy into harvested electrical energy and direct at least a portion of the harvested electrical energy into a corresponding second intermediate electrical storage device configured and arranged to receive the harvested electrical energy and direct the harvested electrical energy to recharge a corresponding second rechargeable electrical storage device.

8. A method, comprising:
directing one or more laser electromagnetic energy beams from an external wireless charging system over a distance of greater than about 50 cm to a location of a first untethered mobile rechargeable power bank according to claim 1.

9. The method of claim 8, further comprising redirecting at least a portion of the one or more laser electromagnetic energy beams from the first untethered mobile rechargeable power bank to a second untethered mobile rechargeable power bank, or a final electrical device.

10. The rechargeable power bank of claim 1, wherein the rechargeable power bank is physically separate from the electronic device.

11. The rechargeable power bank of claim 1, comprising a power outlet which is releasably attachable to a power inlet of the electronic device.

12. The rechargeable power bank of claim 1, wherein the electronic device is in electrical communication with the rechargeable power bank via a near field inductive power charger.

13. The rechargeable power bank of claim 1, wherein the controller is configured to establish an instance of bidirectional electronic communication with the external wireless charging system, request power from the external wireless charging system; and/or provide authorization information to the external wireless charging system.

14. The rechargeable power bank of claim 13, wherein the bidirectional electronic communication with the external wireless charging system comprises direct and/or indirect electronic communication via:
a local area data network;
an ad-hoc data network;
a wide area data network;
a wireless computer network;
a meshed network;
a wired computer network;
the internet;
a radio data network;
a cellular data network;
a cellular data network provided at least in part by the electronic device;
a wireless power grid local area network;
an ad hoc wireless power grid local area network;
a meshed ad hoc wireless power grid local area network;
or a combination thereof.

15. The rechargeable power bank of claim 1, wherein the one or more authorization criteria comprises an authorization status of whether or not:
i) the rechargeable power bank is authorized to receive power from the wireless charging system;
ii) the electronic device is authorized to receive power from the wireless charging system; and/or
iii) the electronic device is authorized to receive electrical energy from the rechargeable power bank;
based on one or more predetermined criteria,
wherein the authorization criteria includes an authorization key; a lookup table; an identifier unique to the device receiver; an identifier unique to the electronic device; a user account; a service subscription; a prepaid subscription; a blockchain permission; a blockchain transaction; or a combination thereof.

16. The rechargeable power bank of claim 15, configured such that when a determination of the authorization status results in the rechargeable power bank and/or the electronic device not being authorized to receive wireless charging from the wireless charging system, and/or the electronic device is not authorized to receive electrical energy from the rechargeable power bank, the controller is configured to prevent the directing of the electrical energy from the electrical storage device to the electronic device.

17. The rechargeable power bank of claim 15, configured such that when a determination of the authorization status results in the rechargeable power bank and/or the electronic device not being authorized to receive wireless charging from the wireless charging system, and/or the electronic device is not authorized to receive electrical energy from the rechargeable power bank, the controller configures the receiving system to harvest energy from one or more laser based electromagnetic energy beams provided by the external wireless charging system, convert the harvested energy into electrical energy, and direct the electrical energy into the intermediate electrical storage device, and/or into the electrical storage device and to prevent the directing of the electrical energy from the electrical storage device to the electronic device.

18. The rechargeable power bank of claim 15, configured such that when a determination of the authorization status results in the rechargeable power bank and/or the electronic device not being authorized to receive wireless charging from the wireless charging system, and/or the electronic device is not authorized to receive electrical energy from the rechargeable power bank, the controller is configured to cause the electronic device to present an indication perceivable by an end user of the electronic device allowing the end user to change the authorization status of the rechargeable power bank to being authorized to receive wireless charging from the wireless charging system, wherein the changing of the authorization status comprises a financial transaction.

19. The rechargeable power bank of claim 15, configured such that wherein a determining of the authorization status results in the rechargeable power bank and/or the electronic device as being authorized to receive wireless charging from the wireless charging system, and/or the electronic device is authorized to receive electrical energy from the rechargeable power bank, the controller configures the receiving system to receive wireless charging from the wireless charging system according to one or more configuring criteria;

the controller allows the directing of electrical energy from the intermediate electrical storage device into the electrical storage device, from the electrical storage device to the electronic device, or a combination thereof.

20. The rechargeable power bank of claim 1, configured to request wireless charging from the external wireless charging system independent of any electronic device, based at least on a level of charge of the electrical storage device.

* * * * *